(12) United States Patent
Taira et al.

(10) Patent No.: US 7,153,035 B2
(45) Date of Patent: Dec. 26, 2006

(54) OPTICAL CONNECTOR PLUG AND OPTICAL CONNECTOR

(75) Inventors: Junji Taira, Chiba (JP); Norimasa Arai, Chiba (JP); Kouji Minami, Chiba (JP)

(73) Assignee: Seikoh Giken Co., Ltd. (JP)

( * ) Notice: Subject to any disclaimer, the term of this patent is extended or adjusted under 35 U.S.C. 154(b) by 97 days.

(21) Appl. No.: 11/071,719

(22) Filed: Mar. 3, 2005

(65) Prior Publication Data

US 2005/0201690 A1 Sep. 15, 2005

(30) Foreign Application Priority Data

Mar. 10, 2004 (JP) ............................. 2004-068210
Nov. 29, 2004 (JP) ............................. 2004-344838

(51) Int. Cl.
*G02B 6/36* (2006.01)
(52) U.S. Cl. .............................. 385/76; 385/55; 385/78
(58) Field of Classification Search ................. None
See application file for complete search history.

(56) References Cited

U.S. PATENT DOCUMENTS

| 5,348,487 | A | | 9/1994 | Marazzi et al. ............ 439/138 |
| 5,883,995 | A | * | 3/1999 | Lu ............................. 385/60 |
| 6,076,975 | A | * | 6/2000 | Roth .......................... 385/76 |
| 2005/0196106 | A1 | * | 9/2005 | Taira et al. .................. 385/78 |
| 2005/0286833 | A1 | * | 12/2005 | Kramer et al. ............... 385/55 |

FOREIGN PATENT DOCUMENTS

| EP | 0610676 | 8/1994 |
| EP | 1406103 | 4/2004 |

* cited by examiner

*Primary Examiner*—Rodney Bovernick
*Assistant Examiner*—Mike Stahl
(74) *Attorney, Agent, or Firm*—Adams & Wilks

(57) ABSTRACT

Disclosed are an optical connector plug and an optical connector, wherein the grip member includes an inner barrel and an outer barrel, which are freely slid with respect to each other, the grip member having a reduction state where the inner barrel is accommodated in the outer barrel and an extension state where the inner barrel projects forwardly, and the plug frame being engaged and supported such that the plug frame is movable by a predetermined amount with respect to the outer barrel, and, at a leading end inside the inner barrel are provided a shield plate supported at a free slant with respect to the inner barrel via a base end of the shield plate, disposed at a shield position at which a leading end of the ferrule is shielded in the extension state, and disposed at a non-shield position at which accommodation of the plug frame in the inner barrel is allowed, an action plate supported at a free slant inside the shield plate via a base end of the action plate, and inclined along with the shield plate, with a leading end of the action plate contacting with or engaged with the shield plate, and a biasing supporting means for biasing the shield plate for positioning the shield plate such that the shield plate is disposed at the shield position in the extension position.

17 Claims, 29 Drawing Sheets

A-A'

B-B'

C-C'

D-D'

C-C'

D-D'

C-C'

D-D'

C-C'

D-D'

G-G'

H-H'

K-K'

L-L'

K-K'

L-L'

M-M'

N-N'

M-M'

N-N'

O-O'

P-P'

O-O'

P-P'

O-O'

P-P'

O-O'

P-P'

OPTICAL CONNECTOR PLUG AND OPTICAL CONNECTOR

BACKGROUND OF THE INVENTION

1. Field of the Invention

The present invention relates to an optical connector plug for supporting leading ends of optical fibers and an optical connector for coupling the optical fibers to each other.

2. Description of the Related Art

Conventional optical coupling between optical fibers used for optical communication has been made through a method of using an optical connector including optical connector plugs for supporting leading ends of optical fibers and an optical connector adapter for fixedly attaching optical connector plugs to each other for optical coupling of the optical fiber, or a method of welding the leading ends of the optical fibers in a state in which they come into contact with each other.

The optical coupling between optical fibers using the welding method has a problem in that the optical coupling of the optical fibers cannot be made in a detachable manner or a problem of limited use of the optical fibers due to troublesomeness of the welding process.

To overcome these problems, a SC-type optical connector for coupling optical fibers to each other using a barrel-shaped body used as a ferrule with an outer diameter of 2.5 mm for supporting the optical fibers or a relatively miniaturized MU-type optical connector using a barrel-shaped body used as a ferrule with an outer diameter of 1.25 mm for supporting the optical fibers is being employed so as to facilitate attachment and detachment of the optical coupling of the optical fibers without requiring the welding process of the optical fibers.

In addition, recently, FTTH (Fiber To The Home) for establishing high speed communication environments using access networks, which are formed by optical fibers, for connecting subscriber lines from a telephone office to homes is spreading. In this optical fiber communication, an infrared ray with a wavelength of 1.3 to 1.55 μm is commonly being used and its power tends to increase.

In addition, a cover to cover the leading ends of the optical fiber plugs is provided on the circumference of the optical connector in order to protect the leading ends of the optical fibers from contaminants, such as dusts, fingerprints, and sprays of water (for example, see Patent Document 1 and Patent Document 2).

However, in the conventional SC-type and MU-type optical connector plugs, if a human body, particularly, a part such as eyes, is exposed to light emitted from the leading ends of the supported optical fibers for more than certain time, there is a high possibility of having a bad affect on the human body.

Particularly, a high safety is required for the optical connector plugs for supporting the leading ends of the optical fibers led into households according to the spread of the FTTH to the households. However, the general SC-type or MU-type optical connector plug used for the FTTH has no measure to shield the human body from light emitted from the leading ends of the optical fibers, thereby causing a high possibility of exposure of the human body to light. In addition, there is a problem in that the increase of power in the optical communication increases a risk that light emitted from the leading ends of the optical fibers has a bad affect on the human body.

The above-mentioned conventional arts disclose the optical connector plug provided with the cover for protecting the leading ends of the optical fibers from contaminants and shielding the human body from light emitted from the leading ends of the optical fibers. However, since the cover is provided on the circumference of the optical connector plug, the optical connector plug has a modified shape different from its original shape. Also, the optical connector adaptor for coupling optical connector plugs to each other has a modified shape different from its original shape, according to the modified shape of the optical connector plug provided with the cover, thereby resulting in high product costs.

In addition, the optical connector provided with the cover must have new standard requirements different from those of the conventional SC-type and MU-type optical connectors, and accordingly, has no compatibility with the conventional SC-type and MU-type optical connectors. Accordingly, in order to make an actual application of the optical connector provided with the cover with the new standard requirements, existing equipment employing the conventional SC-type or MU-type optical connector must be replaced with a new one, which results in high product costs.

[Patent Document 1]
Japanese Patent Laid-Open No. 7-281055 (pages 4 to 6, FIGS. 1, 7 and 8)

[Patent Document 2]
Japanese Patent Laid-Open No. 2002-156557 (pages 4 to 6, FIGS. 1, 7 and 8))

In consideration of the above-mentioned problems, it is an object of the invention to provide an optical connector-plug and an optical connector, which are capable of providing high safety by shielding light emitted from optical fibers easily and reliably, and reducing product costs and introduction costs thereof.

SUMMARY OF THE INVENTION

To accomplish the above-mentioned object, there is provided an optical connector plug engagable in a push-pull manner, comprising at least a plug frame for supporting a ferrule for supporting an optical fiber and a grip member for supporting the plug frame therein, wherein the grip member includes an inner barrel and an outer barrel, which are freely slid with respect to each other, the grip member having a reduction state where the inner barrel is accommodated in the outer barrel and an extension state where the inner barrel projects forwardly, and the plug frame being engaged and supported such that the plug frame is movable by a predetermined amount with respect to the outer barrel, at a leading end inside the inner barrel are provided a shield plate supported at a free slant with respect to the inner barrel via a base end of the shield plate, disposed at a shield position at which a leading end of the ferrule is shielded in the extension state, and disposed at a non-shield position at which accommodation of the plug frame in the inner barrel is allowed, an action plate supported at a free slant inside the shield plate via a base end of the action plate, and inclined along with the shield plate, with a leading end of the action plate contacting with or engaged with the shield plate, and a biasing supporting means for biasing the shield plate for positioning the shield plate such that the shield plate is disposed at the shield position in the extension position, the shield plate is moved from the shield position to the non-shield position by the relative movement between the inner barrel and the plug frame from the extension state to the reduction state, the grip member has a shape engaged with an optical connector adapter in the reduction state and an engagement portion provided on the circumference of a leading end of the plug frame is engaged with an engagement click of the optical connector adapter to go into an optical coupling state, and on the circumference of the outer barrel is provided an engagement release portion for pressing the engagement click to disengage the engagement click from the engagement portion by retreating only the outer barrel by a predetermined amount from the optical coupling state.

DETAILED DESCRIPTION OF THE PREFERRED EMBODIMENTS

Hereinafter, the invention will be described in detail through embodiments of the invention.

First Embodiment

Figure 1A:
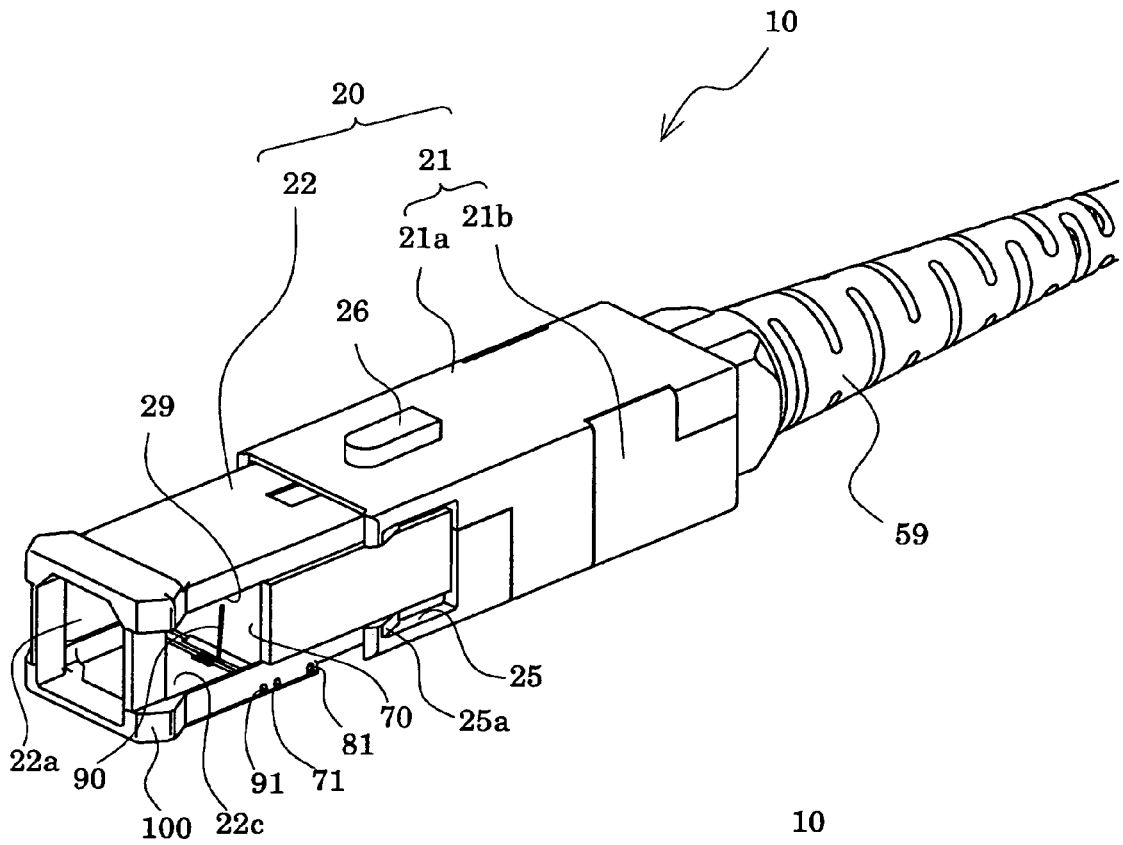
FIG. 1 is a perspective view of an optical connector plug according to a first embodiment of the invention.
Figure 1B:
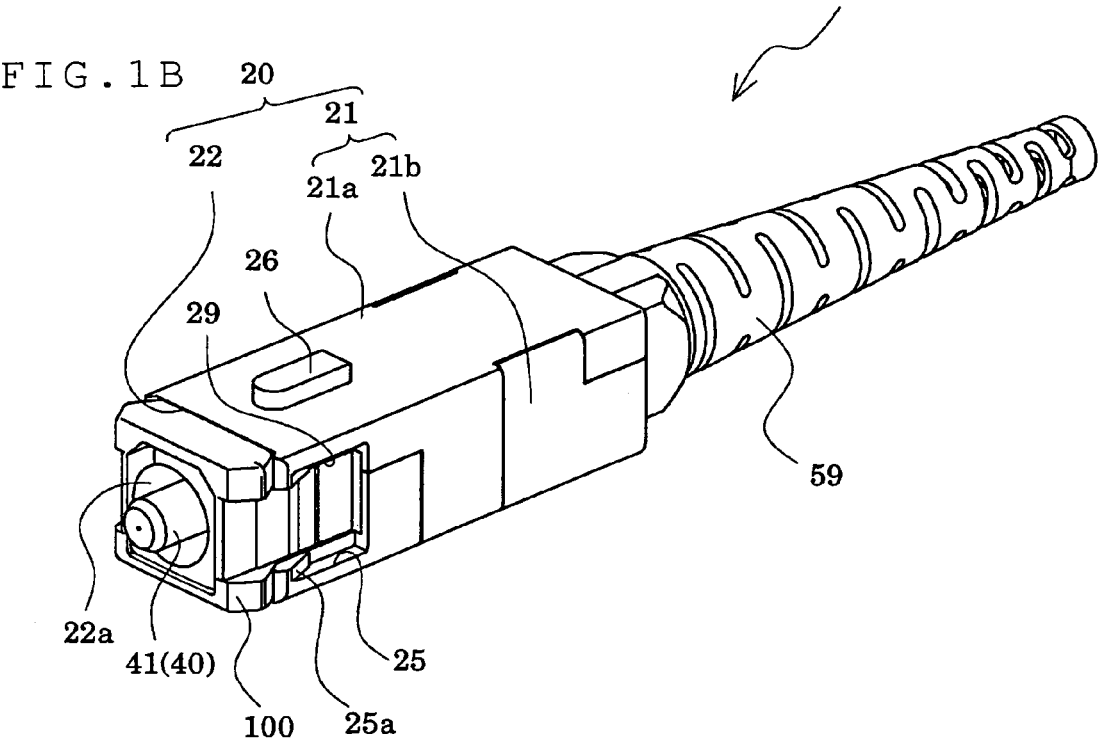
Figure 2A:
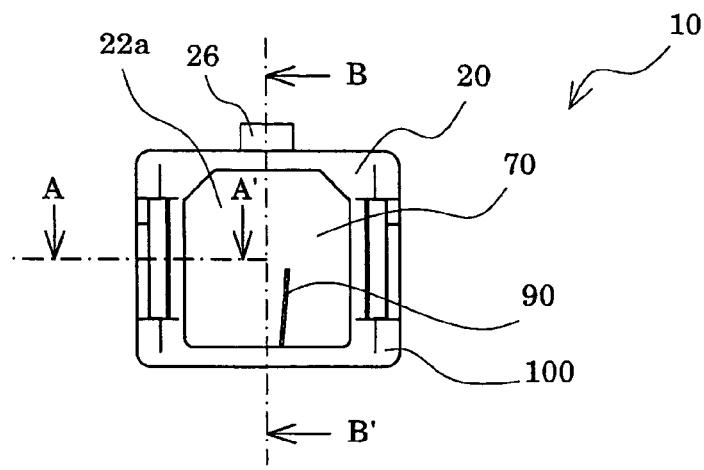
FIG. 2 is a front view and a cross-sectional view of a main part of an optical connector plug according to a first embodiment of the invention.
Figure 2B:
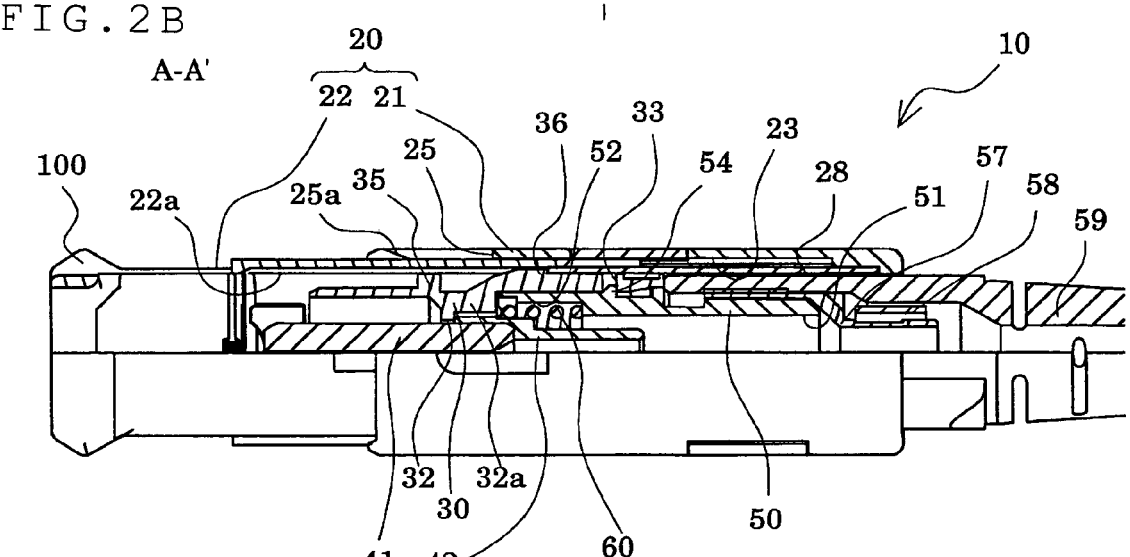
Figure 2C:
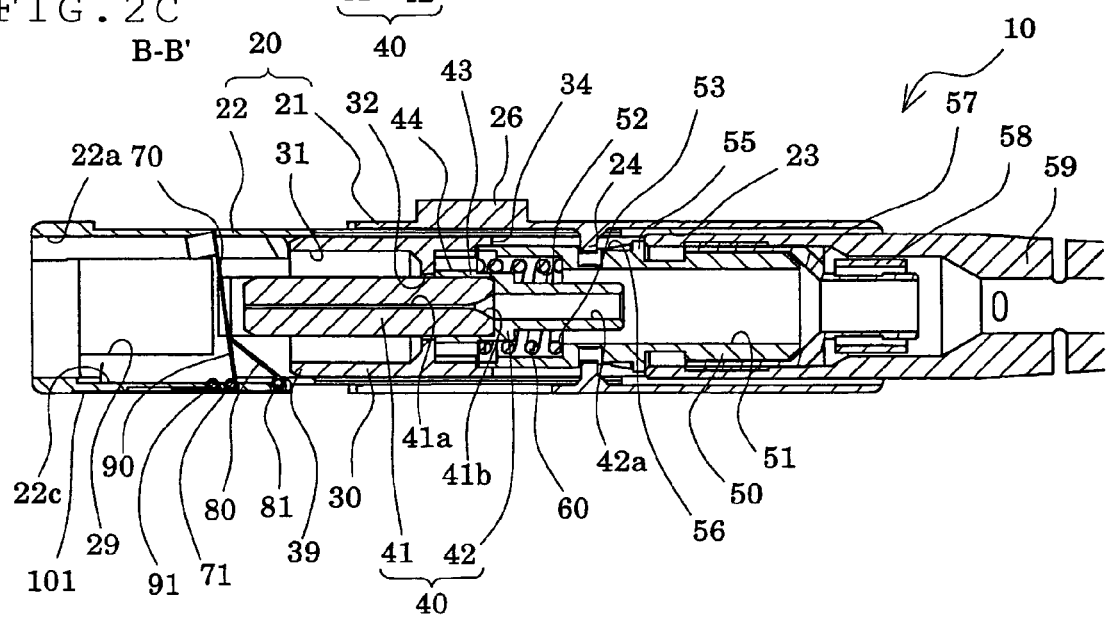
Figure 3A:
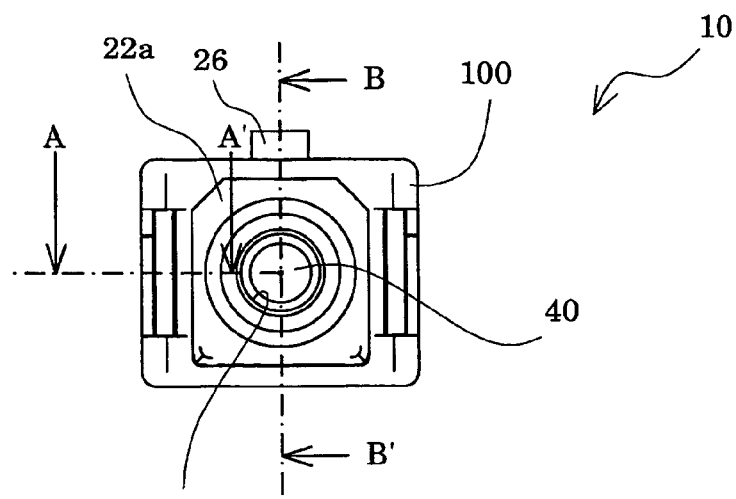
FIG. 3 is a front view and a cross-sectional view of a main part of an optical connector plug according to a first embodiment of the invention.
Figure 3B:
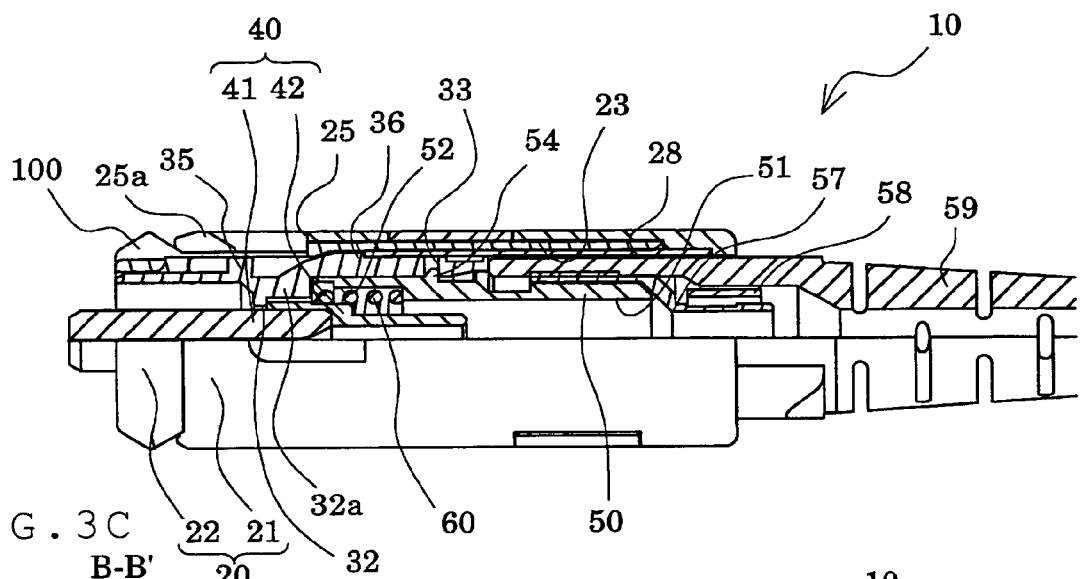
Figure 3C:
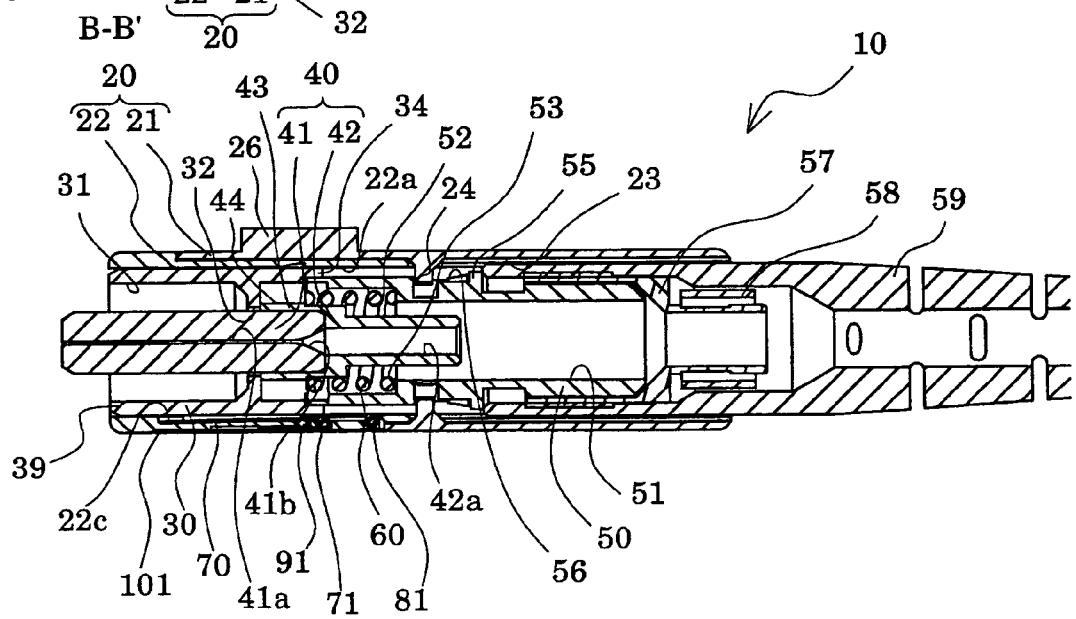

FIG. 1 is a perspective view of an optical connector plug according to a first embodiment of the invention, and FIGS. 2 and 3 are a front view, a cross-sectional view taken along the line A–A', and a cross-sectional view taken along the line B–B' of an optical connector plug.

As shown in FIGS. 1 to 3, an optical connector plug 10 according to the first embodiment of the invention includes a grip member 20 that is fitted into a SC-type optical connector adapter, which will be described in detail later, a plug frame 30 supported movably in an axial direction in the grip member 20, a ferrule 40 to support an optical fiber for optical coupling and to be inserted from the rear of the plug frame 30, a stop ring 50 having a leading end engaged with a rear portion of the plug frame 30, and a biasing spring 60 supported between the ferrule 40 and the stop ring 50 for biasing the ferrule 40 toward an axial leading end.

As shown in FIG. 2, the ferrule 40 is composed of a barrel-shaped body 41 with the length of 2.5 mm for use in ferrule and a collar member 42 fitted into one end of the barrel-shaped body 41 for use in ferrule.

The barrel-shaped body 41 for use in ferrule has a substantially cylindrical shape and is provided therein with an optical fiber insertion hole 41a formed in the axial direction for supporting the optical fiber inserted therein. At the rear portion of the optical fiber insertion hole 41a, a taper portion 41b whose inner diameter becomes large gradually toward an opening side is provided. By providing the taper portion 41b, when the optical fiber is inserted into the optical fiber insertion hole 41a, the taper portion 41b prevents the leading end of the optical fiber from being chipped or bent due to the contact of the leading end of the optical fiber with an end facet of the barrel-shaped body 41 for use in ferrule.

The barrel-shaped body 41 for use in ferrule may be made of a ceramic material such as zirconia, a plastic material, and a glass material such as crystallized glass, borosilicate glass, quartz or the like. The outer diameter of the barrel-shaped body 41 for use in ferrule is 2.5 mm in this embodiment.

In addition, the collar member 42 fitted into the rear portion of the barrel-shaped body 41 for use in ferrule is provided with a coated fiber insertion hole 42a for supporting a coated fiber, which is coated on the circumference of the optical fiber along the axial direction, inserted therein, and a collar portion 43 projecting by a predetermined amount in the radius direction along the circumferential direction.

On the circumference of the collar portion 43, key ways 44 are provided in four places, which are spaced apart from one another with a 90° interval in the circumferential direction and with the same width along the axial direction. As the key ways 44 are engaged with a key way projecting portion 32a of the plug frame 30, which will be described in detail later, movement of the ferrule 40 in the rotating direction with an axis centered with respect to the plug frame 30 is restricted.

The number, position, depth and shape of the key ways 44 are not particularly limited and may be suitably set according to the plug frame 30 for positioning the ferrule 40.

In addition, a material of the collar member 42 is not particularly limited and may include metal such as stainless steel, brass, or iron, or a resin such as plastic. In this embodiment, the collar member 42 is made of the stainless steel.

In addition, the plug frame 30 is provided with a ferrule insertion hole 31 having a shape of a hollow rectangular pillar and penetrated in the longitudinal direction. The ferrule 40 and the biasing spring 60 are inserted in the ferrule insertion hole 31. Also, the ferrule insertion hole 31 is provided with a ferrule projecting hole 32 having an inner diameter larger than an outer diameter of the barrel-shaped body 41 for ferrule and smaller than the diameter of the collar portion 43 such that only the leading end of the barrel-shaped body 41 for ferrule is projected.

In addition, the ferrule insertion hole 31 is provided with two key way projecting portions 32a projecting inwardly in the radius direction and engaged with the key ways 44 of the ferrule 40. As the key way projecting portions 32a are engaged with the key ways 44 of the ferrule 40, the ferrule 40 is movably supported in the axial direction under the condition that movement of the ferrule 40 in the rotating direction with an axis centered with respect to the plug frame 30 is restricted.

In addition, as shown in FIG. 2B, engagement holes 33 opened to the circumference in communication with the ferrule insertion hole 31 are provided on two opposite faces of the circumference of the plug frame 30, respectively. As an engagement projection 54 provided on the circumference of the stop ring 50, which will be described in detail later, is engaged with the engagement holes 33, the plug frame 30 is engaged with the stop ring 50.

In addition, on the two opposite faces intersecting with a face in which the engagement holes 33 of the plug frame 30 are provided, a cut portion 34 cut by a predetermined length toward the axial direction from the rear portion is provided. The cut portion 34 facilitates elastic deformation of the plug frame 30 when the stop ring 50 is engaged with the rear portion of the plug frame 30, and outwardly exposes an engagement concave portion 56 of the stop ring 50 engaged with the rear portion of the plug frame 30.

In addition, a pair of engagement portions 35 projecting in the radius direction of the ferrule 40 at a leading end side and a pair of pressing projections 36 projecting toward the rear over the engagement portion 35 are provided on the two opposite faces of the circumference of the plug frame 30, respectively. As the engagement portion 35 of the plug frame 30 is engaged with an engagement click of the optical connector adapter, which will be described in detail later, the optical connector adapter is engaged with the optical connector plug 10. Also, although described in detail later, the pair of pressing projections 36 of the plug frame 30 serves to push the plug frame 30 into the optical connector adapter in contact of the optical connector plug 10 with a pressing plate 28 provided in the grip member 20 when the optical connector plug 10 is engaged with the optical connector adapter.

In addition, the stop ring 50 fitted into the rear portion of the plug frame 30 has a cylindrical shape, is made of a metal material or a resin material such as plastic, and has a coated optical fiber insertion hole 51 into which the coated optical fiber can be inserted. A communication hole 52 into which the biasing spring 60 can be inserted is provided at a leading end side of the coated optical fiber insertion hole 51, and a stepped portion 53 formed by a difference in inner diameter between the coated optical fiber insertion hole 51 and the communication hole 52 is provided.

The biasing spring 60 is supported by the communication hole 52 and the rear portion of the collar member 42 of the ferrule 40 is inserted into the supported biasing spring 60. In addition, as one end of the biasing spring 60 contacts with the rear surface of the collar portion 43 and the other end of the biasing spring 60 contacts with the stepped portion 53 of the stop ring 50, the ferrule 40 is supported in a state where the ferrule 40 presses against the leading end of the plug frame 30. At this time, as the leading end of the collar portion 43 contacts with the ferrule projecting hole 32, the ferrule 40 is supported under the restriction of movement of the ferrule 40 to the leading end.

In addition, as the key way 44 of the collar portion 43 of the ferrule 40 is engaged with the key way projecting portion 32a of the ferrule insertion hole 31, as described above, since the ferrule 40 is movably supported in the axial direction under the state where the movement of the ferrule 40 in the rotating direction around the axis with respect to the plug frame 30 is restricted, the ferrule 40 is supported in a such a manner that it can be moved to the rear portion under the state.

In addition, two engagement projections 54 projecting into the engagement hole 33 of the plug frame 30 are provided in opposite places on the circumference of the leading end of the stop ring 50. The engagement projections 54 have respective circumferential surfaces having a shape of a taper where its outer diameter becomes small gradually toward its leading end, and are engaged with the stop ring 50 while pressing the rear portion side of the plug frame 30 when the stop ring 50 is inserted from the rear portion side of the plug frame 30.

In addition, a closing projection 55 for closing an opening at the rear portion side of the plug frame 30 is provided in the rear portion of the engagement projection 54 of the stop ring 50. The closing projection 55 has the same shape as the inner diameter of the ferrule insertion hole 31 of the plug frame 30 over the circumference of the stop ring 50 and prevents wastes or dusts from being introduced therein by closing the opening of the rear portion side of the plug frame 30.

In addition, an outer diameter between the closing projection 55 and the engagement projection 54 of the stop ring 50 is smaller than an outer diameter of the leading end of the engagement projection 54. Accordingly, the engagement concave portion 56 is provided along the circumferential direction between the closing projection 55 and the engagement projection 54. As the engagement concave portion 56 is engaged with an engagement convex portion 24 provided at an outer barrel 21 of the grip member 20, which will be described in detail later, the plug frame 30 is engaged and supported such that it can be moved by a predetermined amount toward the axial direction with respect to the outer barrel 21.

In addition, a caulking ring 57 is fixed at the rear portion side of the stop ring 50. The caulking ring 57 is pressed and fixed at the rear portion side of the stop ring 50 under a state where a highly tensile optical fiber cable coated on the coated optical fiber coated on the circumference of the optical fiber, with a highly tensile material such as Kepler fiber inserted between the optical fiber cable and the coated fiber, is inserted between the stop ring 50 and the caulking ring 57.

In addition, a ring 58 is fixed at the rear portion side of the caulking ring 57. The ring 58 is pressed and fixed at the rear portion side of the caulking ring 57 under a state where the outermost coat of the optical fiber cable is inserted between the caulking ring 57 and the ring 58. In this way, the optical fiber cable is fixed to the optical connector plug 10 by means of the stop ring 50, the caulking ring 57 and the ring 58.

In addition, a boot 59 including the caulking ring 57 and the ring 58 therein for supporting the optical fiber cable is fitted into the rear portion side of the stop ring 50. The boot 59 is made of an elastic material such as rubber or a resin material such as plastic.

On the other hand, as shown in FIGS. 2 and 3, the grip member 20 is composed of an outer barrel 21 having a shape of a hollow rectangular pillar and an inner barrel 22 having a shape of a hollow rectangular pillar and slidably accommodated in the axial direction in the outer barrel 21. The grip member 20 has a reduction state where the inner barrel 22 is accommodated in the outer barrel 21, as shown in FIG. 3, and an extension state where the inner barrel 22 is projected forwardly, as shown in FIG. 2.

Figure 4:
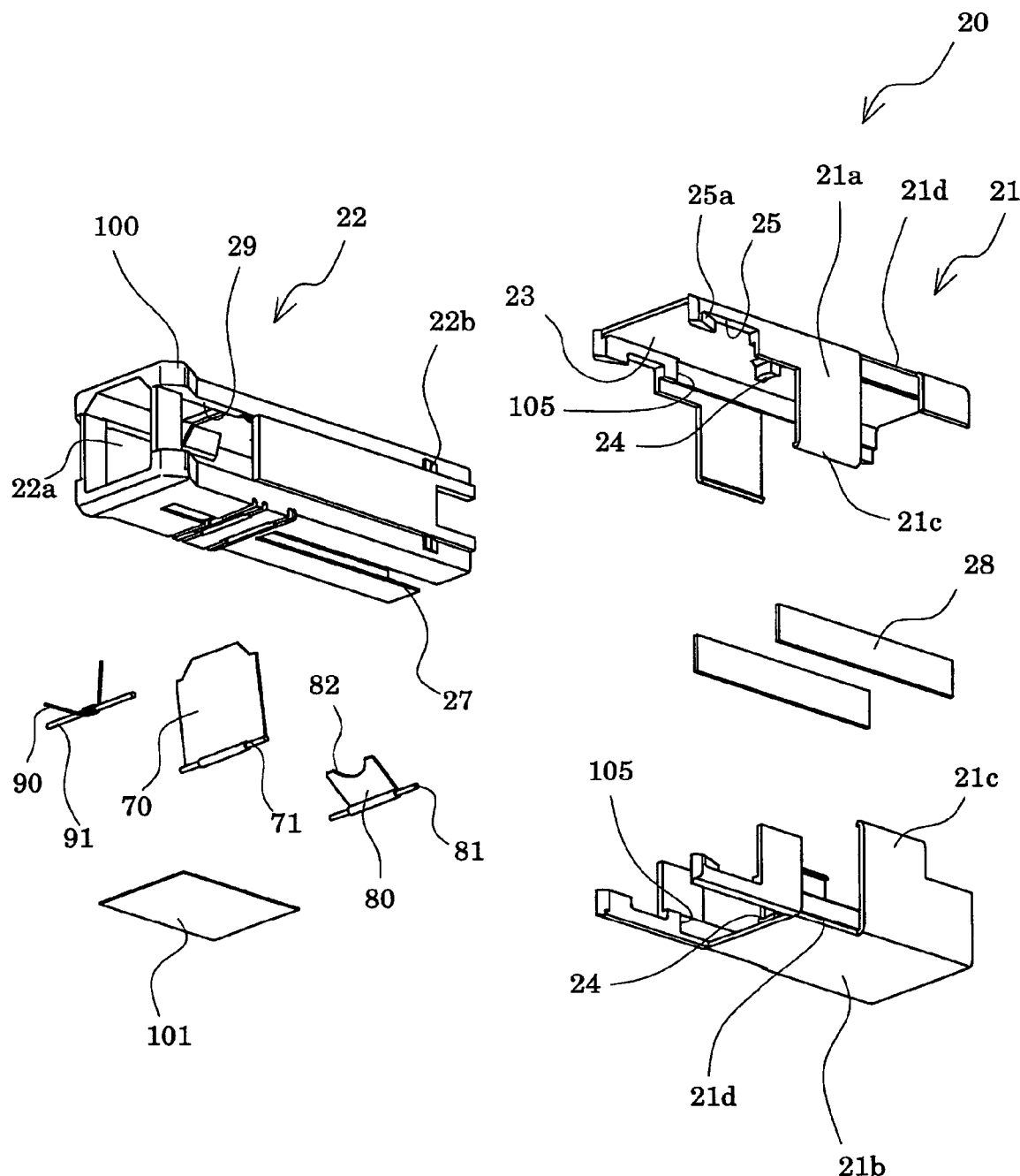
FIG. 4 is an exploded perspective view of a grip member according to a first embodiment of the invention.

As shown in FIG. 4, the outer barrel 21 is composed of a top member 21a and a bottom member 21b, which are separated vertically. The top and bottom members 21a and 21b are integrally assembled as an outer engagement click 21c provided at the top member 21a is engaged with an outer engagement click 21d provided at the bottom member 21b. Each of the top and bottom members 21a and 21b has the outer engagement click 21c and the outer engagement click 21d.

In addition, as shown in FIGS. 2 and 3, the outer barrel 21 is provided therein with a supporting hole 23 by which the plug frame 30 is supported. The plug frame 30 is engaged and supported within the supporting hole 23 such that the plug frame 30 can be moved by a predetermined amount with respect to the outer barrel 21. More specifically, the engagement convex portion 24 projecting into the engagement concave portion 56 provided on the circumference of the stop ring 50 is provided within the supporting hole 23. As both sides of the engagement concave portion 56 of the stop ring 50 contact with the engagement convex portion 24, the plug frame 30 is supported to be movable by a width of the engagement concave portion 56.

In addition, as shown in FIGS. 3B and 4, a first exposure hole 25 for exposing the engagement portion 35 to the outside is provided in a region opposite to the engagement portion 35 of the plug frame 30 of the outer barrel 21. In addition, an engagement release portion 25a inclined toward the rear portion of the outer barrel 21 is provided on a side of a face on which the first exposure hole 25 is opened to the outside. The engagement release portion 25a serves to release the engagement of the engagement click of the optical connector adapter with the engagement portion 35 of the plug frame 30 as the engagement click is pressed according to the movement of the plug frame 30 when the outer barrel 21 is moved with respect to the plug frame 30 by drawing out the outer barrel 21 under a state where the engagement click is engaged with the engagement portion 35, which will be described in detail later.

In addition, as shown in FIGS. 1 and 2B, a projecting key 26 for positioning the optical connector plug 10 in the rotating direction around an axis with respect to the optical connector adapter when the optical connector plug 10 is coupled to the optical connector adapter is provided on the circumference of one side of an opposite face in which the first exposure hole 25 of the outer barrel 21 is not provided.

On the other hand, as shown in FIG. 4, an insertion hole 22a within which the plug frame 30 is slidably moved along the axial direction is provided in the inner barrel 22 provided slidably within the outer barrel 21. In addition, an engagement slit 27 for communicating the insertion hole 22a with the outside is provided at a position opposite to the engagement convex portion 24 of the outer barrel 21 in the rear portion side of the inner barrel 22. Under a state where the outer barrel 21 supports the plug frame 30 by the engagement convex portion 24, the inner barrel 22 is accommodated in the outer barrel 21 by the engagement slit 27. In addition, a disengagement prevention projection 22b is provided on the circumference of the rear portion side of the inner barrel 22. Movement of the disengagement prevention projection 22b in a disengagement direction is restricted as it contacts with a stepped portion 105 provided in the supporting hole 23 of the outer barrel 21. In addition, the disengagement prevention projection 22b has a taper shape whose thickness becomes small gradually toward the rear portion of the inner barrel 22. When the outer barrel 21 and the inner barrel 22 are assembled together, the disengagement prevention projection 22b is accommodated beyond the stepped portion 105 of the outer barrel 21 by inserting the inner barrel 22 in the outer barrel 21. Accordingly, the inner barrel 22 is prevented from being disengaged from the outer barrel 21.

In addition, a pair of rectangular pressing plates 28 having one ends joined to the rear portion of the outer barrel 21 is provided in the insertion hole 22a of the inner barrel 22. As shown in FIGS. 2 and 3, the pressing plates 28 prevents the plug frame 30 from being moved toward the rear portion with respect to the outer barrel 21 as the other ends of the pressing plates 28 are so long that they contact with the pressing projections 36 of the plug frame 30. In other words, although the plug frame 30 is freely moved by a predetermined length within the outer barrel 21 as the engagement convex portion 24 of the outer barrel 21 is engaged with the engagement concave portion 56 of the stop ring 50, as described above, when the plug frame 30 is moved toward the rear portion side, the movement of the plug frame 30 toward the rear portion side is restricted as the other ends of the pressing plates 28 contact with the pressing projections 36 before the engagement convex portion 24 contacts with the engagement concave portion 56. This is for preventing the engagement convex portion 24 from being broken as the engagement of the engagement convex portion 24 with the engagement concave portion 56 cannot endure the pressure occurring when the plug frame 30 is moved toward the rear portion because the optical connector plug 10 is pressed into the optical connector adapter in contact of the plug frame 30 with the optical connector adapter when the optical connector plug 10 is coupled to the optical connector adapter, which will be described in detail later. In addition, the pressing plates 28 are assembled into the outer barrel 21 at the same time of assembling the top and bottom members 21a and 21b constituting the outer barrel 21.

In addition, the amount of movement of the plug frame 30 with respect to the outer barrel 21 is not particularly limited as long as the optical connector plug 10 can be disengaged from the optical connector adapter, which will be described in detail later. For example, in the case of using the SC-type optical connector adapter, the plug frame 30 may be slid by about 2 mm with respect to the outer barrel 21.

In addition, a second exposure hole 29 for exposing the engagement portion 35 of the plug frame 30 to the outside in communication with the first exposure hole 25 of the outer barrel 21 when the grip member 20 is in the reduction state is provided at the leading end side of the inner barrel 22. In other words, the grip member 20 is engaged with the engagement click of the optical connector adapter as the engagement portion 35 of the plug frame 30 is exposed by the first and second exposure holes 25 and 29 in the reduction state where the inner barrel 22 is accommodated in the outer barrel 21.

In addition, an inner barrel engagement portion 100 engaged with the engagement click of the optical connector adapter is provided at a leading end of a face in which the second exposure hole 29 of the inner barrel 22 is provided. The inner barrel engagement portion 100 serves to make the grip member 20 into the extension state by moving only the outer barrel 21 to the rear portion side by engaging with the engagement click of the optical connector adapter when the optical connector plug 10 is drawn out of the optical connector adapter, with the outer barrel 21 grasped, which will be described in detail later.

In addition, inside the inner barrel 22, a shield plate 70 supported at a free slant at one side of the insertion hole 22a via a base end and an action plate 80 having its leading end in contact with the shield plate 70 and supported at a free slant at a further inside side beyond the shield plate 70 via the base end are provided. Also, a biasing supporting means 90 for biasing the shield plate 70 and the action plate 80 for their positioning such that the shield plate 70 is in a shield position inclined up to a position opposite to the leading end of the ferrule 40 is provided in the inner barrel 22.

The shield plate 70 is formed of a plate member having the width slightly narrower than that of the insertion hole 22a, and the base end is supported at a free slant at the one side of the insertion hole 22a, in this embodiment, one side of opposite faces in which the second exposure hole 29 is not provided, via a shield plate shaft 71. In other words, the shield plate 70 is provided such that a leading end of the shield plate 70 is rotated about the shield plate shaft 71 from a position in contact with the leading end of the grip member 20, other than the shield plate shaft 71, at one side of the shield plate 70 at which the shield plate shaft 71 is provided, toward a face at the other side of the shield plate 70, which is opposite to the one side and at which the base end is supported. Also, the shield plate 70 is so long that the leading end of the shield plate 70 contacts with the other side of the insertion hole 22a at a predetermined angle when the leading end is moved to the other end of the insertion hole 22a.

In addition, the shield plate 70 is inclined from a shield position at which the leading end of the shield plate 70 contacts with the other side of the insertion hole 22a so as to close the insertion hole 22a and shield the leading end of the ferrule 40 to a non-shield position at which the leading end of the shield plate 70 contacts with the one side at which the shield plate shaft 71 is provided, while allowing the movement of the plug frame 30.

The shield plate 70 is properly provided at a position at which it does not interfere in the ferrule 40 and the plug frame 30 in the shield position and a position at which the shield plate 70 is not broken even by contacting members such as an optical coupling sleeve within the optical connector adapter when the optical connector plug 10 is coupled to the optical connector adapter.

In addition, the action plate 80 is made of a plate member and is supported at a free slant at one side within the insertion hole, together with the base end of the shield plate 70, via an action plate shaft 81. In addition, the action plate 80 is provided with a semicircularly cut contact concave portion 82 at a leading end of the action plate 80. In addition, the action plate 80 is inclined such that its leading end contacts with the shield plate 70 and it is biased toward the shield position along with the shield plate 70 by the biasing supporting means 90, which will be described in detail later.

The action plate 80 is properly provided with a length and at a position where the leading end of the action plate 80 does not contact with the leading end of the ferrule 40 and the contact concave portion 82 contacts with a side of the ferrule 40 when the action plate 80 is inclined toward the ferrule 40 in the shield position. In other words since the action plate 80 can be inclined toward the ferrule 40 when the shield plate 70 goes in the shield position by the biasing supporting means 90, the contact concave portion 82 provided in the action plate 80 prevents scratches from occurring in the leading end of the ferrule 40 due to the contact of the action plate 80 with the leading end of the ferrule 40 by providing the contact concave portion 82 to the action plate 80.

In addition, the material of the shield plate 70 and the action plate 80 is not particularly limited as long as it has durability. For example, the material may include metal such as stainless steel, or resin such as plastic. In this embodiment, the shield plate 70 and the action plate 80 are formed of stainless steel.

In addition, an accommodating portion 22c for accommodating the shield plate 70 and the action plate 80 is provided in the insertion hole 22a of the inner barrel 22 such that the shield plate 70 and the action plate 80 do not restrict the movement of the plug frame 30 in contact with the plug frame 30 when the shield plate 70 and the action plate 80 go in the non-shield position.

In addition, the biasing supporting means 90 biases the shield plate 70 and the action plate 80 to position these plates 70 and 80 such that the shield plate 70 goes in the shield position. In more detail, the biasing supporting means 90 according to this embodiment is composed of a spring provided at a leading end before the shield plate 70 in the insertion hole 22a of the inner barrel 22 via a biasing shaft 91. The biasing supporting means 90 has one end contacting with the shield plate 70 and other end contacting a cover member 101 provided in the circumference of the inner barrel 22 so as to fix each shafts 71, 81 and 91, and biases the shield plate 70 from the non-shield position to the shield position.

In the optical connector plug 10 having the above-mentioned structure, as shown in FIG. 2, the shield plate 70 is biased and inclined up to the shield position by the biasing supporting means 90 by making the grip member 20 into the extension state. Accordingly, the shield plate 70 shields the leading end of the ferrule 40 such that light is not emitted from the leading end of the optical connector plug 10. At this time, the action plate 80 also is biased by the biasing supporting means 90 via the shield plate 70 such that the leading end of the action plate 80 contacts with the shield plate 70.

In addition, as shown in FIG. 3, while a leading end frame portion 39 of the plug frame 30 contacts with the action plate 80 and the action plate 80 is inclined by making the grip member 20 into the reduction state, the shield plate 70 is inclined up to the non-shield position at which the shield plate 70 is accommodated in the accommodating portion 22c as the leading end of the inclined action plate 80 presses the shield plate 70 against biasing force by the biasing supporting means 90. Accordingly, the leading end of the ferrule 40 is exposed without being shielding. Also, the extension and reduction states of the grip member 20 can be changed only by grasping the outer barrel 21 and attaching/detaching it to/from the optical connector adapter, which will be described in detail later.

Figure 5:
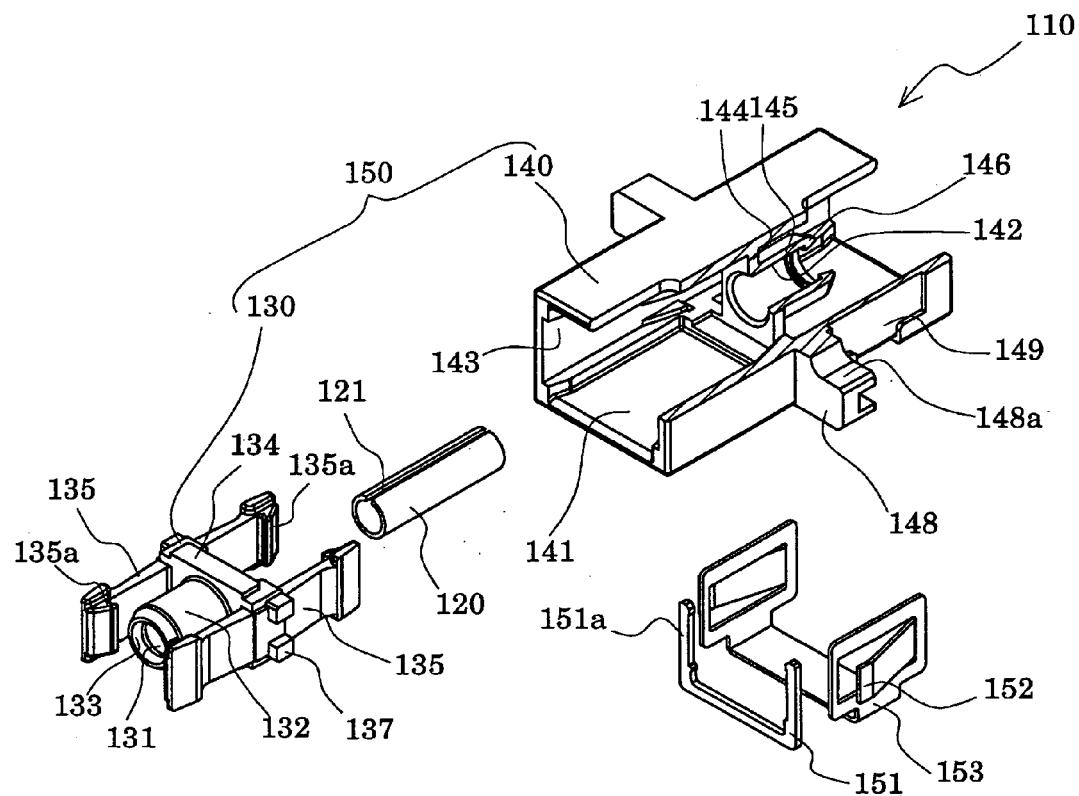
FIG. 5 is an exploded perspective view of a cut part of an optical connector adapter according to a first embodiment of the invention.

Herein, the optical connector adapter with which the optical connector plug 10 of this embodiment is coupled will be described. FIG. 5 is an exploded perspective view of a cut portion of the optical connector adapter.

As shown in FIG. 5, the optical connector adapter 110 with which the optical connector plug 10 is coupled is of a SC type and has an optical coupling sleeve 120 and a supporting member 150 composed of a sleeve holder 130 within which the optical coupling sleeve 120 is inserted and supported and a housing 140.

The optical coupling sleeve 120 has a cylindrical shape, is formed of metal or ceramic, and is provided with a slit 121 penetrated along the axial direction. The optical coupling sleeve 120 has an inner diameter slightly smaller than an outer diameter of the barrel-shaped body 41 for use of ferrule of the optical connector plug 10 for supporting the optical fiber and closely adheres and supports the barrel-shaped body 41 for use of ferrule to an inner surface of the optical coupling sleeve 120 in opposite coupling therebetween by elastic deformation owing to the slit 121. In this embodiment, since the barrel-shaped body 41 for use of ferrule has a length of 2.5 mm, the optical coupling sleeve 120 has the inner diameter of φ2.495 mm and an outer diameter of φ3.0 to 3.2 mm, for example.

The sleeve holder 130 of the supporting member 150 for supporting the optical coupling sleeve 120 has a first supporting portion 132 of a cylindrical shape having a first through hole 131 for supporting one end of the optical coupling sleeve 120. A first stopper projection 133 for fastening the one end of optical coupling sleeve 120 is projected inwardly in a diameter direction at the one end of the first supporting portion 132.

In addition, a first rectangular flange portion 134 is provided on the circumference of the other end of the first supporting portion 132 opposite to the first stopper projection 133.

A pair of engagement clicks 135 in which the first supporting portion 132 and a second supporting portion 145 of the housing 140, which will be described, are fitted, and whose leading ends have respective fastening clicks 135a is provided at both short sides of the first flange portion 134, respectively. These engagement clicks 135 serve to couple the optical connector plug 10 with the optical connector adapter 110 by engaging with the engagement portion 35 of the plug frame 30 of the optical connector plug 10. In addition, a pair of fastening projections 137 is provided at an end portion of a short side of the first flange portion 134, respectively.

On the other hand, the housing 140 of the supporting member 150 has a penetrating portion 141 that is a through hole within which the sleeve holder 130 is retained. A groove portion 143 fitted with the end portion of the first flange portion 134 of the sleeve holder 130 is provided at both short sides of the penetrating portion 141. In addition, a second flange portion 144 contacting with the first flange portion 134 and a second cylindrical supporting portion 145 extending from the second flange portion 144 in the axial direction and provided with a second through hole 142 in communication with the first through hole 131 for supporting the other end portion of the optical coupling sleeve 120 are provided at a side opposite to an insertion direction of the first flange portion 134 from an axial central portion within the penetrating portion 141. A second stopper projection 146 for fastening the end portion of the optical coupling sleeve 120 is projected inwardly in a diameter direction at the end portion of the second supporting 145.

On the other hand, a fixation flange 148 is provided in the axial central portion at a side of the short side of the housing 140 and a fixation groove 148a for fixing the housing 140 is provided at the fixation flange 148. In addition, a plate concave portion 149 is formed at the opposite short sides of one side of the housing 140 in the axial direction and a surface between the opposite short sides. The plate concave portion 149 is engaged with a U-shaped plate 153 having a metal engagement click 152.

As described above, when the optical connector adapter 110 according to this embodiment is assembled, the sleeve holder 130 is inserted in the housing 140, with the optical coupling sleeve 120 inserted between the first and second supporting portions 132 and 145, and a fastening pin 151 is inserted in the housing 140 such that an arm portion 151a is engaged with the fastening projection 137 of the sleeve holder 130. Accordingly, the sleeve holder 130 is engaged with the housing 140 and the optical coupling sleeve 120 is inserted and supported in the sleeve holder 130 and the housing 140.

Now, operation of coupling the optical connector plug 10 to the optical connector adapter 110 will be described in detail later. FIGS. 6 to 9 are cross-sectional views illustrating a coupling operation of the optical connector. Of these figures, FIGS. 6B, 7B, 8B and 9B and FIGS. 6C, 7C, 8C and 9C are respectively cross-sectional views of the line C–C' and the line D–D' of FIGS. 6A, 7A, 8A and 9A.

Figure 6A:
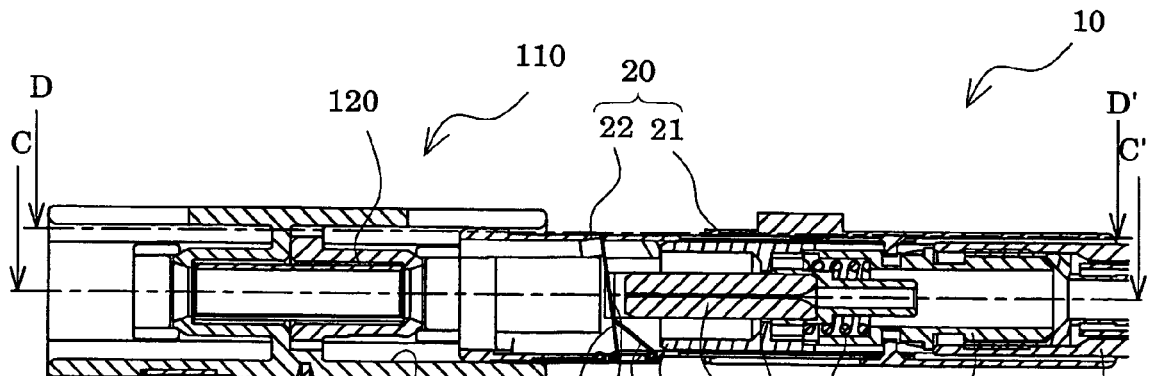
FIG. 6 is a cross-sectional view illustrating a coupling operation between an optical connector plug and an optical connector adapter according to a first embodiment of the invention.
Figure 6B:
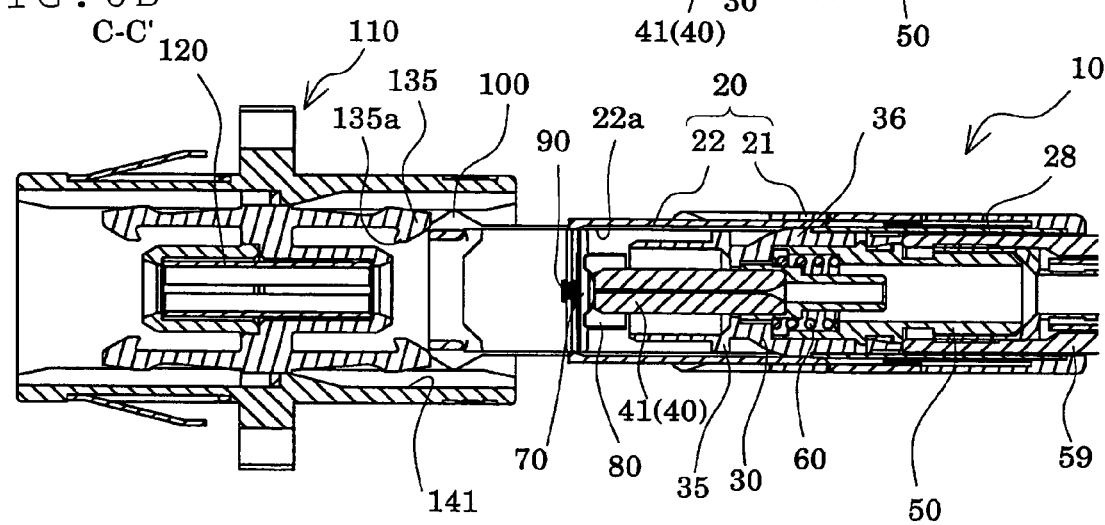
Figure 6C:
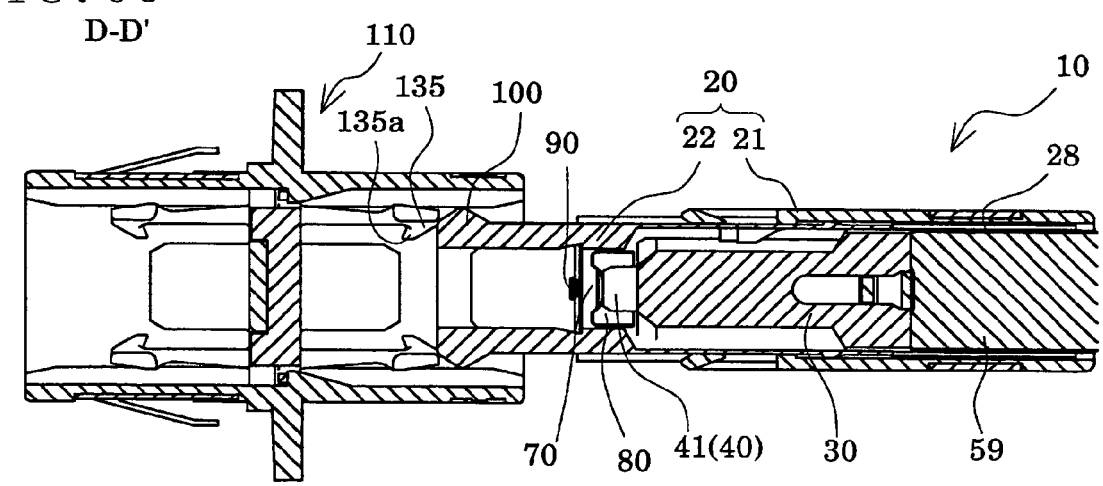

As shown in FIG. 6, the outer barrel 21 is grasped and inserted in the penetrating portion 141 of the optical connector adapter 110 under a state where the grip member 20 of the optical connector plug 10 extends, that is, the leading end of the ferrule 40 is shielded by the shield plate 70. At this time, as shown in FIG. 6B, the leading end of the optical connector plug 10 contacts with the engagement click 135 of the optical connector adapter 110.

Figure 7A:
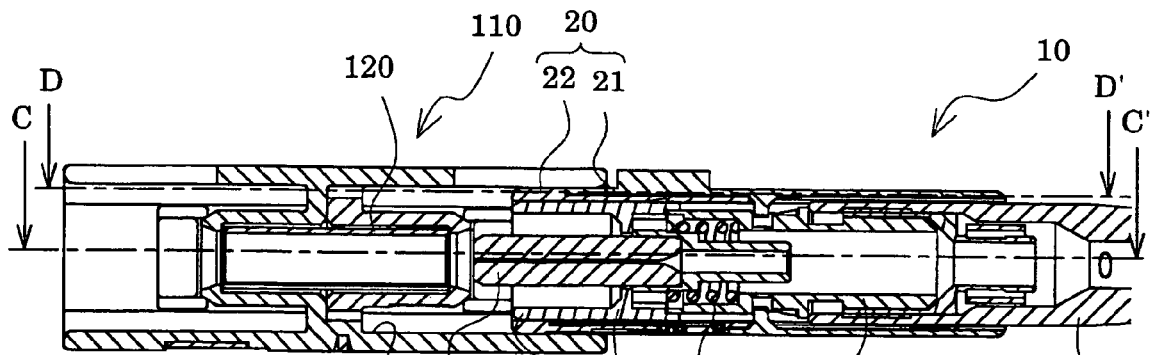
FIG. 7 is a cross-sectional view illustrating a coupling operation between an optical connector plug and an optical connector adapter according to a first embodiment of the invention.
Figure 7B:
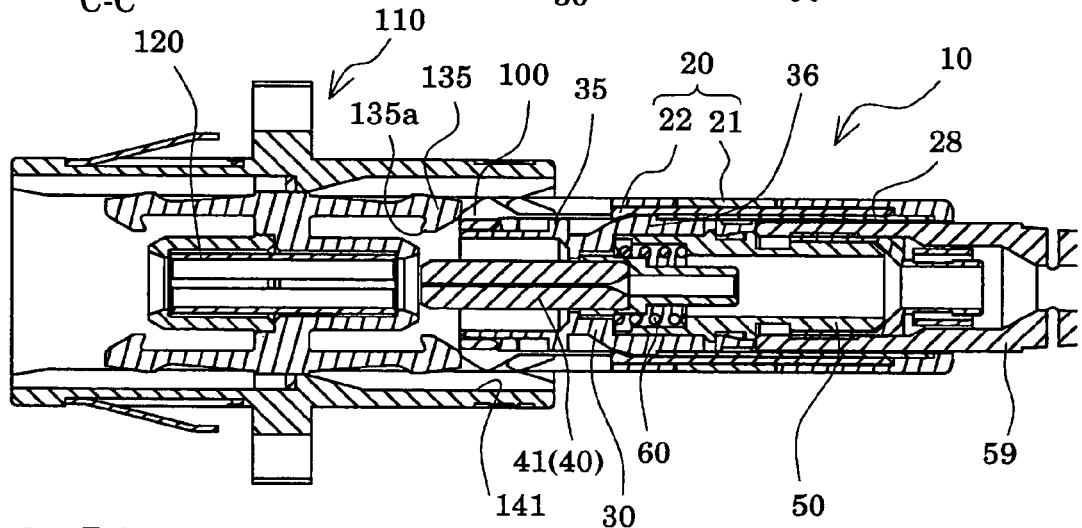
Figure 7C:
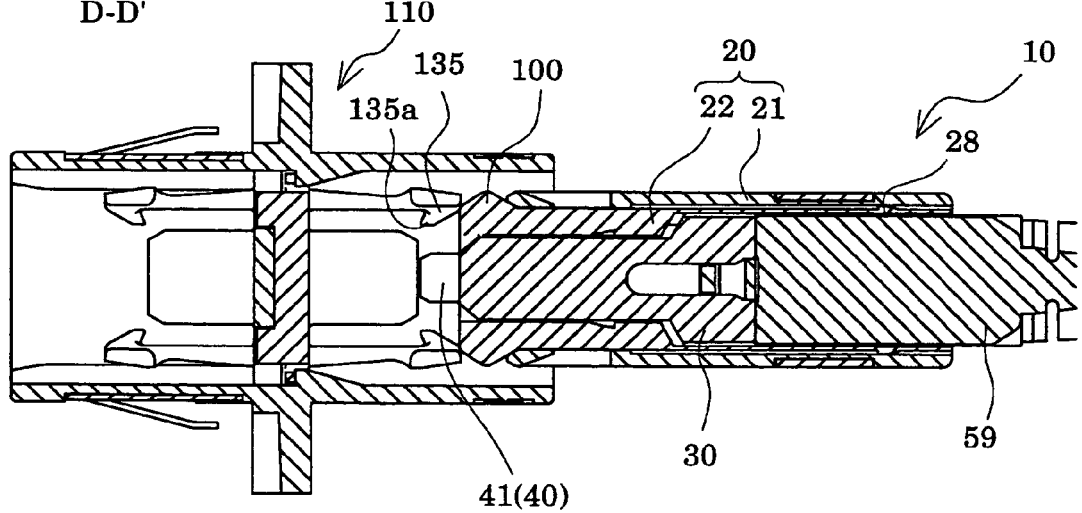
Figure 8A:
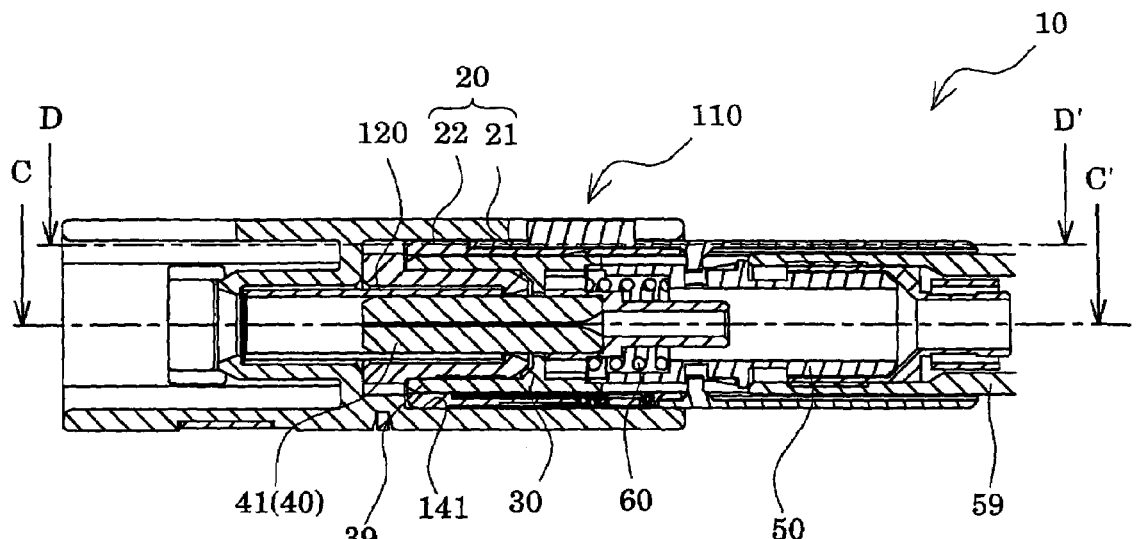
FIG. 8 is a cross-sectional view illustrating a coupling operation between an optical connector plug and an optical connector adapter according to a first embodiment of the invention.
Figure 8B:
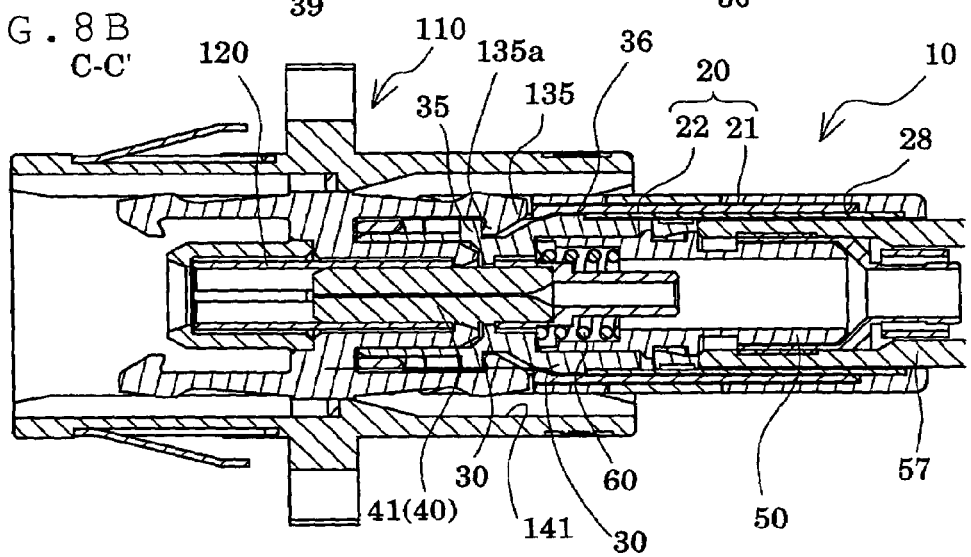
Figure 8C:
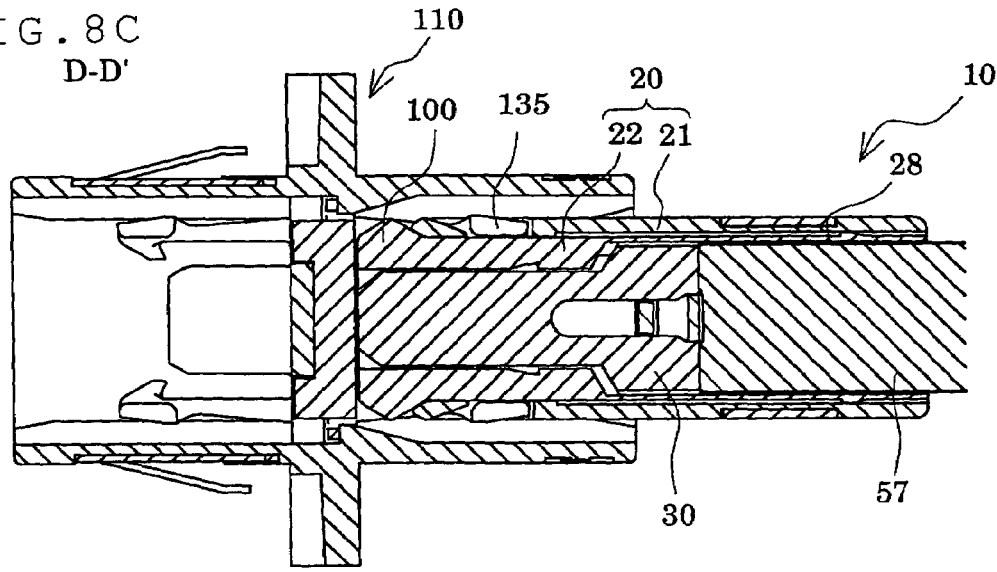

Next, as shown in FIG. 7, when the outer barrel 21 is pressed into the penetrating portion 141, the leading end of the optical connector plug 10 contacts with the engagement click 135, and accordingly, only the outer barrel 21 is moved to the optical connector adapter 110 and the inner barrel 22 is accommodated in the outer barrel 21, that is, goes in the reduction state. At this time, as shown in FIG. 7B, a leading end edge 39 of the plug frame 30 moved along with the outer barrel 21 contacts with the action plate 80. Thus, this action plate 80 is inclined and the leading end of the inclined action plate 80 presses the shield plate 70 against biasing force by the biasing supporting means 90. Accordingly, the shield plate 70 and the action plate 80 are accommodated in the accommodating portion 22c. In other words, if only the outer barrel 21 of the optical connector plug 10 is grasped and coupled to the optical connector adapter 110, the grip member 20 goes in the reduction state and the shield plate 70 and the action plate 80 can be moved up to the non-shield position.

In addition, in the reduction state, the engagement portion 35 of the plug frame 30 is exposed to the outside by the first and second exposure holes 25 and 29 of the grip member 20.

In addition, as shown in FIG. 8, when the optical connector plug 10 in the reduction state is again pressed into the penetrating portion 141 of the optical connector adapter 110 with the outer barrel 21 grasped, the plug frame 30 is pressed by the pressing plate 28, and accordingly, the ferrule 40 is inserted in the optical coupling sleeve 120. At this time, the engagement click 135 passes over the inner barrel engagement portion 100 provided on the circumference of the inner barrel 22, and the outer barrel 21, and accordingly, the fastening clicks 135a are engaged with the engagement portion 35 via the first and second exposure holes 25 and 29. Accordingly, the optical connector plug 10 can be coupled to the optical connector adapter 110. In addition, although not shown, by coupling the optical connector plug 10 to the optical connector adapter 110 at other side of the optical connector adapter 110 in a similar manner, optical connector plugs 10 are coupled to each other in the optical connector adapter 110.

In this way, if only the optical connector plug 10 is coupled to the optical connector adapter 110 with the outer barrel 21 grasped, the grip member 20 goes in the reduction state and the shield plate 70 can be moved up to the non-shield position. Accordingly, the leading end of the ferrule 40 is easily and reliably shielded so as to prevent light from being emitted from the leading end of the optical connector plug 10. In addition, if only the outer barrel 21 is grasped and pushed into the optical connector adapter 110, since the shield plate 70 can be moved to the shield position and the non-shield position, light can be prevented from leaking to the outside at the time of coupling the optical connector plug 10 to the optical connector adapter 110 without requiring a separate work of moving the shield plate 70 to the shield position and the non-shield position, thereby raising a safety.

In addition, when the optical connector plug 10 is detached from the optical connector adapter in such a coupling state, the outer barrel 21 of the optical connector plug 10 is grasped and drawn out of the optical connector adapter. Then, the outer barrel 21 is retreated from the plug frame 30, the engagement click 135 is pressed by the engagement release portion 25a, and accordingly, the fastening click 135a of the engagement click 135 is disengaged from the engagement portion 35. Accordingly, the outer barrel 21 can be again retreated along with the plug frame 30. At this time, as shown in FIG. 9, the engagement click 135 is engaged with the inner barrel engagement portion 100 of the inner barrel 22 so as to retreat only the outer barrel 21 and the plug frame 30, thereby making the grip member 20 in the extension state.

Figure 9A:
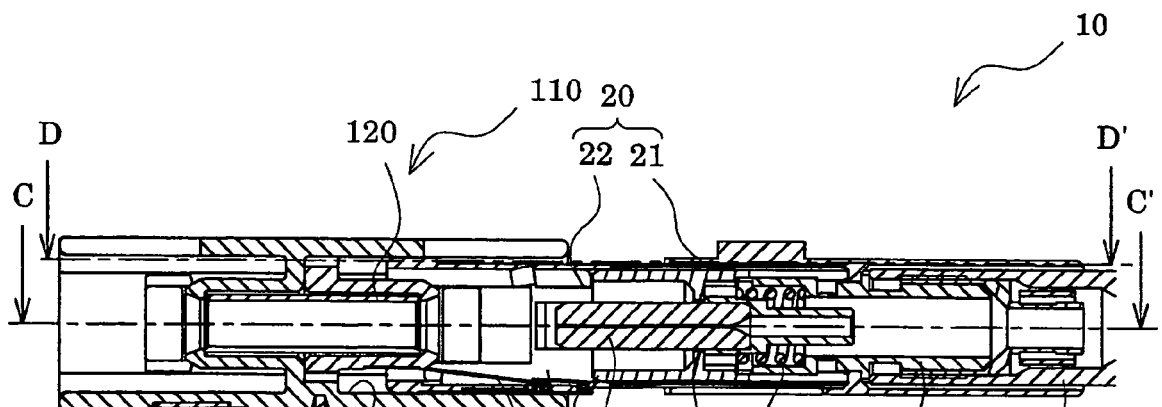
FIG. 9 is a cross-sectional view illustrating a decoupling operation between an optical connector plug and an optical connector adapter according to a first embodiment of the invention.
Figure 9B:
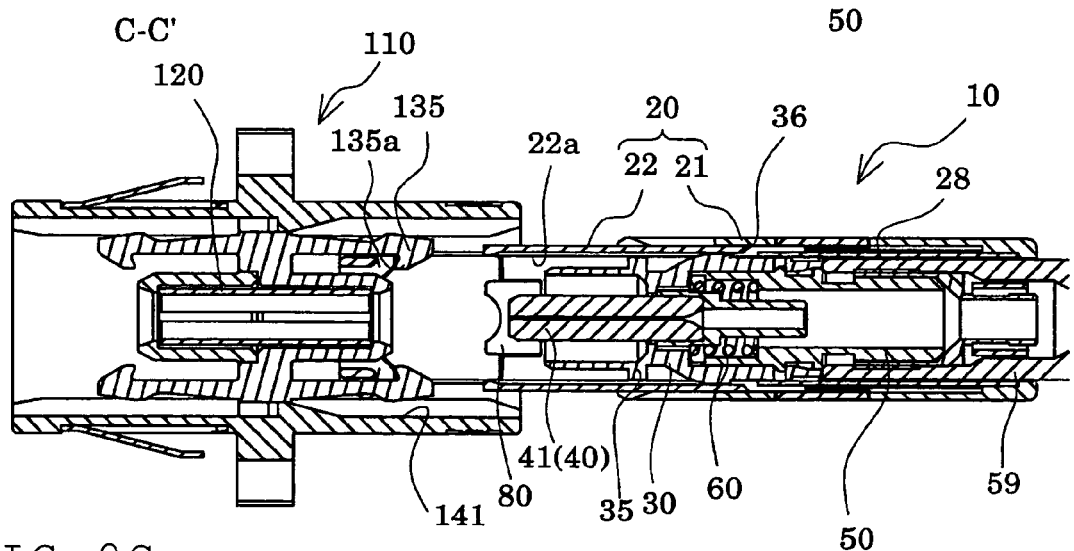
Figure 9C:
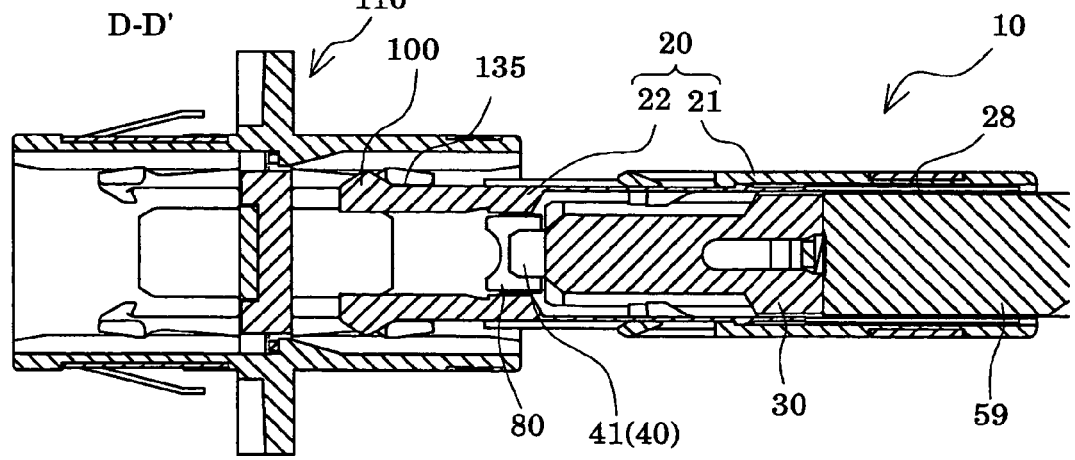

Accordingly, as shown in FIG. 9A, the shield plate 70 and the action plate 80 accommodated in the accommodating portion 22c by the plug frame 30 begins to move to the shield position by the biasing force of the biasing supporting means 90. In addition, by drawing out the outer barrel 21 backward, the fastening click 135a of the inner barrel engagement portion 100 of the inner barrel 22 is disengaged from the engagement click 135 and the optical connector plug 10 is detached from the optical connector adapter 110. Simultaneously, the shield plate 70 and the action plate 80 are inclined up to the shield position, and then, the leading end of the shield plate 70 contacts with the inner surface of the insertion hole 22a, thereby positioning at the shield position. Accordingly, the shield plate 70 makes the leading end of the ferrule 40 into a shield state.

In this way, since the emitted light can go in shield and non-shield states by the shield plate 70 in association of the optical connector plug 10 according to this embodiment with the attachment to and detachment from the optical connector adapter 110, the optical connector plug 10 can be easily coupled to the optical connector adapter 110 without requiring a separate work of moving the shield plate 70 to the shield position and the non-shield position. In addition, when the optical connector plug 10 is coupled to the optical connector adapter 110, light can suitably be prevented from leaking from the leading end, thereby raising a safety.

In addition, since the shield plate 70 and the action plate 80 are provided within the insertion hole 22a and the grip member 20 is composed of only the outer barrel 21 and the inner barrel 22, the optical connector plug 10 can have the same shape as the conventional SC-type optical connector plug. On this account, the optical connector plug 10 can be coupled to the conventional SC-type optical connector adapter, thereby reducing product costs and introduction costs. In addition, as shown in FIGS. 2 and 3, the optical connector plug 10 according to this embodiment can employ the same ferrule 40 and the same plug frame 30 as in the conventional SC-type optical connector plug, thereby reducing product costs and installation costs.

Second Embodiment

Figure 10A:
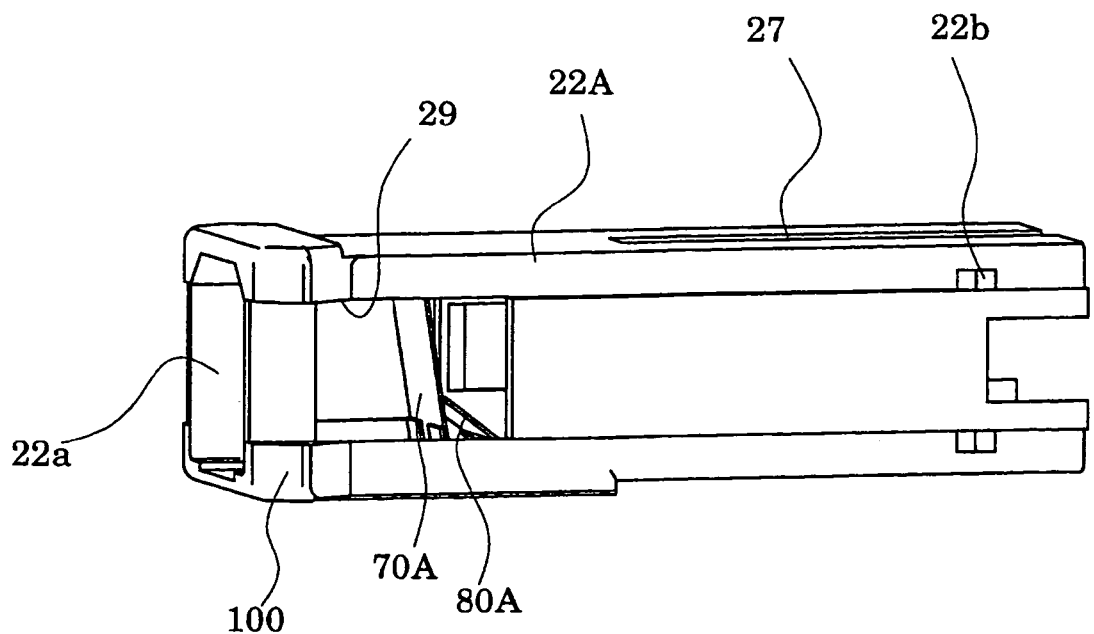
FIG. 10 is a perspective view and a plan view of an inner barrel according to a second embodiment of the invention.
Figure 10B:
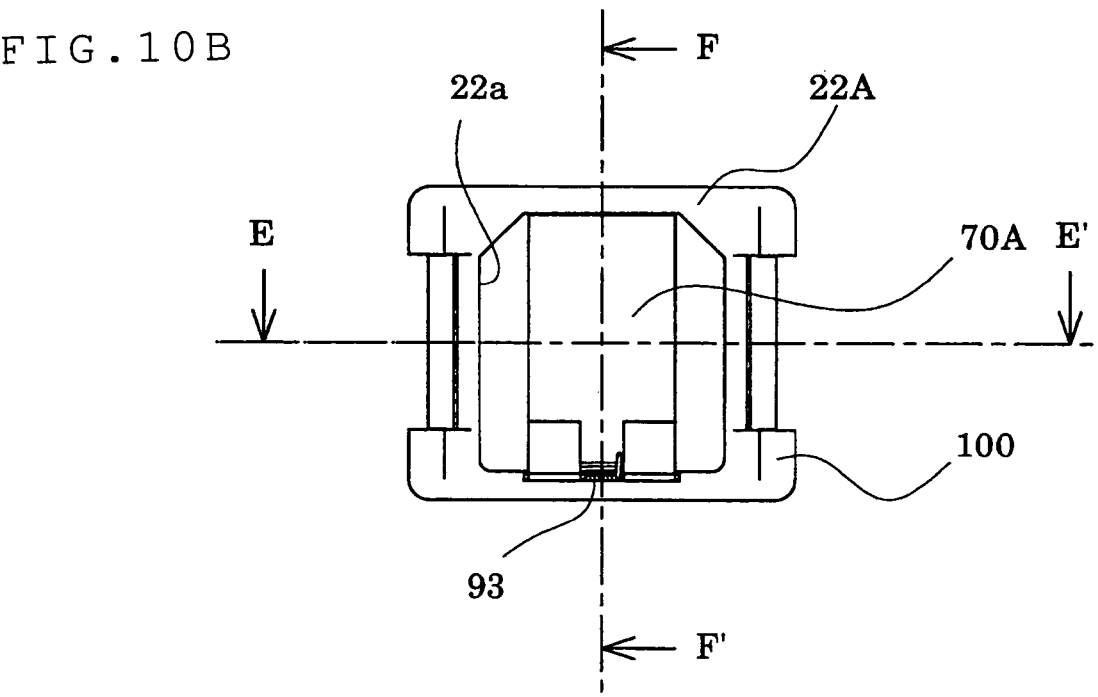
Figure 11A:
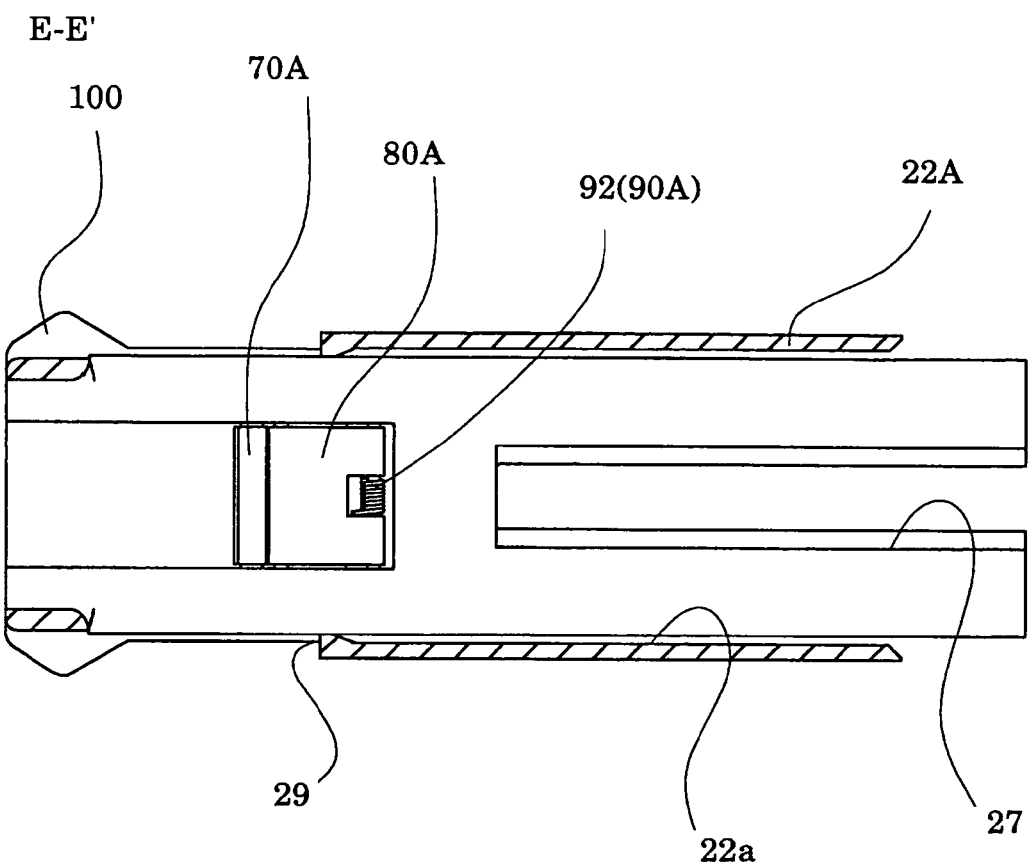
FIG. 11 is a cross-sectional view of a main part of an inner barrel according to a second embodiment of the invention.
Figure 11B:
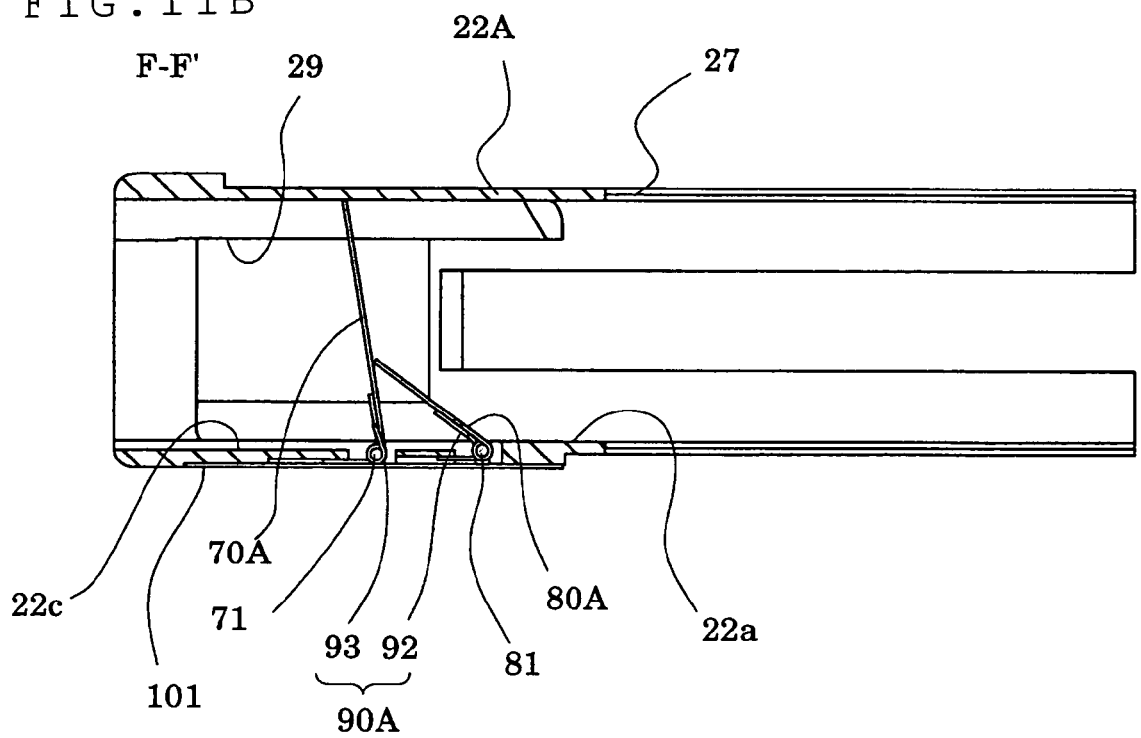

FIG. 10 is a perspective view and a plan view of an inner barrel according to a second embodiment of the invention, and FIG. 11 is cross-sectional views of main parts of the line E–E' and the line F–F' in FIG. 10B. In these figures, the same elements as in the first embodiment are denoted by the same reference numerals, and detailed explanation thereof will be omitted.

As shown in FIGS. 10 and 11, a shield plate 70A and an action plate 80A are provided within an insertion hole 22a of an inner barrel 22A according to this embodiment. The shield plate 70A has a base end rotatably supported to a shield plate shaft 71 at one side of the insertion hole 22a in the same way as the first embodiment. The shield plate 70A has a width narrower than that of the insertion hole 22a and is so long that its leading end contacts with other side of the insertion hole 22a at the shield position.

In addition, the action plate 80A has a base end rotatably supported to an action plate shaft 81 in the inner side of the shield plate 70A. In addition, a contact concave portion is not provided at the leading end of the shield plate 70A, and the action plate 80A is provided at a position where it does not interfere in the ferrule 40 and the plug frame 30 in shielding when the grip member 20 is in the extension state, and is inclined at an angle at which the action plate 80A contacts with the plug frame 30 previous to the leading end of the ferrule 40 when the grip member 20 is in the reduction state.

In addition, a biasing supporting means 90A is composed of an action plate biasing means 92 formed of a spring provided at the action plate shaft 81 of the base end of the action plate 80A and a shield plate biasing means 93 formed of a spring provided at the shield plate shaft 71 of the base end of the shield plate 70A. The action plate biasing means 92 biases the action plate 80A in a direction from the shield position to the non-shield position and the shield plate biasing means 93 biases the shield plate 70A in a direction from the non-shield position to the shield position with a biasing force stronger than that of the action plate biasing means 92. In other words, since the action plate biasing means 92 biases the action plate 80A in the direction from the shield position to the non-shield position, the leading end of the action plate 80A always contacts with the shield plate 70A. On this account, when the grip member 20 composed of the inner barrel 22A having the shield plate 70A and the action plate 80A and the same outer barrel 21 as in the first embodiment is in the extension state, the action plate 80A contacts with the leading end of the ferrule 40, and accordingly, it can be prevented that scratches occur at the leading end of the ferrule 40 and the leading end of the optical fiber. In addition, since the shield plate biasing means 93 biases the shield plate 70A in the direction from the non-shield position to the shield position against the biasing force of the action plate biasing means 92, the shield plate 70A is biased up to the shield position by the shield plate biasing means 92 when the grip member 20 is in the extension state. Accordingly, the shield plate 70A prevents light from being emitted from the leading end of the optical connector plug 10 while shielding the leading end of the ferrule 40.

If only the outer barrel 21 of the optical connector plug having the inner barrel 22A is grasped and pushed into the optical connector adapter 110 for coupling between the optical connector plug and the optical connector adapter 110, the shield plate 70A is moved up to the non-shield position to expose the leading end of the ferrule 40, and accordingly, the optical connector plug can be easily and reliably coupled to the optical connector adapter 110. In addition, when the optical connector plug is decoupled from the optical connector adapter 110, if only the outer barrel 21 is grasped and drawn out of the optical connector adapter 110, the shield plate 70A is moved up to the shield position to shield the leading end of the ferrule 40, and accordingly, light can be prevented from being emitted from the leading end, thereby raising the safety of the optical connector plug 10.

Third Embodiment

Figure 12A:
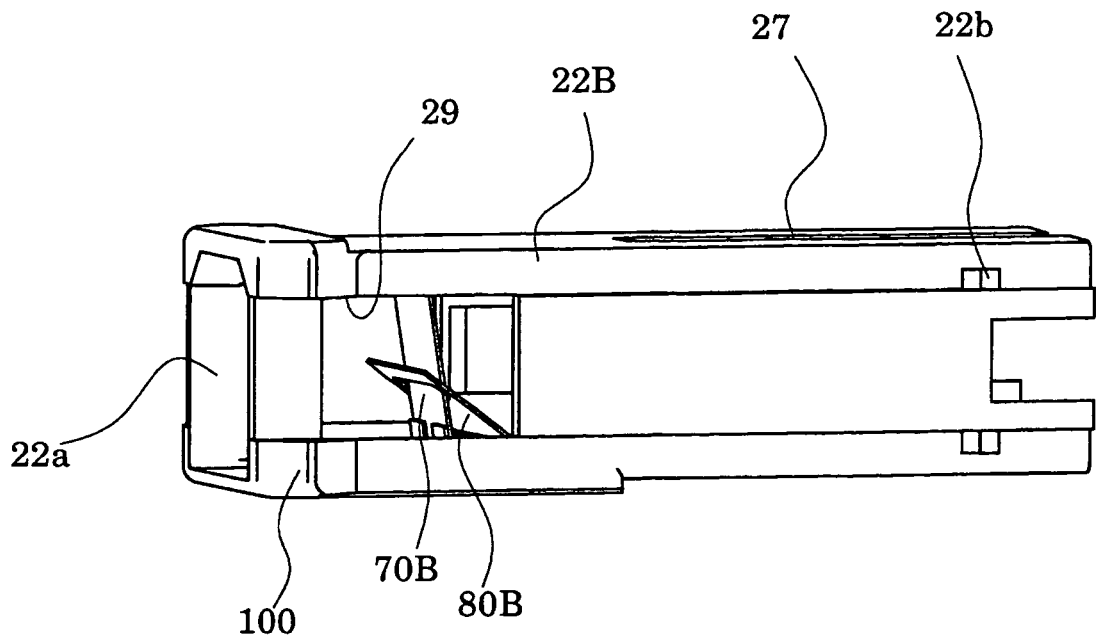
FIG. 12 is a cross-sectional view illustrating a decoupling operation between an optical connector plug and an optical connector adapter according to a first embodiment of the invention.
Figure 12B:
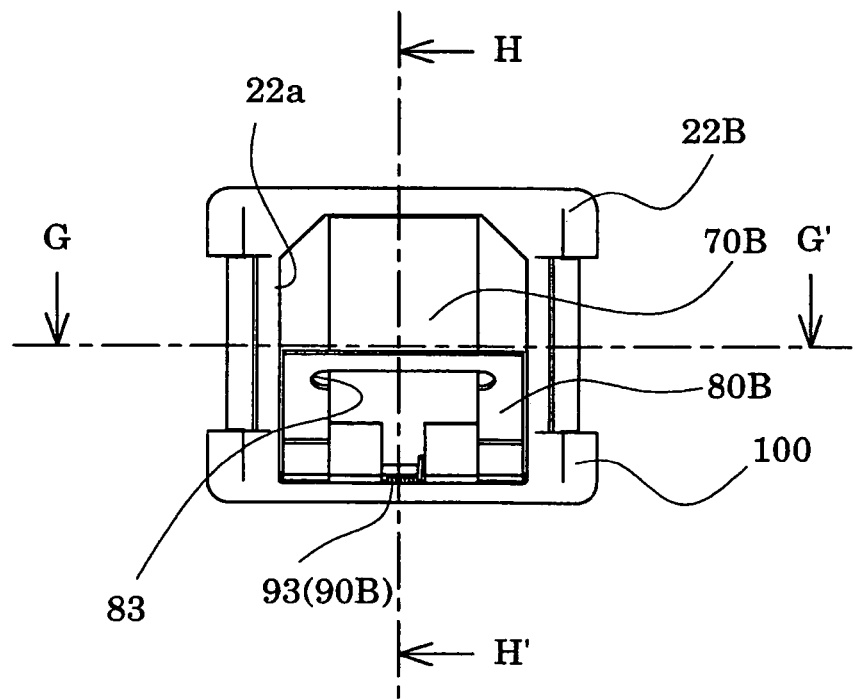
Figure 13A:
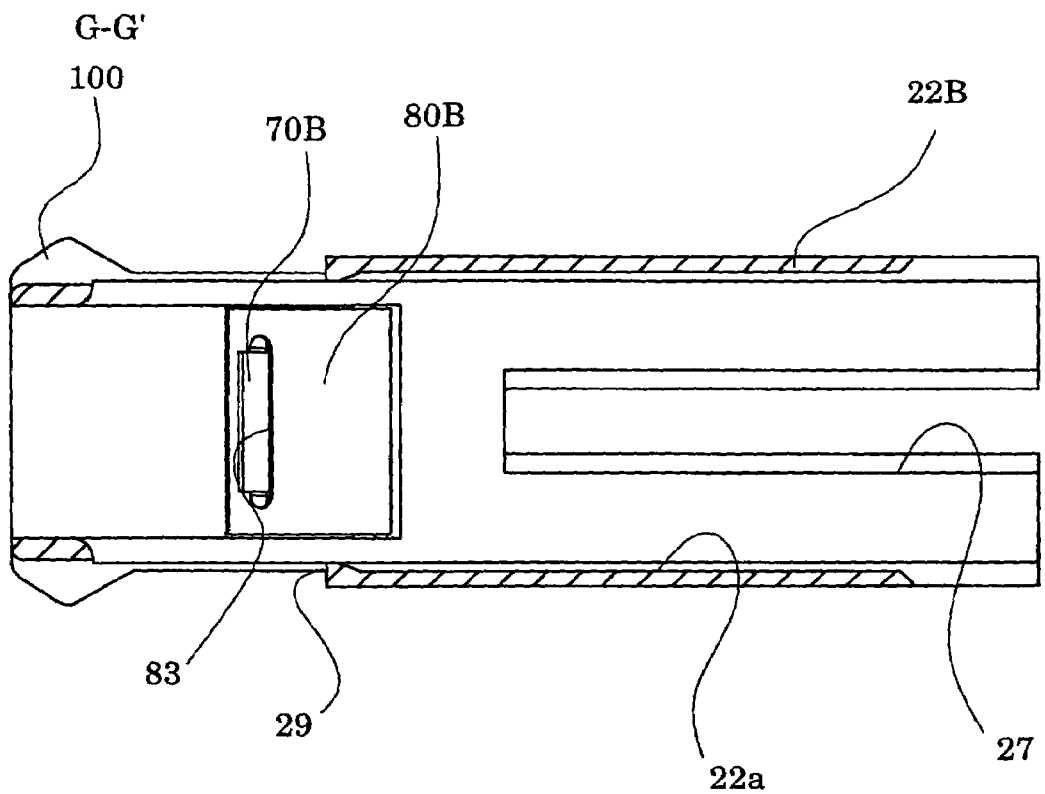
FIG. 13 is a cross-sectional view of a main part of an inner barrel according to a third embodiment of the invention.
Figure 13B:
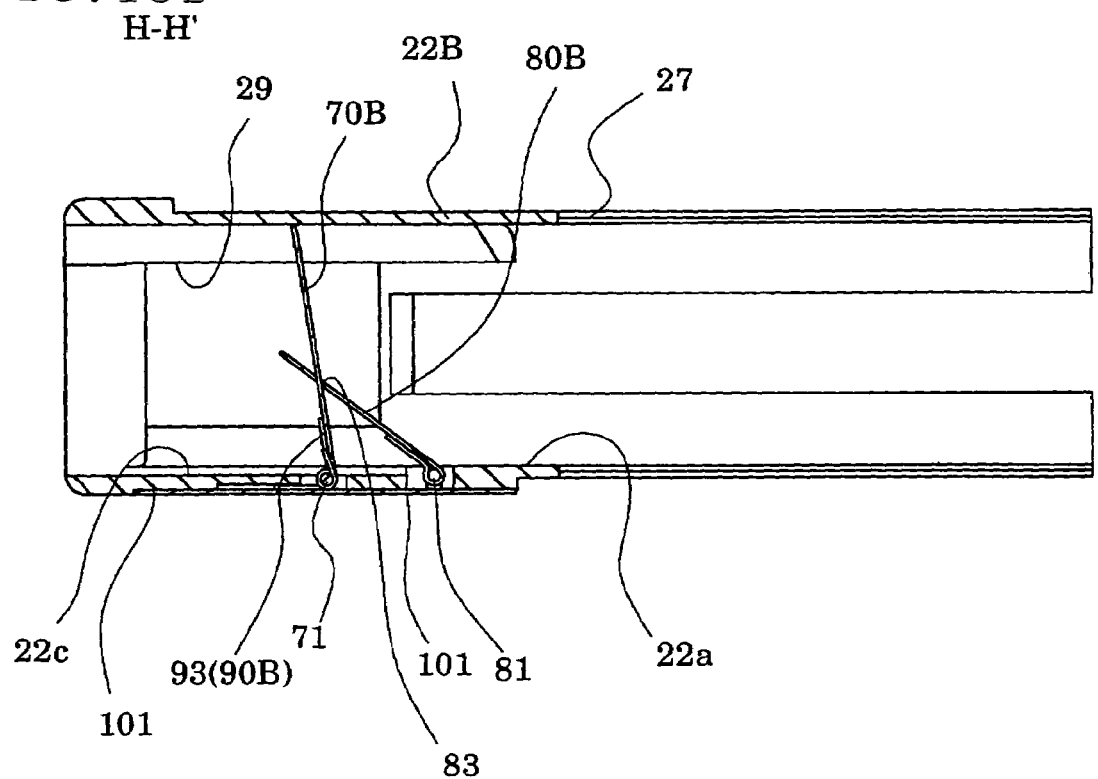

FIG. 12 is a perspective view and a plan view of an inner barrel according to a third embodiment of the invention, and FIGS. 13A and 13B are cross-sectional views of main parts of the line G–G' and the line H–H' in FIG. 12B. In these figures, the same elements as in the above-mentioned embodiments are denoted by the same reference numerals, and detailed explanation thereof will be omitted.

As shown in FIGS. 12 and 13, a shield plate 70B and an action plate 80B are provided within the insertion hole 22a of an inner barrel 22B according to this embodiment. The shield plate 70B has a width narrower than that of the insertion hole 22a and is so long that its leading end contacts with a leading end at other side opposite to one side at which the base end of the insertion hole 22a is supported, in the same way as in the second embodiment. In addition, the action plate 80B is wider than the shield plate 70B and has a leading end provided with a shield plate insertion hole 83 in which the shield plate 70B is inserted.

In addition, when the shield plate 70B is in the shield position, the inclination of the action plate 80B to the leading end of the ferrule 40 is restricted by the shield plate 70B in which the shield plate insertion hole 83 is formed. On this account, a biasing supporting means 90B according to the present embodiment is composed of only a shield plate biasing supporting means 93 for biasing the shield plate 70B from the non-shield position to the shield position, which is provided at the base end of the shield plate 70B. In other words, since the movement of the action plate 80B to the ferrule 40 is restricted by the shield plate insertion hole 83 at the non-shield position, scratches can be prevented from occurring at the leading end of the ferrule 40 due to the contact of the action plate 80B with the leading end of the ferrule 40, without a need of a separate action plate biasing means.

If only the outer barrel 21 of the optical connector plug having the inner barrel 22B is grasped and pushed into the optical connector adapter 110 for coupling between the optical connector plug and the optical connector adapter 110, the shield plate 70B is moved up to the non-shield position to expose the leading end of the ferrule 40, and accordingly, the optical connector plug can be easily and reliably coupled to the optical connector adapter 110. In addition, when the optical connector plug is decoupled from the optical connector adapter 110, if only the outer barrel 21 is grasped and drawn out of the optical connector adapter 110, the shield plate 70B is moved up to the shield position to shield the leading end of the ferrule 40, and accordingly, light can be prevented from being emitted from the leading end, thereby raising the safety of the optical connector plug 10.

In addition, in this embodiment, although only the shield plate biasing means 93 for biasing the shield plate 70B from the non-shield position to the shield position is provided as the biasing supporting means 90B, the invention is not particularly limited thereto. For example, only the action plate biasing means 92 for biasing the action plate 80B from the non-shield position to the shield position may be provided, as exemplified in the second embodiment, or both the shield plate biasing means 93 and the action plate biasing means 92 may be provided in the same way as in the second embodiment.

In addition, in this embodiment, although the shield plate 70B is so long that its leading end contacts with the inner surface of the insertion hole 22a so as to position the shield position, since the inclination of the shield plate 70B to the leading end of the ferrule 40 is restricted by the action plate 80B, the shield plate 70B may be so long that the leading end of the shield plate 70B does not contact with the insertion hole 22a, or the shield plate 70B need be so long that the shield plate 70B is not drawn out of the shield plate insertion hole 83 of the action plate 80B at the time of the non-shield position.

Fourth Embodiment

Figure 14A:
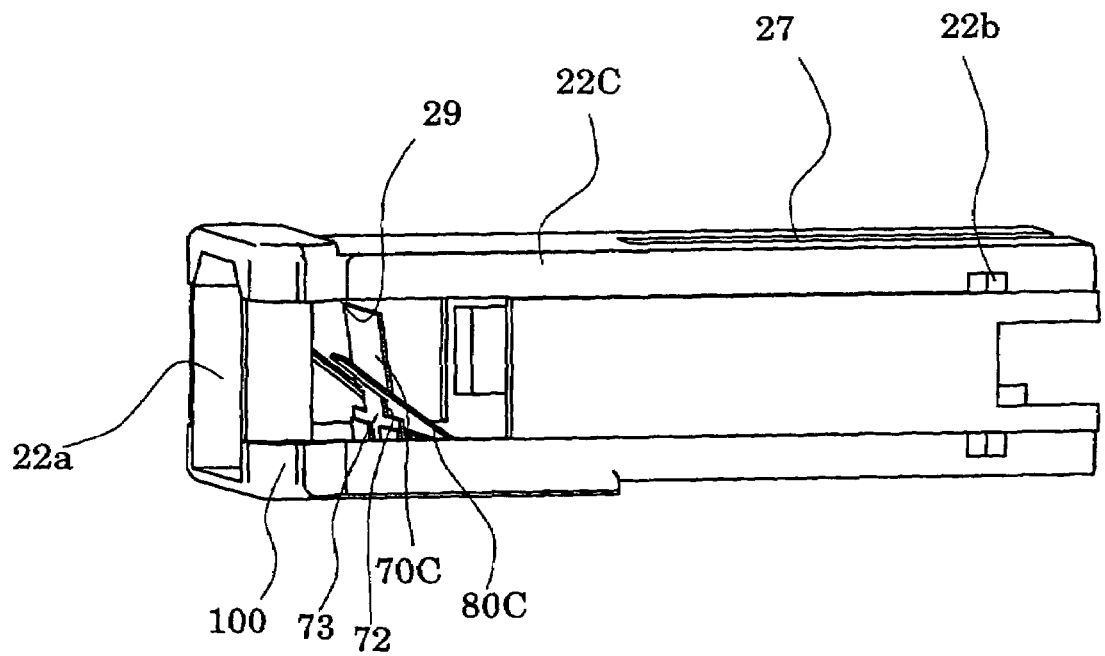
FIG. 14 is a perspective view and a plan view of an inner barrel according to a fourth embodiment of the invention.
Figure 14B:
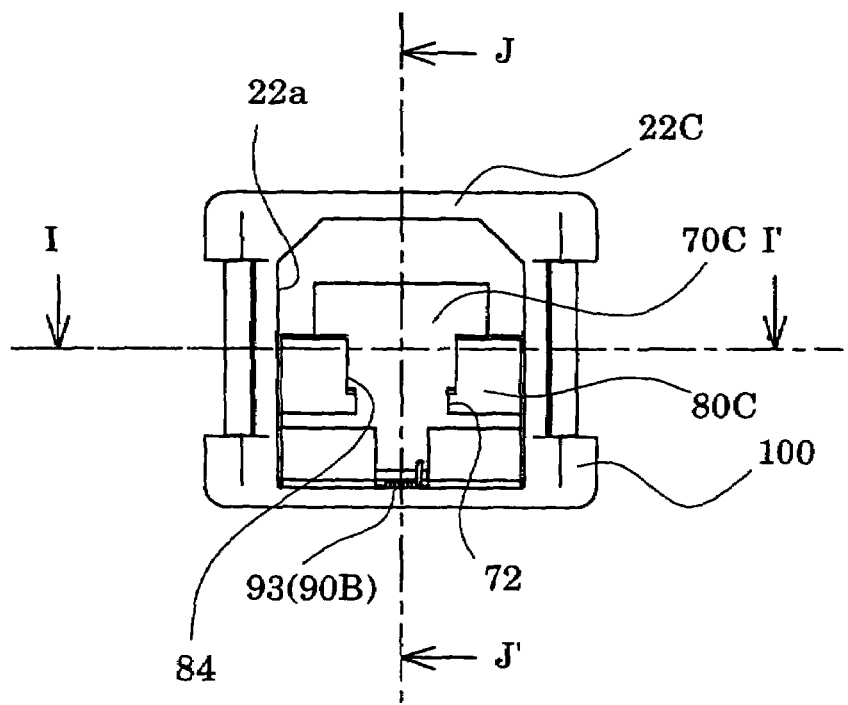
Figure 15A:
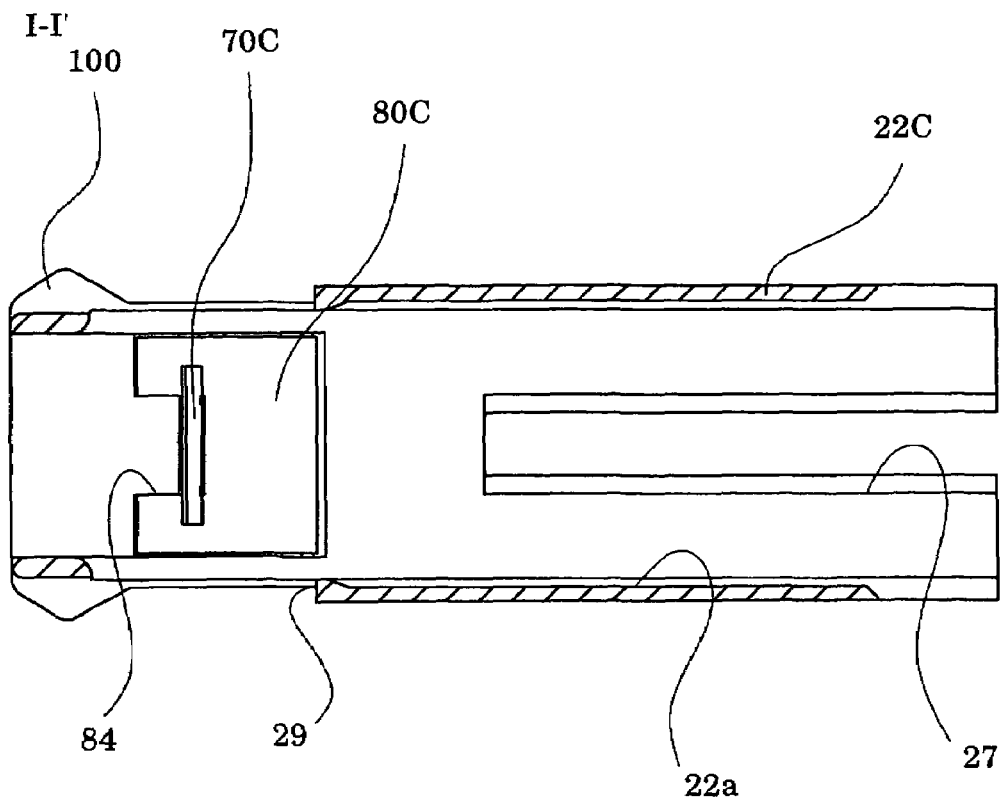
FIG. 15 is a cross-sectional view of a main part of an inner barrel according to a fourth embodiment of the invention.
Figure 15B:
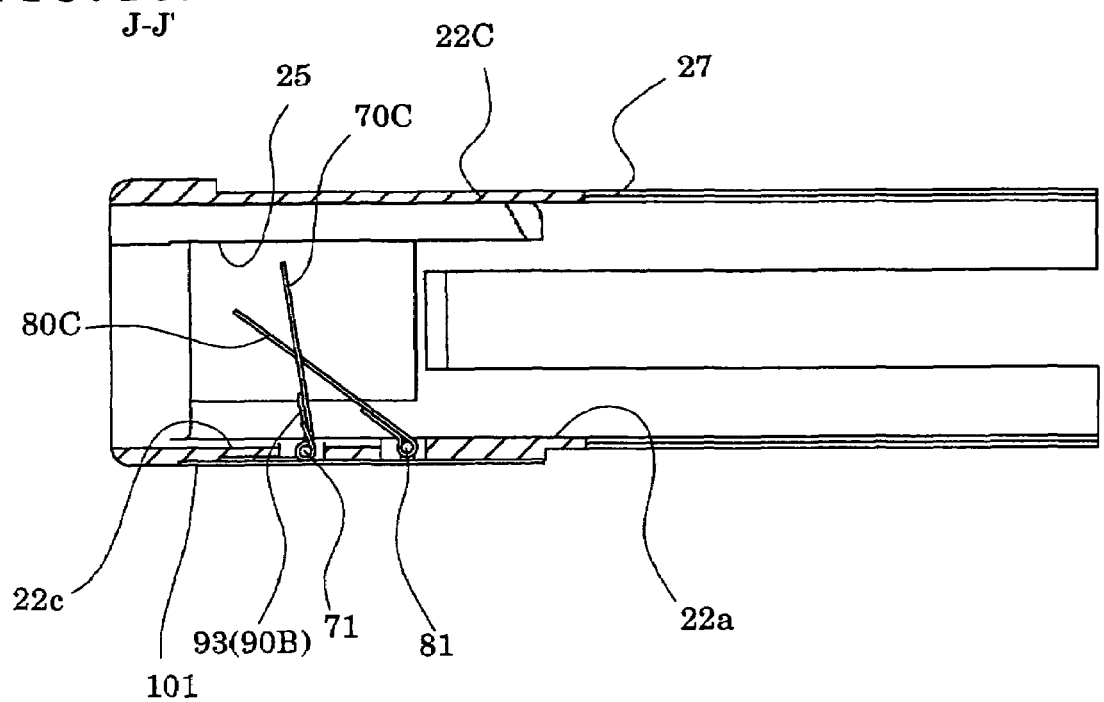

FIG. 14 is a perspective view and a plan view of an inner barrel according to a fourth embodiment of the invention, and FIGS. 15A and 15B are cross-sectional views of main parts of the line I–I' and the line J–J' in FIG. 14B. In these figures, the same elements as in the above-mentioned embodiments are denoted by the same reference numerals, and detailed explanation thereof will be omitted.

As shown in FIGS. 14 and 15, a shield plate 70C and an action plate 80C are provided within the insertion hole 22a of an inner barrel 22C according to this embodiment. The shield plate 70C is provided with a pair of cut portions 72 for action plate at opposite regions in a width direction of the shield plate 70C and a narrow width portion 73 is provided by the cut portion 72 for action plate.

In addition, the action plate 80C is wider than the shield plate 70C and is provided with an insertion portion 84, which is cut off so as to be opened to a leading end edge in a longitudinal direction of the action plate 80C, at a roughly central portion at the leading end. The insertion portion 84 is narrower than the shield plate 70C and wider than the narrow width portion 73. Under a state where the narrow width portion 73 of the shield plate 70C is inserted in the insertion portion 84 of the action plate 80C, the shield plate 70C is engaged with the action plate 80C.

In this way, since the shield plate 70C is engaged with the action plate 80C at the leading end, the inclination of the ferrule 40 to the leading end is restricted by the action plate 80C when the shield plate 70C is in the shield position. This state is defined by predetermined positions of three points, that is, the shield plate shaft 71 of the shield plate 70C, the action plate shaft 81 of the action plate 80C, and an intersection point of the shield plate 70C and the action plate 80C.

Accordingly, since the shield plate 70C may not be so long that the leading end of the shield plate 70C contacts with other side opposite to one side of the insertion hole 22a in which the base end of the shield plate 70C is supported, in order to position the shield plate 70C at the shield position, the shield plate shaft 71, which is a center of the inclination of the shield plate 70C, can be put on the leading end of the grip member 20C.

In addition, when the shield plate 70C is in the shield position, the inclination of the action plate 80C to the leading end of the ferrule 40 is restricted by the shield plate 70C inserted in the insertion portion 84. On this account, only the same biasing supporting means 90B as in the third embodiment, i.e., the shield plate biasing means 93 for biasing the shield plate 70C from the non-shield position to the shield position, is provided on the shield plate shaft 71 of the shield plate 70C.

If only the outer barrel 21 of the optical connector plug having the inner barrel 22C is grasped and pushed into the optical connector adapter 110 for coupling between the optical connector plug and the optical connector adapter 110, the shield plate 70C is moved up to the non-shield position to expose the leading end of the ferrule 40, and accordingly, the optical connector plug can be easily and reliably coupled to the optical connector adapter 110. In addition, when the optical connector plug is decoupled from the optical connector adapter 110, if only the outer barrel 21 is grasped and drawn out of the optical connector adapter 110, the shield plate 70c is moved up to the shield position to shield the leading end of the ferrule 40, and accordingly, light can be prevented from being emitted from the leading end, thereby raising the safety of the optical connector plug 10.

In addition, in this embodiment, although only the shield plate biasing means 93 for biasing the shield plate 70C from the non-shield position to the shield position is provided as the biasing supporting means 90B, the invention is not particularly limited thereto. For example, only the action plate biasing means 92 for biasing the action plate 80C from the non-shield position to the shield position may be provided, as exemplified in the second embodiment, or both the shield plate biasing means 93 and the action plate biasing means 92 may be provided in the same way as in the second embodiment.

Fifth Embodiment

Figure 16A:
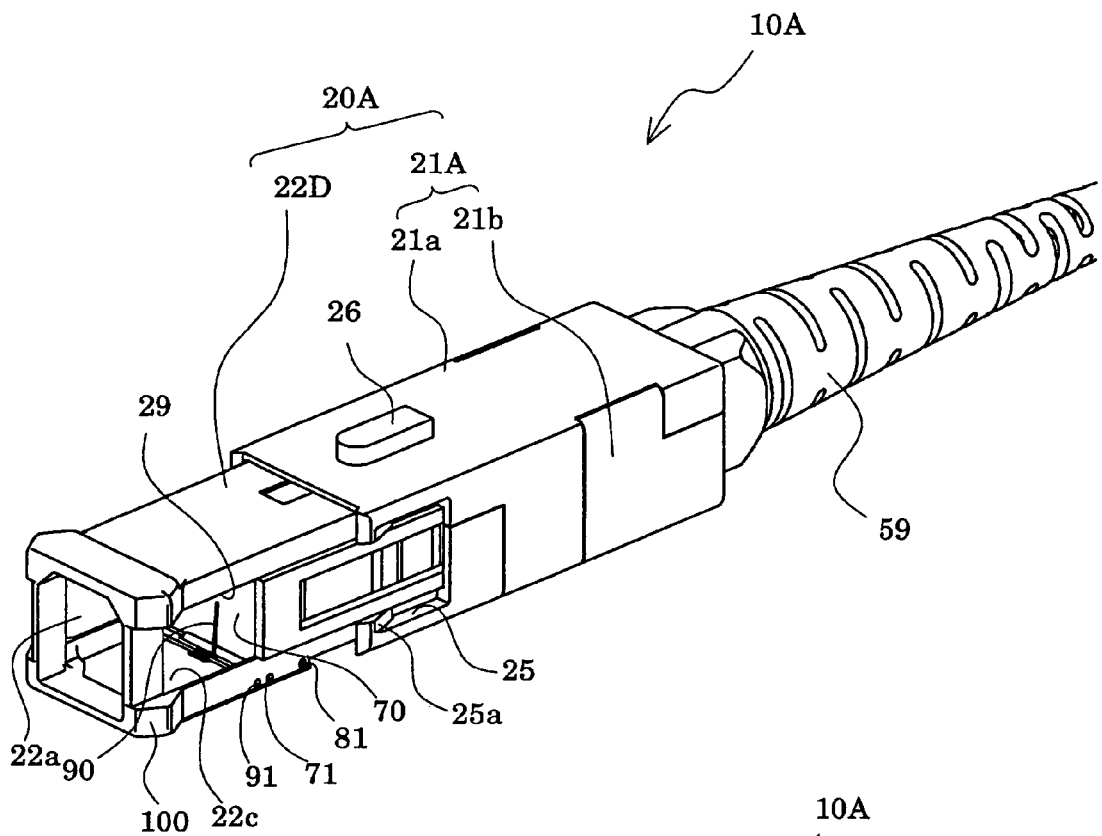
FIG. 16 is a perspective view of an optical connector plug according to a fifth embodiment of the invention.
Figure 16B:
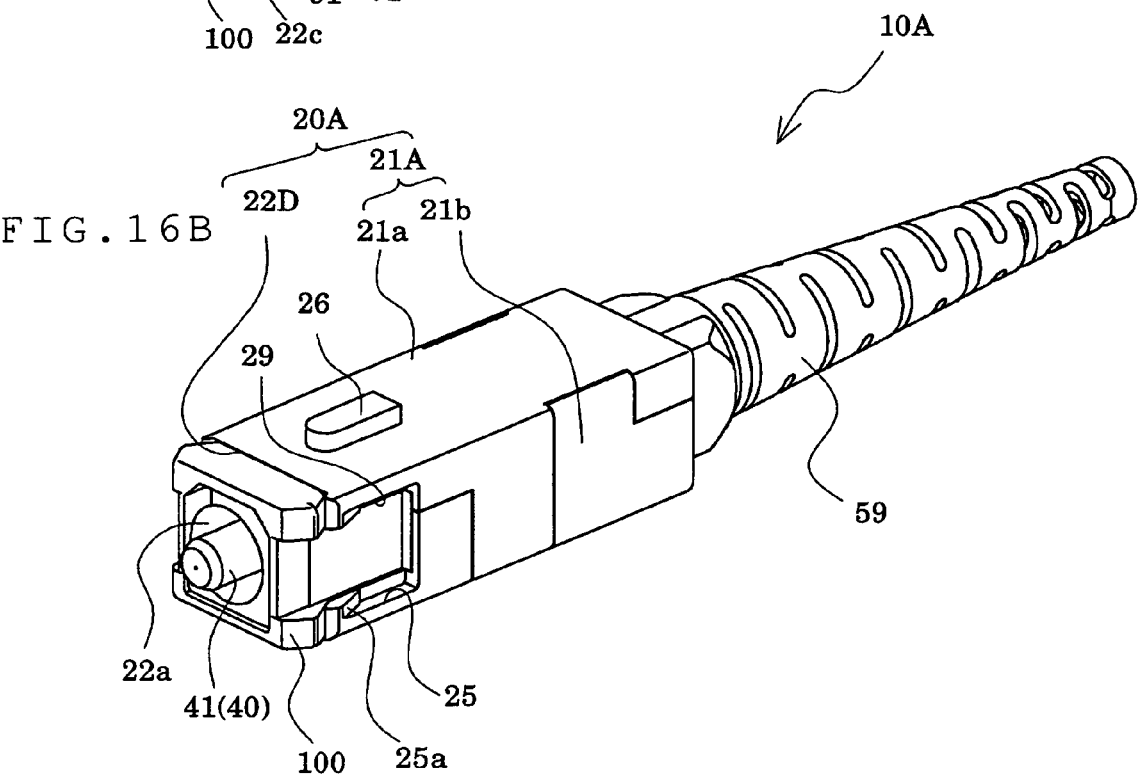
Figure 17A:
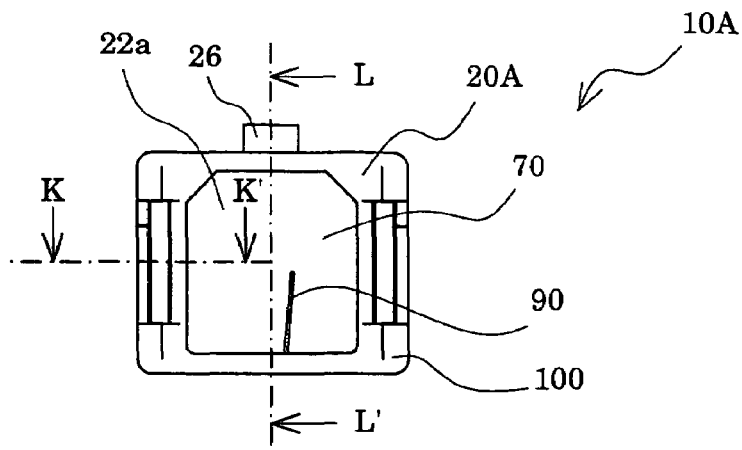
FIG. 17 is a cross-sectional view of a main part of an optical connector plug according to a fifth embodiment of the invention.
Figure 17B:
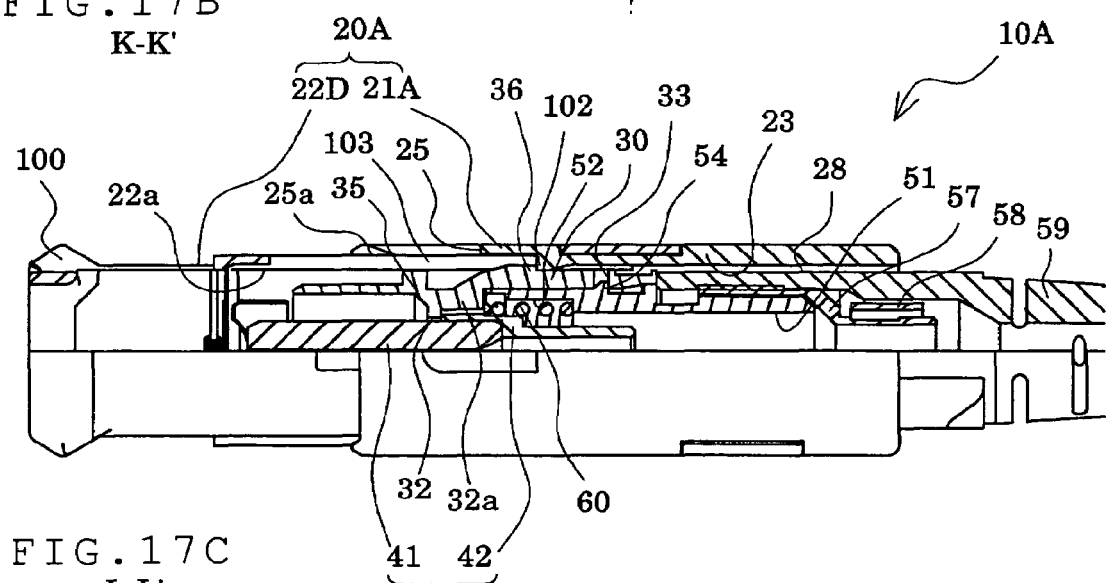
Figure 17C:
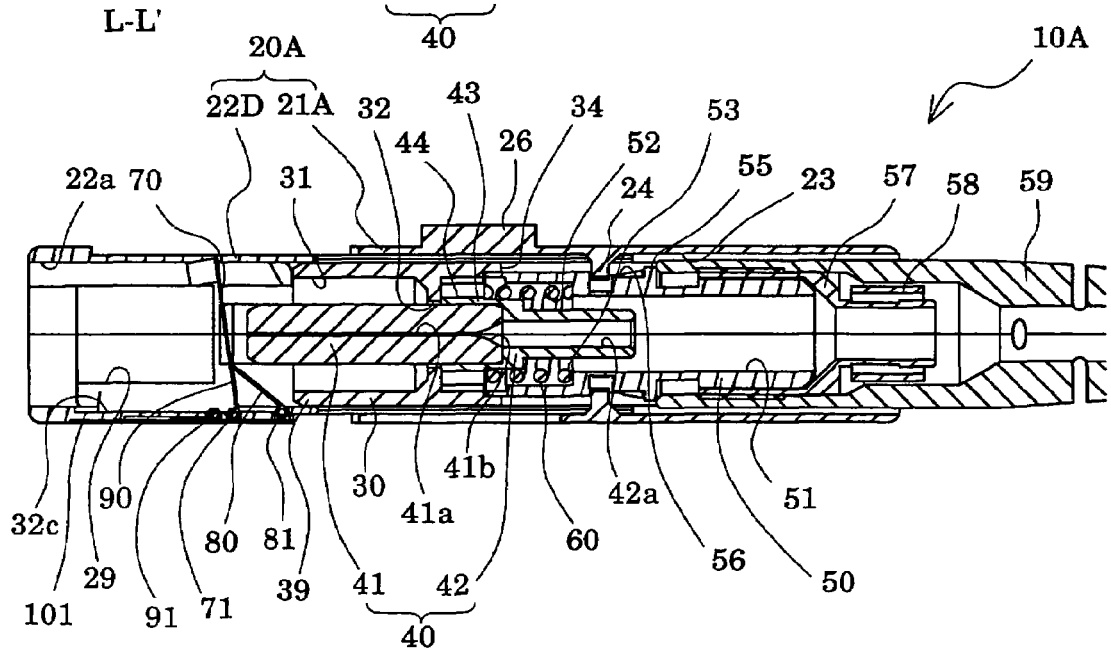
Figure 18A:
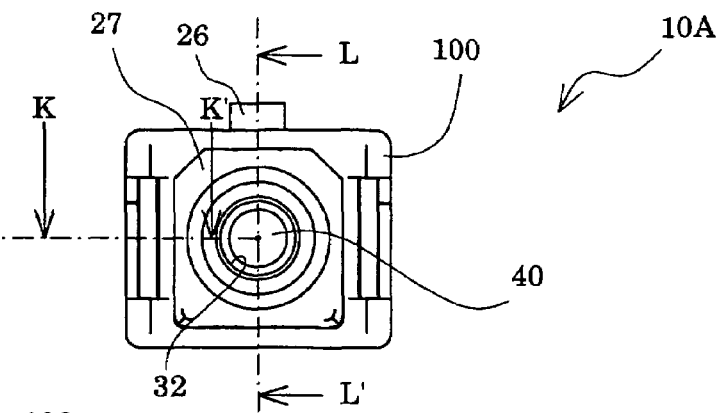
FIG. 18 is a cross-sectional view of a main part of an optical connector plug according to a fifth embodiment of the invention.
Figure 18B:
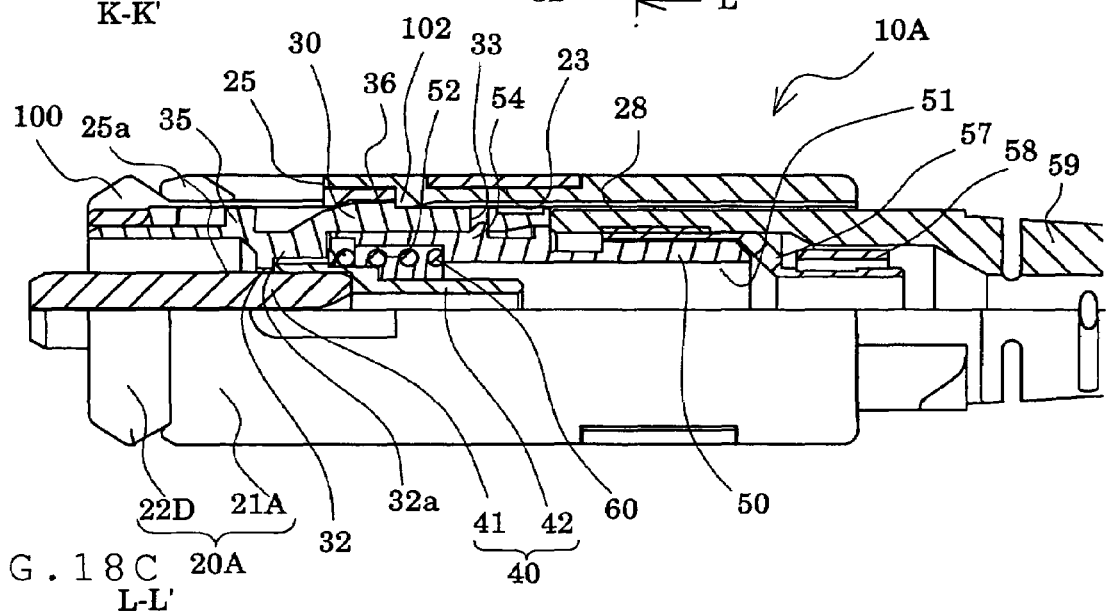
Figure 18C:
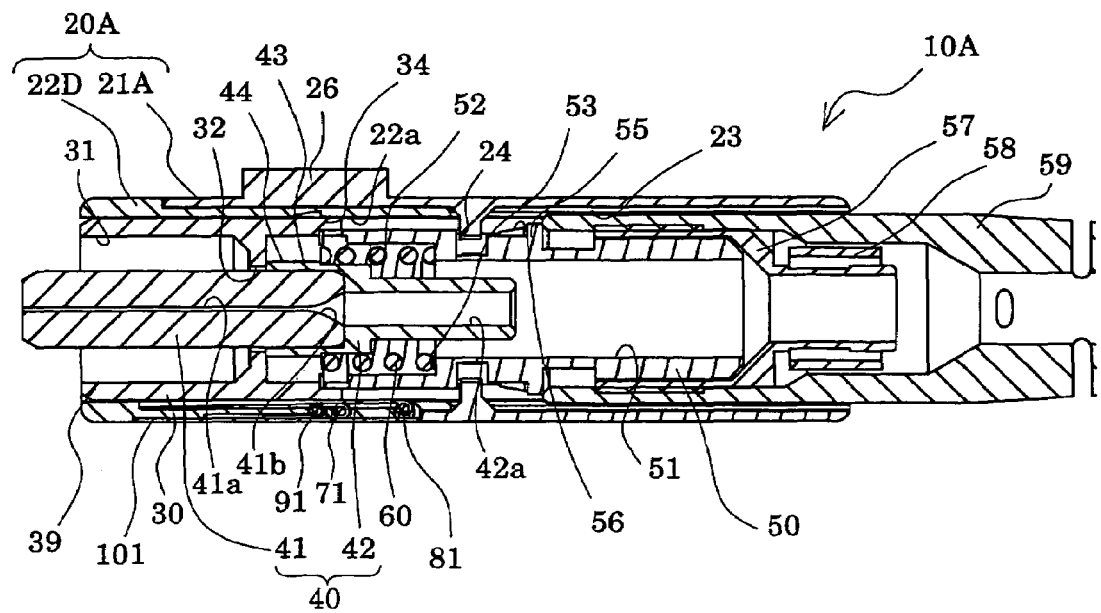
Figure 19:
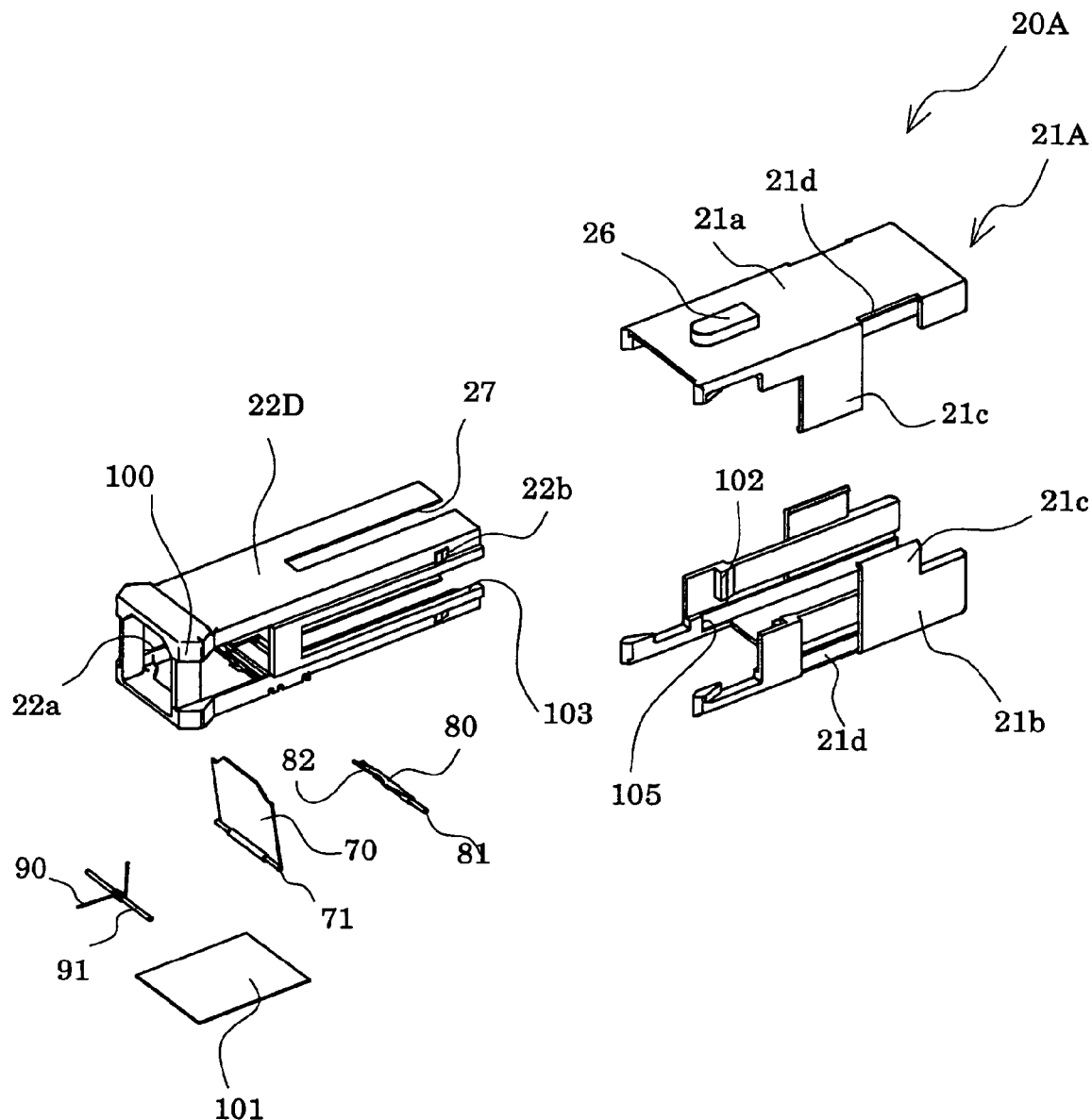
FIG. 19 is an exploded perspective view of a grip member according to a fifth embodiment of the invention.

FIG. 16 is a perspective view of an optical connector plug according to a fifth embodiment of the invention, FIGS. 17 and 18 are front views of the optical connector plug, and cross-sectional views of the line K–K' and the line L–L', and FIG. 19 is an exploded perspective view of a grip member. In these figures, the same elements as in the above-mentioned embodiments are denoted by the same reference numerals, and detailed explanation thereof will be omitted.

As shown in these figures, an optical connector plug 10A according to this embodiment has a grip member 20A within which the plug frame 30, the ferrule 40, the stop ring 50, etc. are supported. The grip member 20A is composed of an outer barrel 21A and an inner barrel 22D.

The outer barrel 21A is not provided with the pressing plate 28, but is provided with a pressing engagement projection 102 engaged with the pressing projection 36 of the plug frame 30 of the supporting hole 23 in a region opposite to the pressing projection 36. As the pressing engagement projection 102 contacts with the rear portion of the pressing projection 36 of the plug frame 30, the movement of the pressing engagement projection 102 to the rear portion of the plug frame 30 is restricted.

In addition, the inner barrel 22D is provided with a pressing insertion hole 103, which is cut off from the rear portion, in a region opposite to the pressing engagement projection 102 of the outer barrel 21A. The pressing insertion hole 103 serves to make the grip member 20 into the extension state and the reduction state under a state where the pressing projection 36 of the plug frame 30 is engaged with the pressing engagement projection 102.

With this configuration, in the same way as in the above described embodiments, if only the outer barrel 21A is grasped and pushed into the optical connector adapter 110 for coupling between the optical connector plug and the optical connector adapter 110, the shield plate 70 is moved up to the non-shield position to expose the leading end of the ferrule 40, and accordingly, the optical connector plug can be easily and reliably coupled to the optical connector adapter 110. In addition, when the optical connector plug is decoupled from the optical connector adapter 110, if only the outer barrel 21A is grasped and drawn out of the optical connector adapter 110, the shield plate 70 is moved up to the shield position to shield the leading end of the ferrule 40, and accordingly, light can be prevented from being emitted from the leading end, thereby raising the safety of the optical connector plug 10.

In addition, in this embodiment, although the outer barrel 21A is composed of the top and bottom members 21a and 21b, which are separated vertically, in the same way as the outer barrel 21 in the above-mentioned first embodiment, it is not provided with the pressing plate 28. Accordingly, the outer barrel 21A may be integrally formed by molding, for example, without being formed of the top and bottom members 21a and 21b which are separated from each other. This may also allow an easy assembly of the optical connector and reduce product costs. Of course, in the first to fourth embodiments as described above, the outer barrel 21 may be integrally formed by molding, for example.

Sixth Embodiment

Figure 20A:
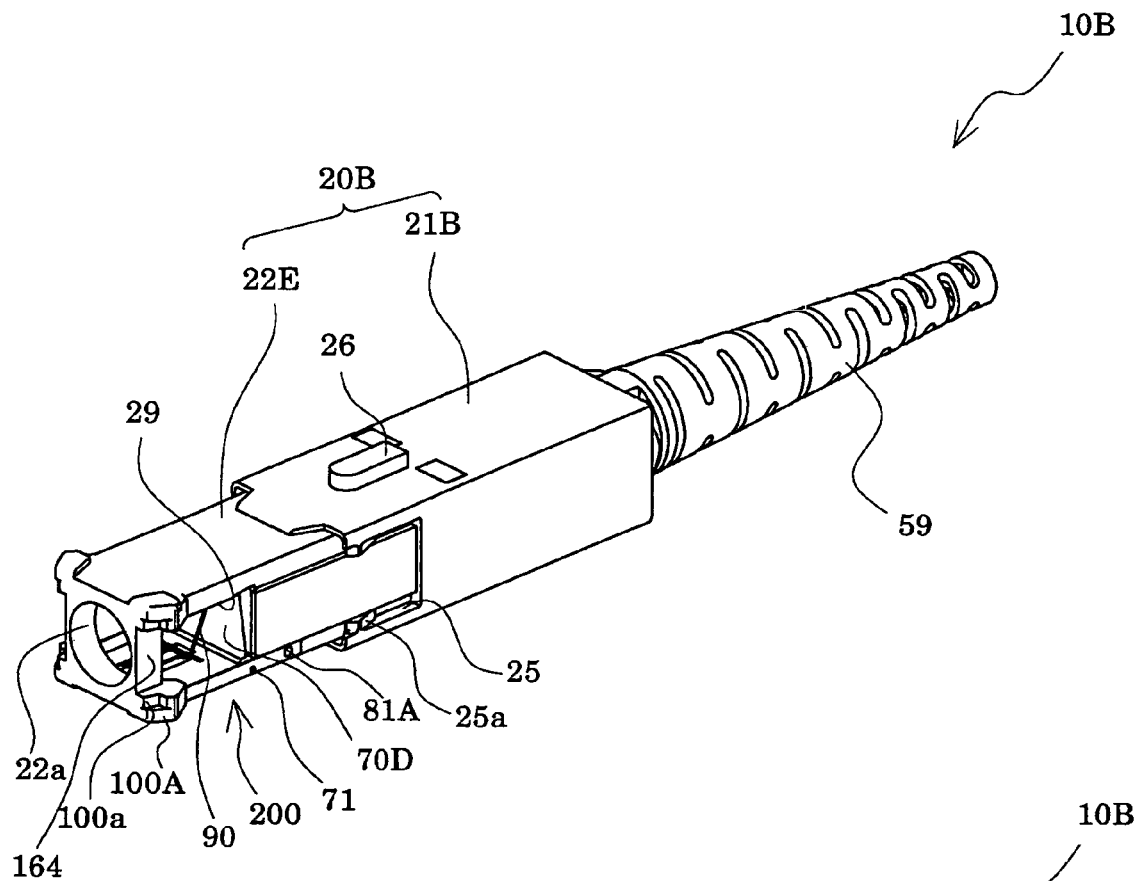
FIG. 20 is a perspective view of an optical connector plug according to a sixth embodiment of the invention.
Figure 20B:
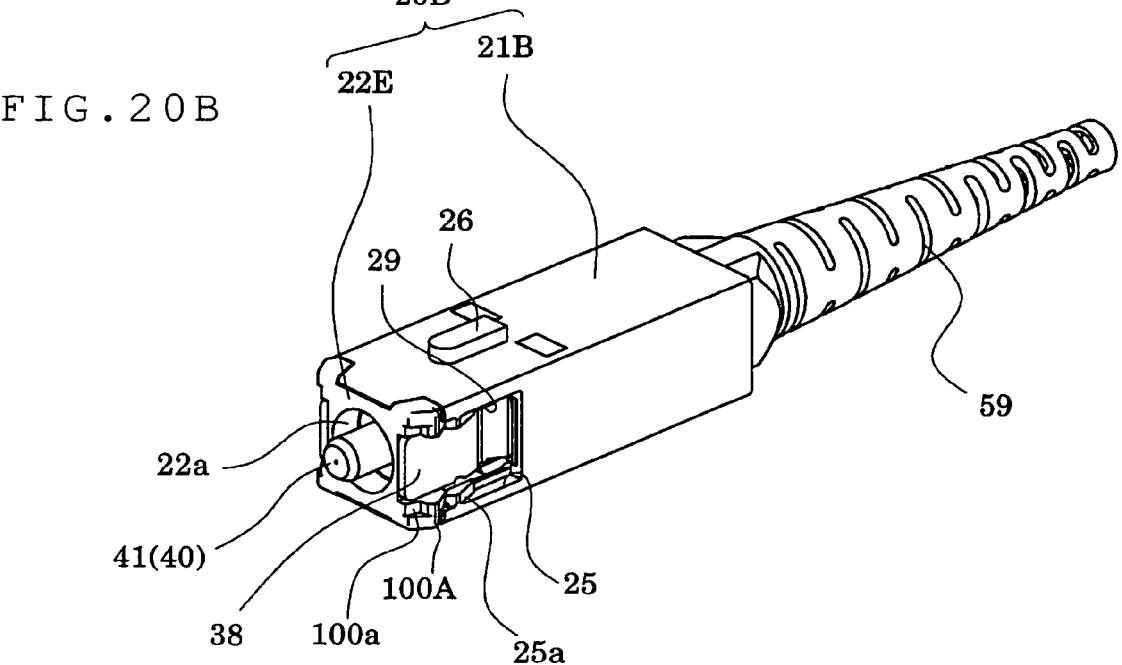
Figure 21A:
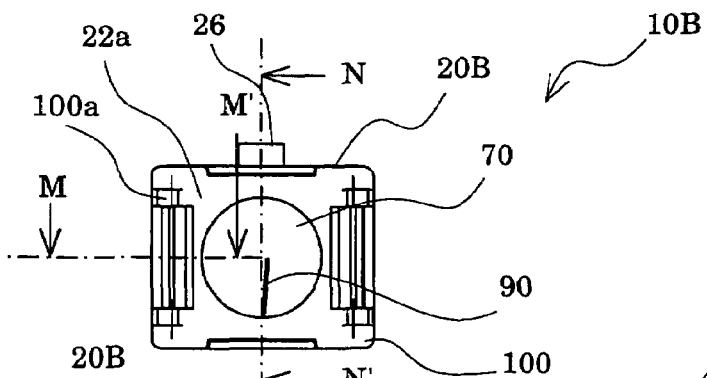
FIG. 21 is a front view and a cross-sectional view of a main part of an optical connector plug according to a sixth embodiment of the invention.
Figure 21B:
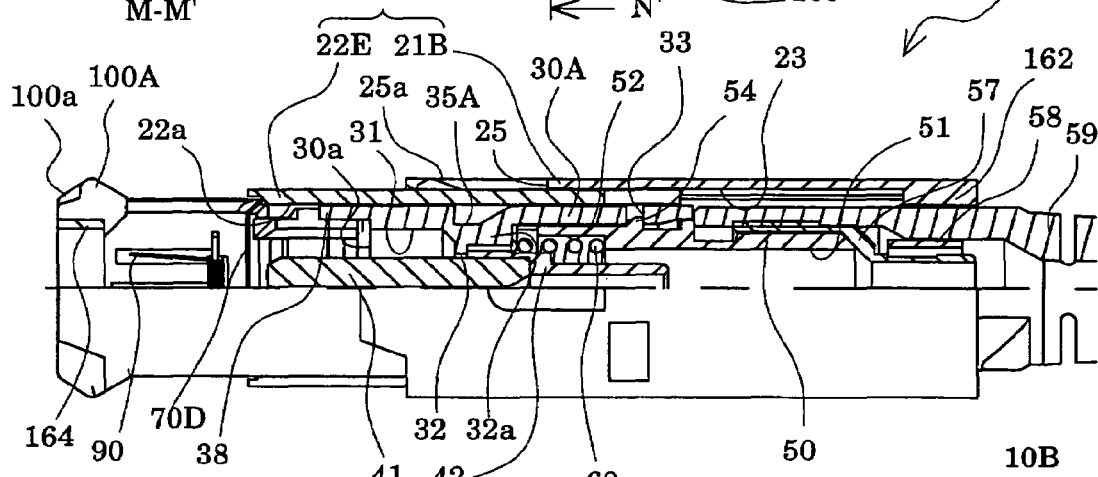
Figure 21C:
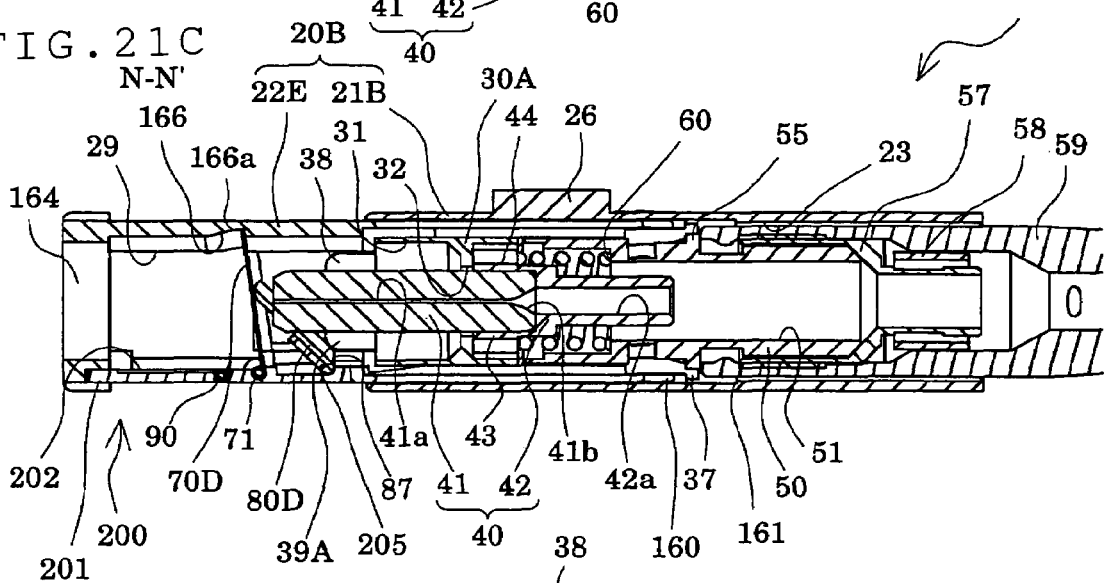
Figure 21D:
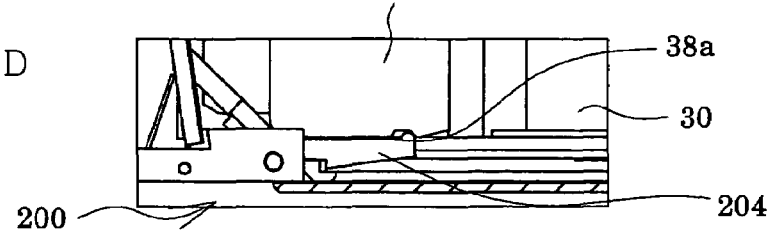
Figure 22A:
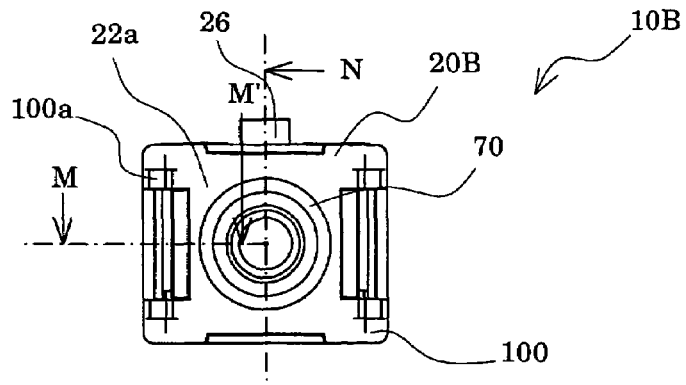
FIG. 22 is a front view and a cross-sectional view of a main part of an optical connector plug according to a sixth embodiment of the invention.
Figure 22B:
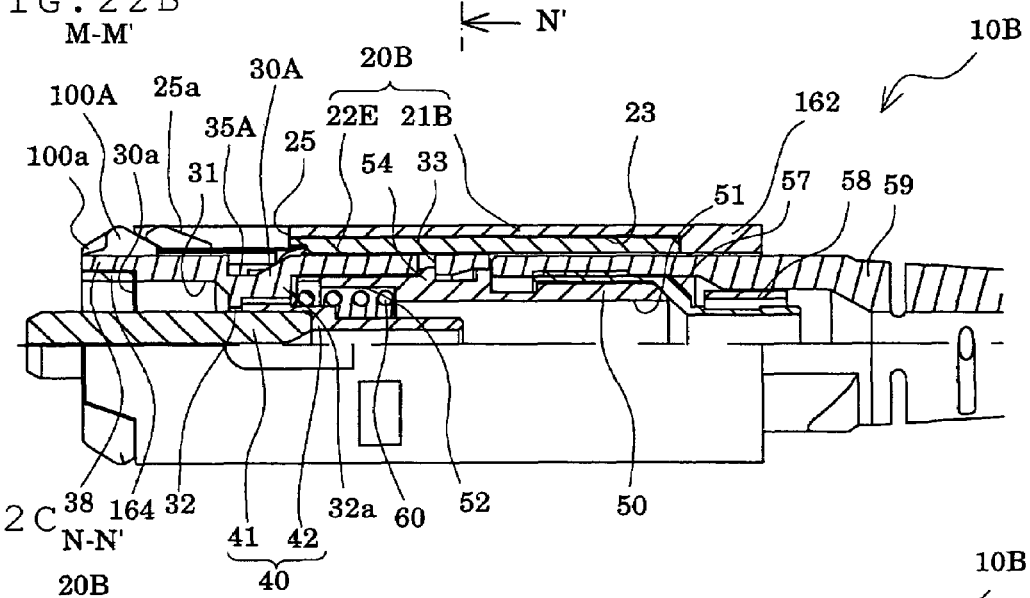
Figure 22C:
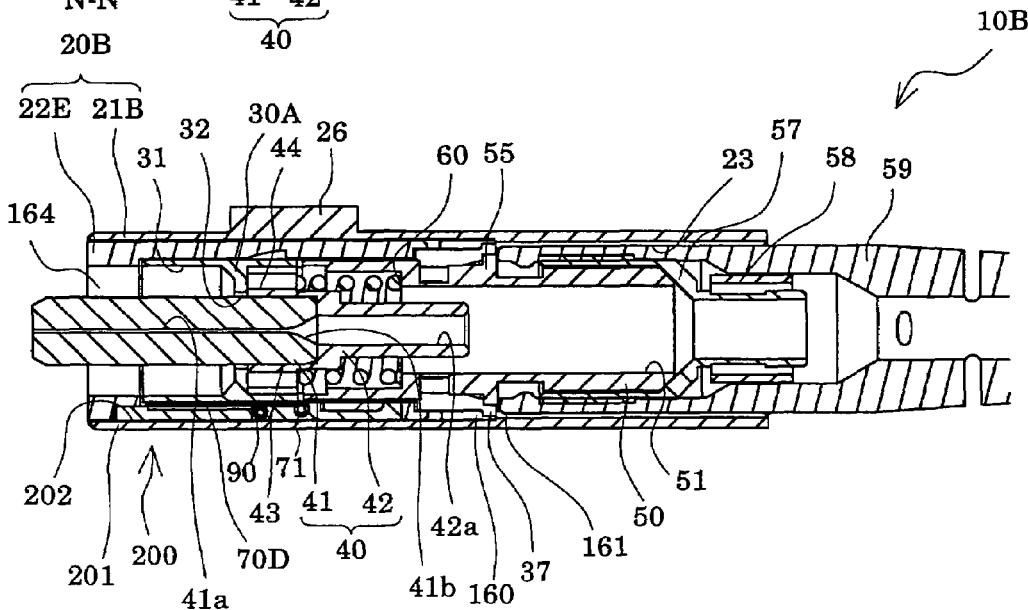
Figure 23A:
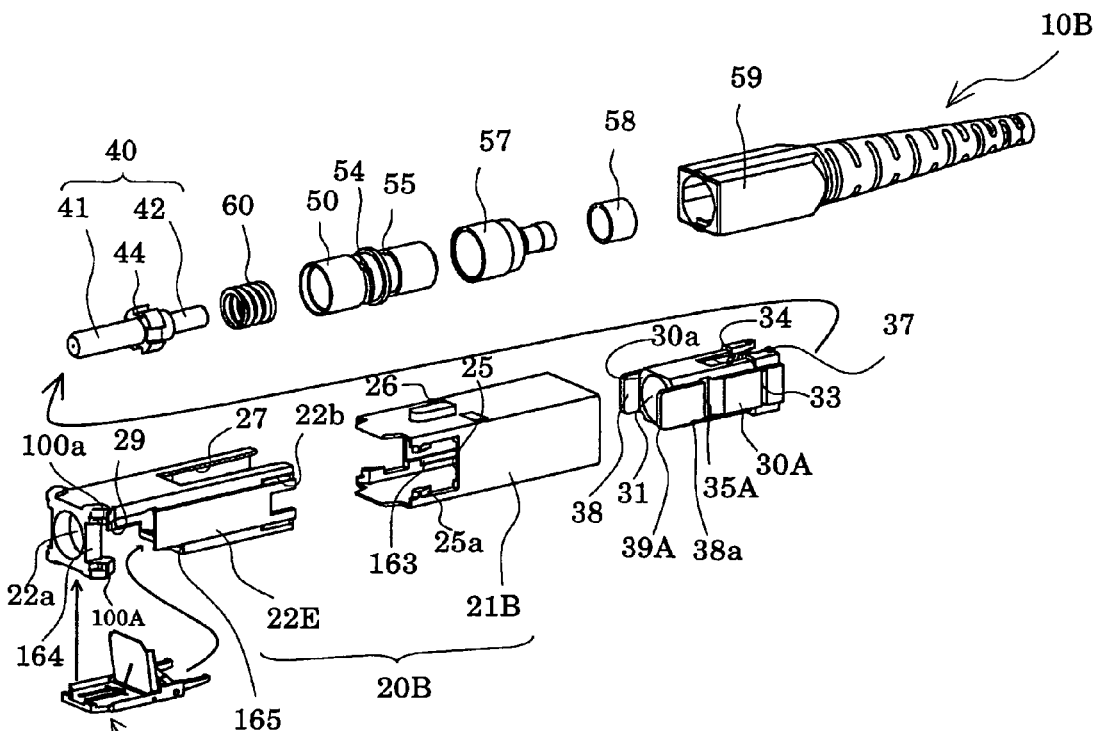
FIG. 23 is an exploded perspective view of an optical connector plug according to a sixth embodiment of the invention.
Figure 23B:
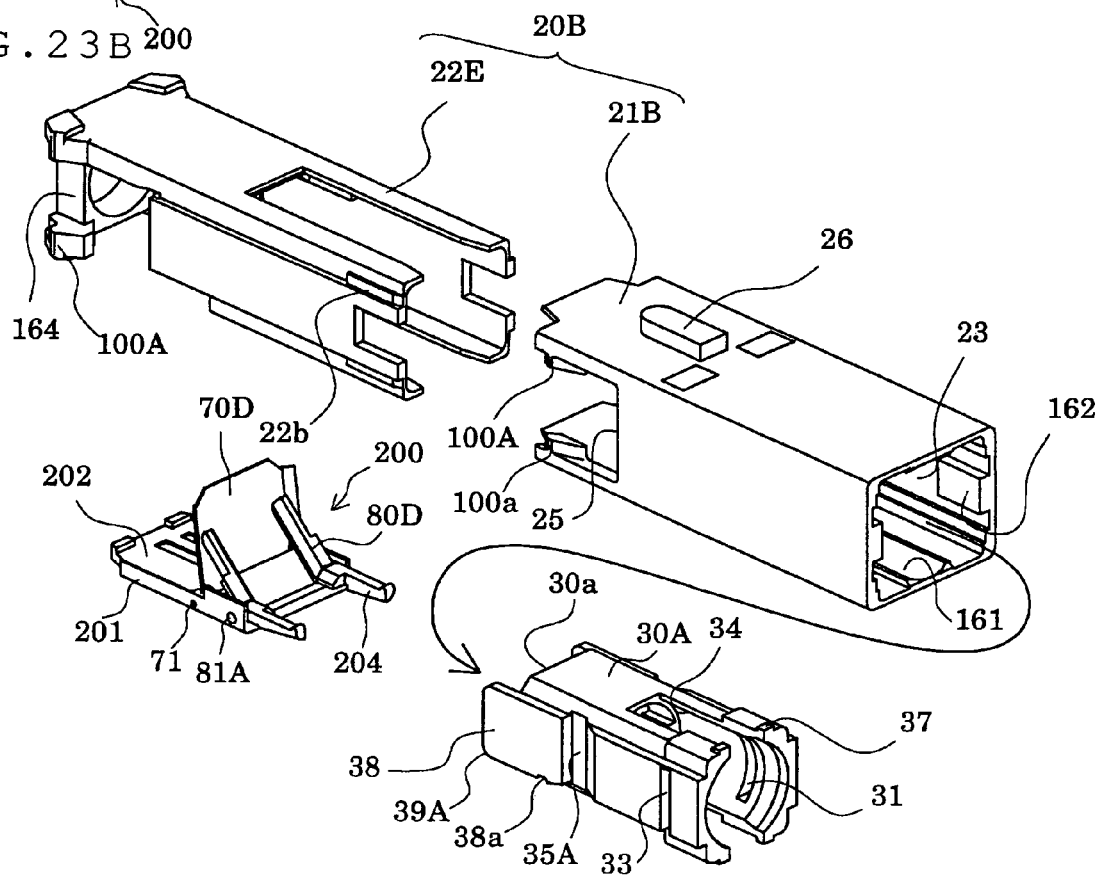

FIG. 20 is a perspective view of an optical connector plug according to a sixth embodiment of the invention, FIGS. 21 and 22 are front views of the optical connector plug, cross-sectional views of the line M–M' and the line N–N', and cross-sectional views of main parts, and FIG. 23 is an exploded perspective view of the optical connector plug. In these figures, the same elements as in the above-mentioned embodiments are denoted by the same reference numerals, and detailed explanation thereof will be omitted.

As shown in FIGS. 20 to 23, an optical connector plug 10B according to this embodiment includes a grip member 20B, a plug frame 30A, a ferrule 40, a stop ring 50, a biasing spring 60, and a shield plate assembly 200 having a shield plate 70D and an action plate 80D.

The plug frame 30A has a shape of a hollow rectangular pillar and is provided with a ferrule insertion hole 31 penetrated along a longitudinal direction. In addition, the ferrule insertion hole 31 is provided with a ferrule projecting hole 32 for projecting only the leading end of the barrel-shaped body 41 for use of ferrule at the leading end of the ferrule insertion hole 31. A key way projection 32a engaged with a key way 44 of the ferrule 40 is provided in the rear portion of the ferrule projecting hole 32.

In addition, the plug frame 30A is provided with an engagement hole 33 engaged with an engagement projection 54 of the stop ring 50, and a cut portion 34.

In addition, a projection 37 projecting in the radius direction of the ferrule 40 is provided in the rear portion of a face in which the cut portion 34 of the plug frame 30A is provided. As the projection 37 projects between a first restriction projection 160 and a second restriction projection 161 of the outer barrel 22B of the grip member 20B, which will be described in detail later, the plug frame 30A is movably supported by a predetermined amount in the axial direction with respect to the grip member 20B. In other words, the plug frame 30A according to this embodiment is not provided with the engagement portion 35 and the pressing projection 36, which are provided in the plug frame 30 of the first embodiment.

In addition, a pair of pressing portions 38 of a plate shape projecting from the leading end of the plug frame 30A by the predetermined amount is provided in two opposite faces of the circumference of the plug frame 30A. In addition, an engagement portion 35A of a groove shape engaged with the same engagement click 135 of the optical connector adapter 110 as in the first embodiment is provided in the rear portion of the pressing portion 38.

The pressing portion 38 serves to release the contact state of the grip member 20B with the engagement click 135 of the optical connector adapter 110 at the leading end and engage the engagement click 135 with the engagement portion 35A when the optical connector plug 10 is coupled with the optical connector adapter 110, which will be described in detail later.

In addition, as shown in FIGS. 21D and 23, a resistant concave portion 38a of a groove shape is provided at the bottom of the pressing portion 38. As the resistant concave portion 38a is engaged with a resistant click 204 of the shield plate assembly 200 fixed in an inner barrel 21E which will be described in detail later, in the extension state of the grip member 20B, a predetermined resistance is generated when an inner barrel 22E and an outer barrel 21B are changed from the extension state to the reduction state.

The grip member 20B is composed of the outer barrel 21B having a hollow rectangular pillar shape, and the inner barrel 22E having a hollow rectangular pillar shape slidably accommodated in the axial direction within the outer barrel 21B. The grip member 20B has the reduction state where the inner barrel 22E is accommodated in the outer barrel 21B and the extension state where the inner barrel 22E projects forwardly, in the same way as in the first embodiment.

Figure 24A:
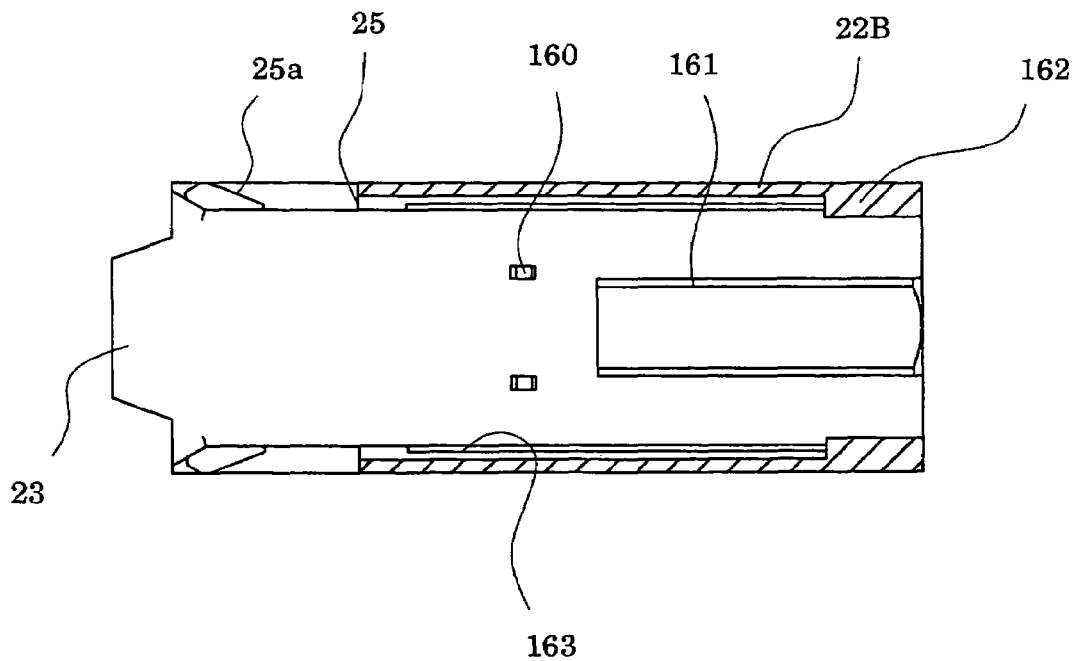
FIG. 24 is a front view and a cross-sectional view of an outer barrel according to a sixth embodiment of the invention.
Figure 24B:
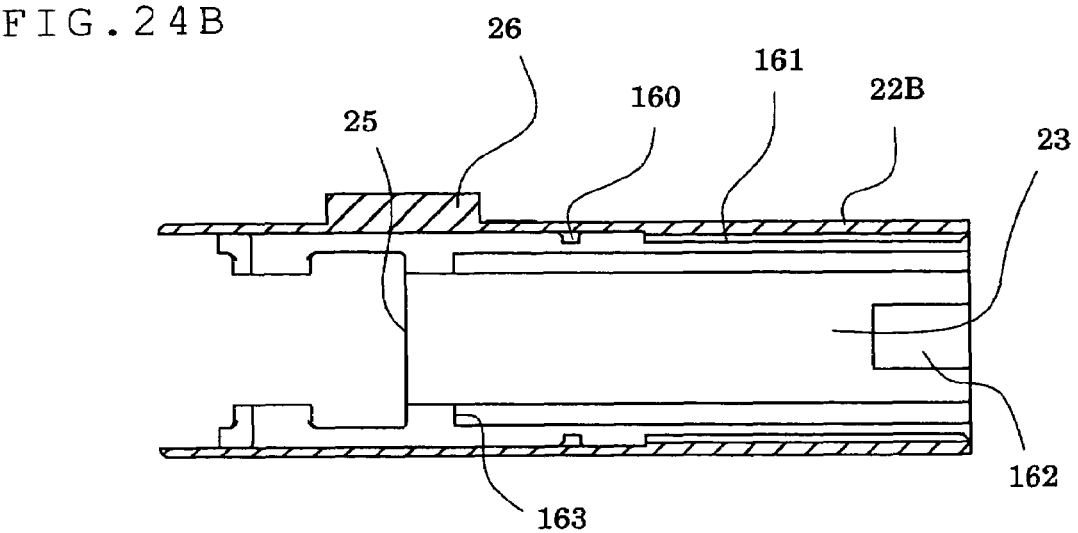

The outer barrel 21B is composed of one member integrally formed by molding, for example. In addition, the outer barrel 21B is provided with a supporting hole 23 in which the plug frame 30A is supported. The plug frame 30A in the supporting hole 23 is movably supported by a predetermined amount in the axial direction. In more detail, as shown in FIG. 24, the first restriction projection 160 and the second restriction projection 161 are provided at a predetermined interval within the supporting hole 23, and the plug frame 30A is movably supported by an interval between the first restriction projection 160 and the second restriction projection 161 as the projection 37 of the plug frame 30A projects between the first restriction projection 160 and the second restriction projection 161.

In addition, the amount of movement of the plug frame 30A with respect to the outer barrel 21B is not particularly limited as long as the optical connector plug 10B can be disengaged from the optical connector adapter 110. For example, in the same way as in the first embodiment, in the SC-type optical connector adapter, the plug frame 30A may be slid by about 2 mm with respect to the outer barrel 21A.

In addition, the outer barrel 21B is provided with a first exposure hole 25, an engagement release portion 25a, and a key 26, in the same way as in the first embodiment.

In addition, as shown in FIGS. 21B and 23, a contact projection 162 contacting with a boot 59 and the rear portion of the inner barrel 22E is provided in tow opposite faces at the rear portion of the supporting hole 23 of the outer barrel 21B. In addition, since a predetermined gap is provided to slide the inner barrel 22E between the outer barrel 21B and the plug frame 30A when the grip member 20B is in the extension state, the outer barrel 21B is bent due to this gap when the outer barrel 21B is grasped. On this account, by providing the contact projection 162 contacting with the boot 59 in the outer barrel 21B, the outer barrel 21B is prevented from being bent and is easily grasped.

In addition, when the grip member 20B is coupled to the optical connector adapter 110 in the reduction state and the outer barrel 21B is again pushed into the optical connector adapter 110, there is a possibility that the projection 37 is disengaged from the second restriction projection 161 because the outer barrel 21B is engaged with the plug frame 30A by only the projection 37 and the second restriction projection 161 provided in the plug frame 30A. In this way, when the outer barrel 21B is disengaged from the plug frame 30A, since the leading end of the outer barrel 21B has weak hardness due to the first exposure hole 25, the leading end of the outer barrel 21B passes over an inner engagement portion 100A of the inner barrel 22E, which will be described in detail later, which leads to breakage of the outer barrel 21B. On this account, the contact projection 162 contacting with the rear portion of the inner barrel 22E when the grip member 20B is in the reduction state is provided in the outer barrel 21B. This prevents the outer barrel 21B from being more moved to the leading end of the inner barrel 22E than it can be moved in the reduction state. Accordingly, the outer barrel 21B can be prevented from being broken.

On the other hand, as shown in FIGS. 20 to 23, an insertion hole 22a in which the plug frame 30A is slid along the axial direction is provided in the inner barrel 22E slidably provided within the outer barrel 21B. In addition, an engagement slit 27 for communicating the insertion hole 22a to the outside is provided at a position opposite to the first restriction projection 160 and the second restriction projection 161 of the outer barrel 21A in the rear portion of the inner barrel 22E. The projection 37 of the plug frame 30 projects between the first restriction projection 160 and the second restriction projection 161 by the engagement slit 27 even when the inner barrel 22E is accommodated in the outer barrel 21B.

In addition, a protruding disengagement prevention projection 22b is provided on the circumference of the rear portion side of the inner barrel 22E. Movement of the disengagement prevention projection 22b in a disengagement direction is restricted as it contacts with a stepped portion for disengagement prevention 163 provided in rear portion of the first exposure hole 25 within the supporting hole 23 of the outer barrel 21B. In addition, the disengagement prevention projection 22b has a taper shape whose thickness becomes small gradually toward the rear portion of the inner barrel 22E. When the outer barrel 21B and the inner barrel 22E are assembled together, the disengagement prevention projection 22b is accommodated beyond the stepped portion for disengagement prevention 163 of the outer barrel 21B by inserting the inner barrel 22E in the outer barrel 21B. In addition, a second exposure hole 29 for exposing the engagement portion 35A of the plug frame 30A to the outside in communication with the first exposure hole 25 of the outer barrel 21B when the grip member 20B is in the reduction state is provided at the leading end side of the inner barrel 22E. In other words, the grip member 20B is engaged with the engagement click 135 of the optical connector adapter 110 as the engagement portion 35A of the plug frame 30A is exposed by the first and second exposure holes 25 and 29 in the reduction state where the inner barrel 22E is accommodated in the outer barrel 21B.

In addition, two post portions 164 remaining by providing the second exposure hole 29 are provided in the inner barrel 22E. These post portions 164 are provided at a position which is located inner than that of the pressing portion 38 of the plug frame 30A when the grip member 20B is in the reduction state. As an end surface 30a of the plug frame 30A contacts with the post portions 164, the inner barrel 22E is pressed by the plug frame 30A in the reduction state when the outer barrel 22B is grasped and coupled to the optical connector adapter 110.

In addition, the inner barrel engagement portion 100A engaged with the engagement click 135 of the optical connector adapter 110 is provided at a leading end of a face in which the second exposure hole 29 of the inner barrel 22E is provided. A stepped contact portion 100a is provided at a leading end of the inner barrel engagement portion 100A. The contact portion 100a serves to prevent the engagement click 135 from passing over the inner barrel engagement portion 100A by contacting the optical connector plug 10B with the engagement click 135 of the optical connector adapter 110 when the optical connector plug 10B is inserted in the optical connector adapter 110, which will be described in detail later.

In addition, a fixation hole 165 for communicating the insertion hole 25 to the outside is provided at the bottom of the inner barrel 22E. A shield plate assembly 200 having the shield plate 70D and the action plate 80D is fixed at the fixation hole 165. In addition, a stop concave portion 166 contacting with the leading end of the shield plate 70D is provided at a side opposite to the fixation hole 165 of the insertion hole 25. The stop concave portion 166 has a leading end having a curve whose depth becomes small gradually and a rear portion having a stop face 166a, forming a step between the insertion hole and the stop face 166a. In addition, the shield plate 70D is positioned in an inclined state as the leading end of the shield plate 70D contacts with the stop face 166a of the stop concave portion 166.

Figure 25:
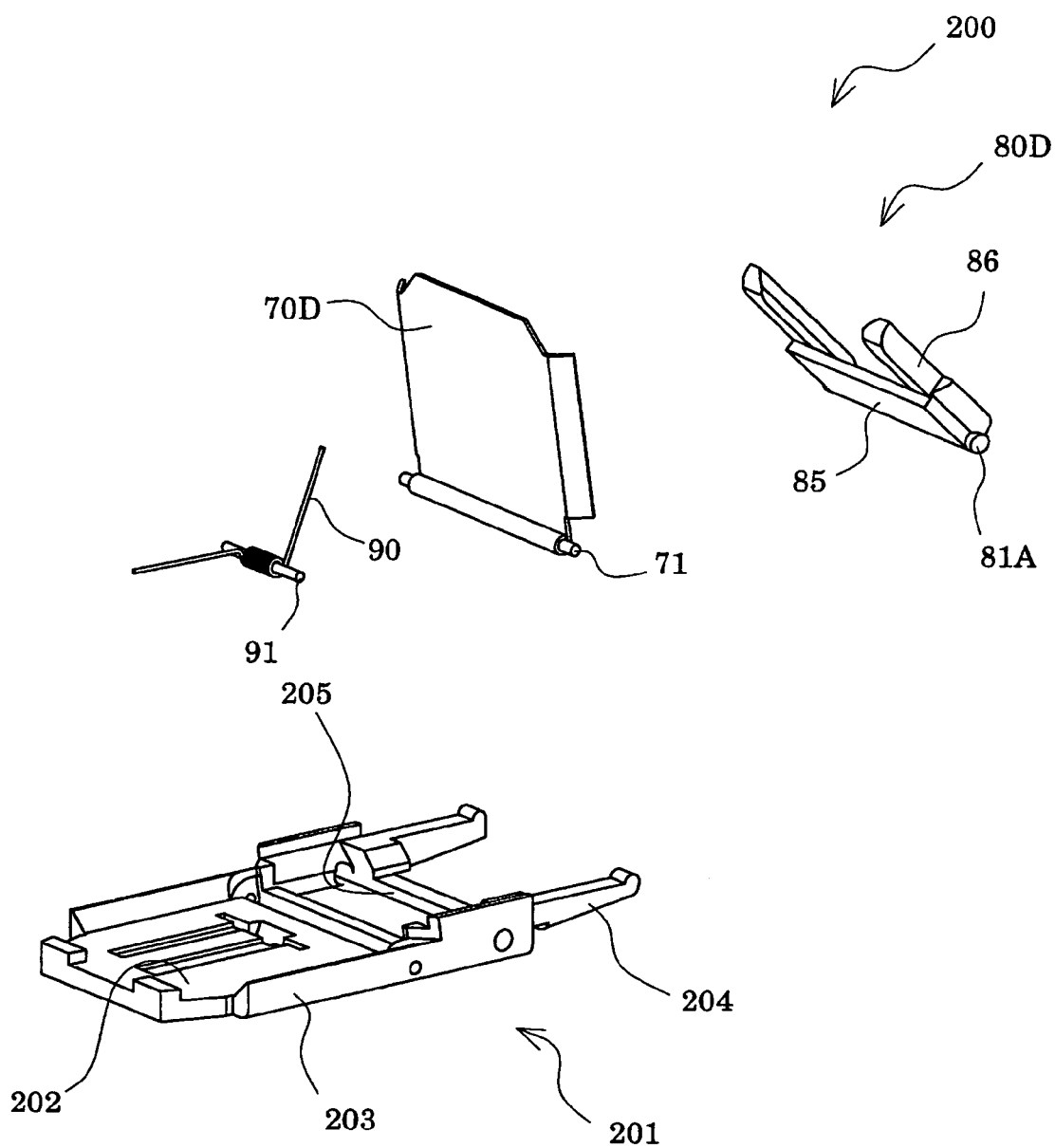
FIG. 25 is an exploded perspective view of a shielding plate assembly according to a sixth embodiment of the invention.

Hereinafter, the shield plate assembly 200 will be described in detail. FIG. 25 is an exploded perspective view of the shield plate assembly.

As shown in FIG. 25, the shield plate assembly 200 is composed of a shield plate frame 201, a shield plate 70D and an action plate 80D, which are rotatably supported to the shield plate frame 201 and a biasing supporting means 90 for biasing the shield plate 70D and the action plate 80D for their positioning.

The shield plate frame 201 is provided with a plate-shaped accommodating portion 202 in which the shield plate 70D and the action plate 80D are accommodated such that the shield plate 70D and the action plate 80D do not restrict the movement of the plug frame 30A when the shield plate 70D and the action plate 80D are in the non-shield position. The accommodating portion 202 has a thin thickness as compared to its both sides. Also, the both sides thicker than the accommodating portion 202 of the shield plate frame 201 is composed of a frame portion 203 for supporting the shield plate 70D and the action plate 80D at a free slant and increasing hardness of the shield plate frame 201.

In addition, an elastic resistant click portion 204 is provided in the rear portion of the shield plate frame 201. As shown in FIG. 21D, the resistant click portion 204 is provided so as to be engaged with the resistant concave portion 38a of the plug frame 30A when the grip member 20B is in the extension state. In addition, when the grip member 20B is changed from the extension state to the reduction state, the resistant concave portion 38a is separated from the resistant click portion 204 to enter into the reduction state as the resistant click portion 204 is elastically deformed. At this time, a predetermined resistance for elastically deforming the resistant click portion 204 is generated. In this way, by generating the predetermined resistance when the grip member 20B is changed to the reduction state, the grip member 20B can be prevented from going into the reduction state due to vibrations or impacts, and accordingly, light can be prevented from being emitted from the leading end of the optical connector plug 10B.

In addition, the shield plate frame 201 can be formed by molding resin such as plastic. By molding the shield plate frame 201 with resin, the shield plate frame 201 can be easily produced in great quantities with high precision and low costs.

The shield plate 70D has high hardness as it is formed of a plate-shaped member and its both sides are bent. The shield plate 70D is rotatably supported to the shield plate frame 201 via the shield plate shaft 71. In addition, in this embodiment, the shield plate 70D is made of stainless steel.

The action plate 80D is composed of a plate portion 85 and a pair of action plate frame portions 86 having projecting leading ends provided at both sides of the plate portion 85. The action plate frame portions 86 are thicker than the plate portion 85 and increase the hardness of the action plate 80D. In addition, the action plate 80D is integrally provided with an action plate shaft 81A at a base end of the action plate 80D, and is rotatably supported to the frame portion 203 of the shield late frame 201 via the action plate shaft 81A.

The leading ends of the action plate frame portions 86 of the action plate 80D contact with the shield plate 70D and the action plate 80D is inclined to the shield position and the non-shield position along with the shield plate 70D.

In addition, as shown in FIG. 21C, a face at the base end side of the action plate 80D is formed of an inclined restriction face 87, and the inclination of the action plate 80D to the ferrule 40 is restricted as the restriction face 87 contacts with a step 205 formed by the accommodating portion 202 of the shield plate frame 201 when the action plate 80D is inclined to the shield position along with the shield plate 70D. In other words, when the action plate 80D is inclined to the ferrule 40, the action plate 80D contacts with the leading end of the barrel-shaped body 41 for use of ferrule, which may result in occurrence of scratches at the leading end of the barrel-shaped body for ferrule 41. However, in this embodiment, since the inclination of the action plate 80D is restricted by the restriction face 87, scratches can be prevented from occurring at the leading end of the barrel-shaped body for ferrule 41 without any contact of the action plate 80D with the leading end of the barrel-shaped body for ferrule 41.

In addition, in this embodiment, the action plate 80D can be formed by molding resin such as plastic. By molding the action with resin, the action plate 80D can be easily produced in great quantities with high precision and low costs. In addition, the action plate frame 86 is chamfered along the longitudinal direction, and accordingly, when the action plate 80D is accommodated in the accommodating portion 202 along with the shield plate 70D, the action plate 80D can be prevented from contacting with the plug frame 30A, allowing the plug frame 30A to be moved to an optical coupling position.

In addition, the biasing supporting means 90 for biasing the shield plate 70D to the shield position is provided in the accommodating portion 202 of the shield plate frame 201 via a biasing shaft 91, in the same way as in the first embodiment.

Assembling the shield plate frame 201, the shield plate 70D, the action plate 80D and the biasing supporting means 90 in advance can form the shield plate assembly 200. In addition, the shield plate assembly 200 assembled in advance is fixed to the fixation hole 165 of the inner barrel 22E. In this way, by assembling the shield plate assembly 200 in advance and fixing it to the inner barrel 22E, assembly workability can be enhanced, and accordingly, assembly time and assembly costs can be reduced. In addition, the shield plate assembly 200 can be inserted in the fixation hole 165 of the inner barrel 22E and fixed to the fixation hole 165 by means of adhesion using adhesive or welding.

Hereinafter, operation of coupling the optical connector plug 10 to the optical connector adapter will be described in detail. FIGS. 26 to 29 are cross-sectional views illustrating a coupling operation between an optical connector plug 10 and an optical connector adapter, and FIGS. 26B to 29B and 26C to 29C are respectively cross-sectional views of the line O–O' and the line P–P' in FIGS. 26A to 29A.

Figure 26A:
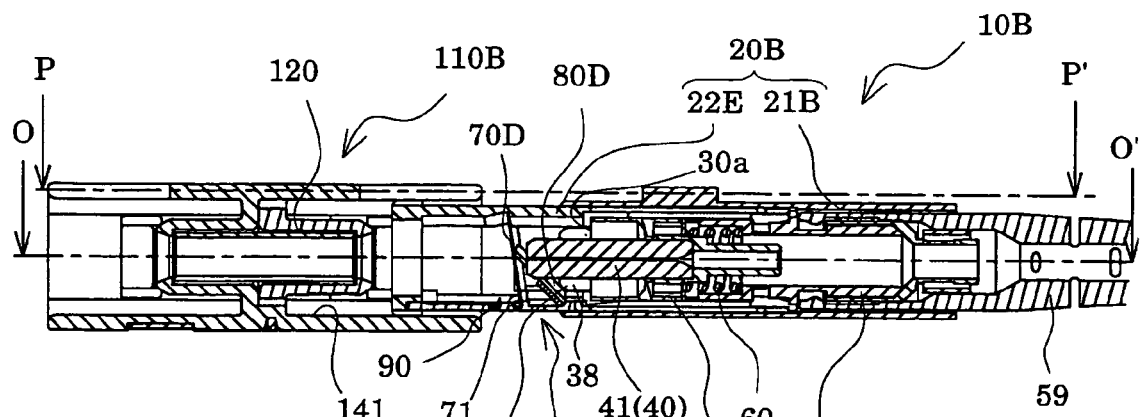
FIG. 26 is a cross-sectional view illustrating a coupling operation between an optical connector plug and an optical connector adapter according to a sixth embodiment of the invention.
Figure 26B:
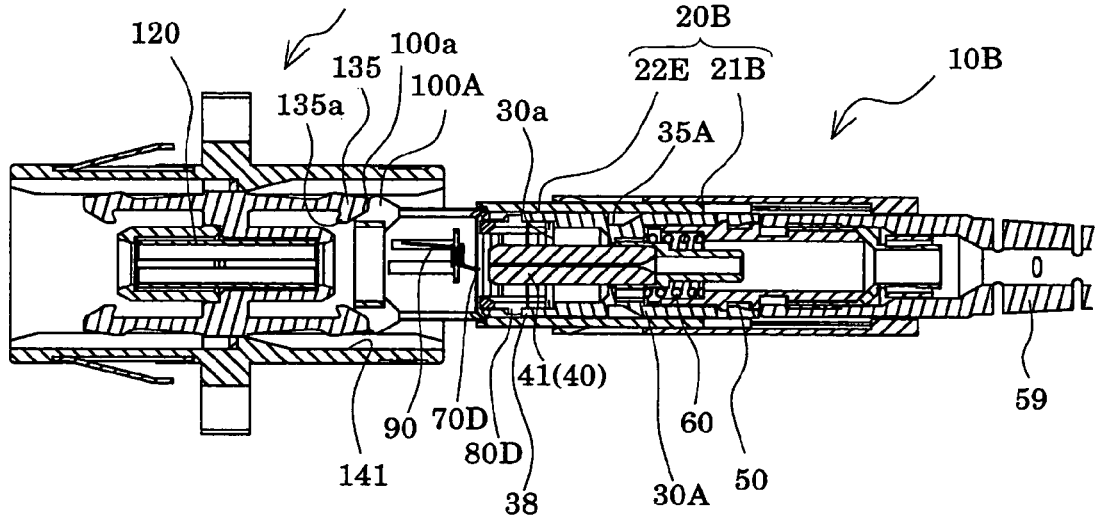
Figure 26C:
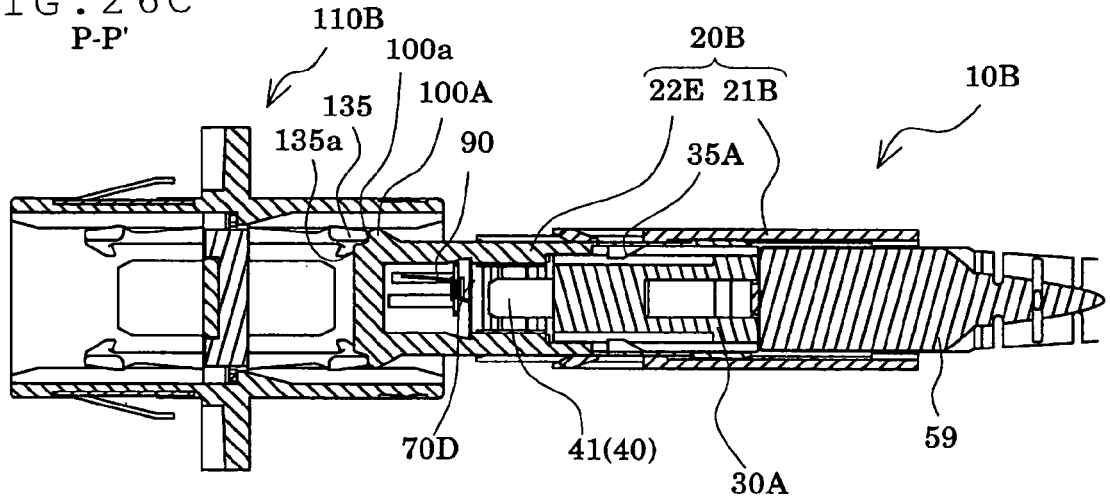

As shown in FIG. 26, under a state where the grip member 20B of the optical connector plug 10 is extended, that is, under a state where the leading end of the ferrule 40 is shielded by the shield plate 70D, the outer barrel 21B is grasped and inserted in the penetrating portion 141 of the optical connector adapter 110. At this time, as shown in FIG. 26B, the contact portion 100a of the inner barrel 22E of the optical connector plug 10 contacts with the leading end of the engagement click 135 of the optical connector adapter 110.

Figure 27A:
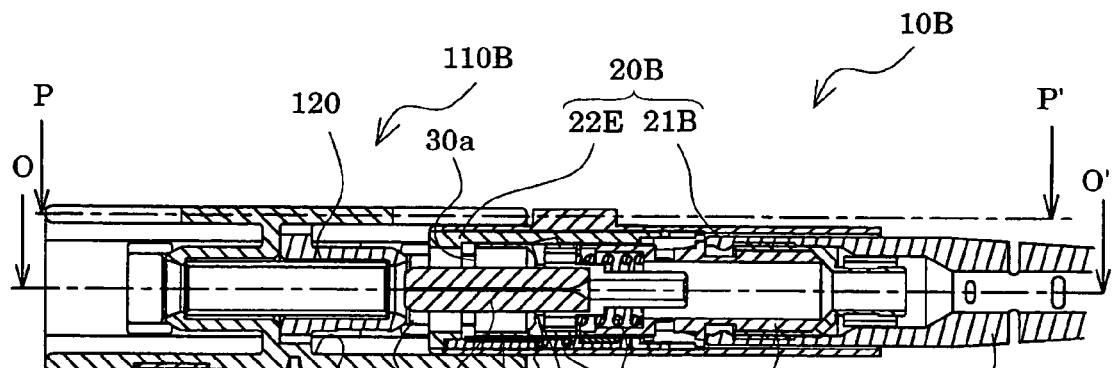
FIG. 27 is a cross-sectional view illustrating a coupling operation between an optical connector plug and an optical connector adapter according to a sixth embodiment of the invention.
Figure 27B:
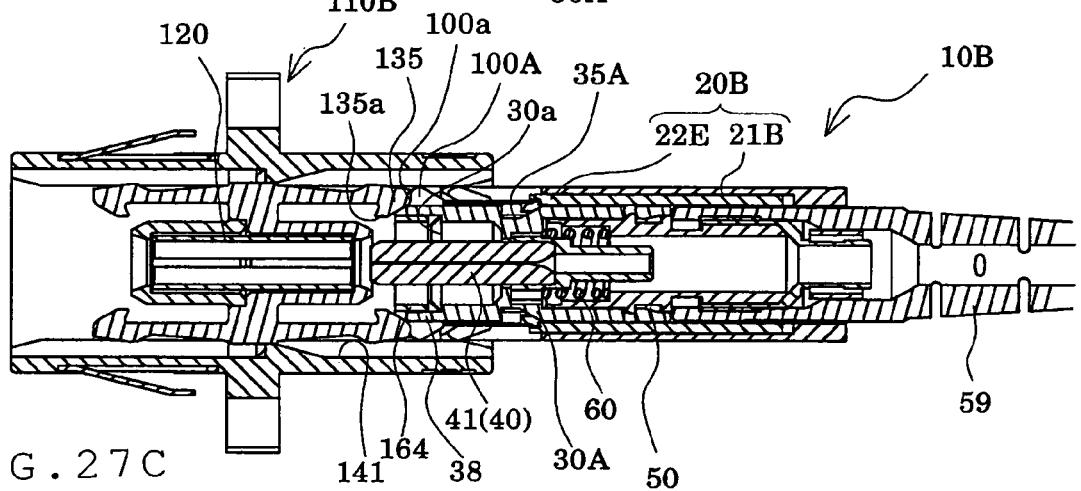
Figure 27C:
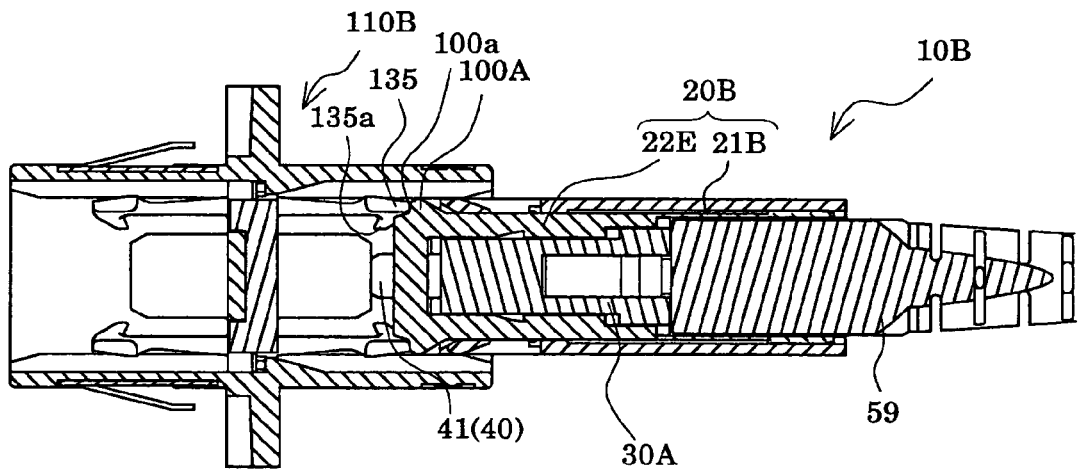

Next, when the outer barrel 21B is again pushed into the optical connector adapter 110, as shown in FIG. 27B, since the contact portion 100a of the inner barrel 22E contacts with the engagement click 135, the outer barrel 21B is moved to the optical connector adapter 110 along with the plug frame 30A. Accordingly, as shown in FIG. 27A, as the leading end edge 39A of the pressing portion 38 of the plug frame 30A pushes down the action plate 80D, the shield plate 70D is inclined to the non-shield position fallen down to one side of a plug frame supporting hole 21. At this time, the shield plate 70D and the action plate 80D are accommodated in the accommodating portion 202 of the shield plate frame 201 and the movement of the plug frame 30A to an optical coupling position is allowed. In addition, when the outer barrel 21B is pushed into the optical connector adapter 110, since the resistant click portion 204 of the shield plate assembly 200 fixed at the inner barrel 22E is engaged with the resistant concave portion 38a of the plug frame 30A, as described above, the outer barrel 21B need be pushed into the optical connector adapter 110 with a certain pressing force to elastically deform the resistant click portion 204 such that the resistant click portion 204 is disengaged from the resistant concave portion 38a.

Figure 28A:
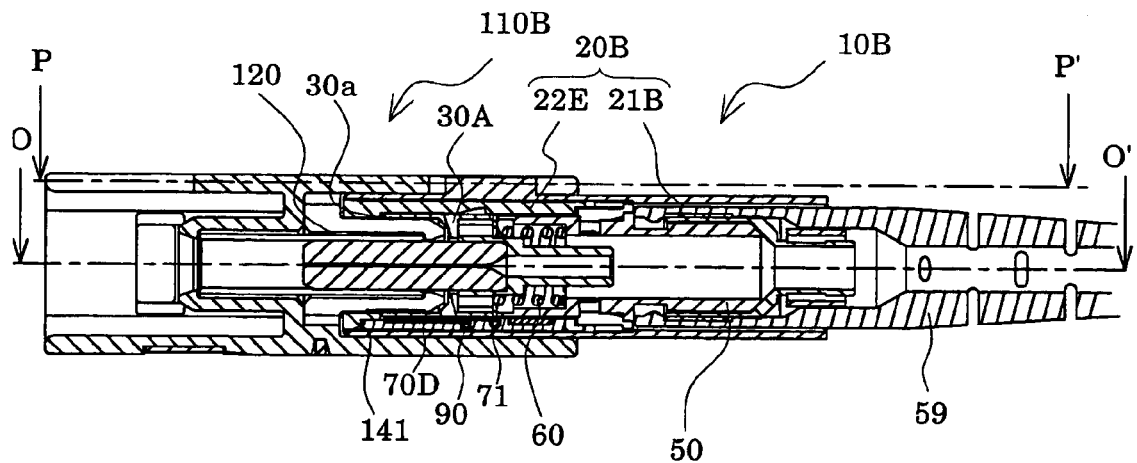
FIG. 28 is a cross-sectional view illustrating a coupling operation between an optical connector plug and an optical connector adapter according to a sixth embodiment of the invention.
Figure 28B:
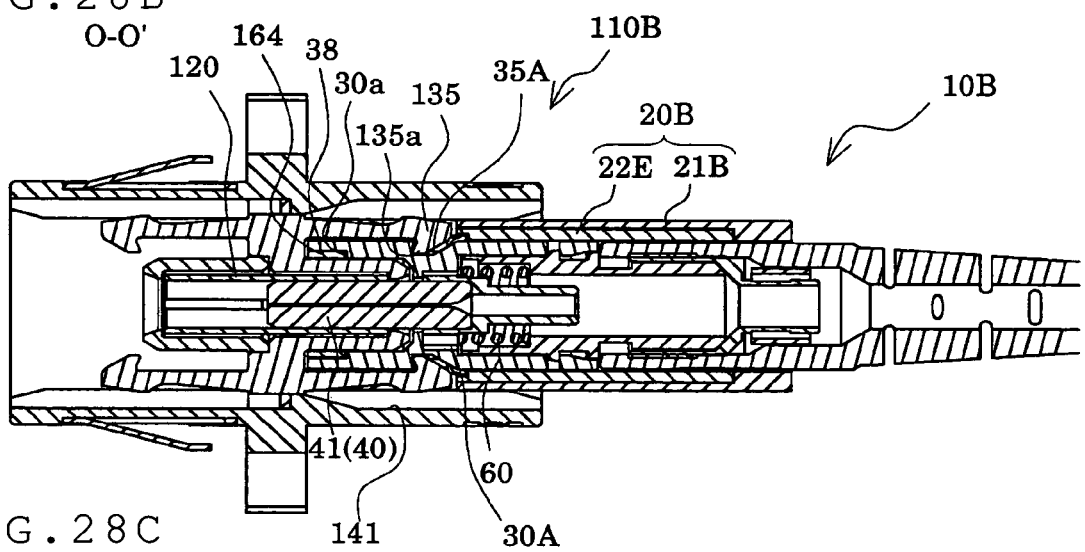
Figure 28C:
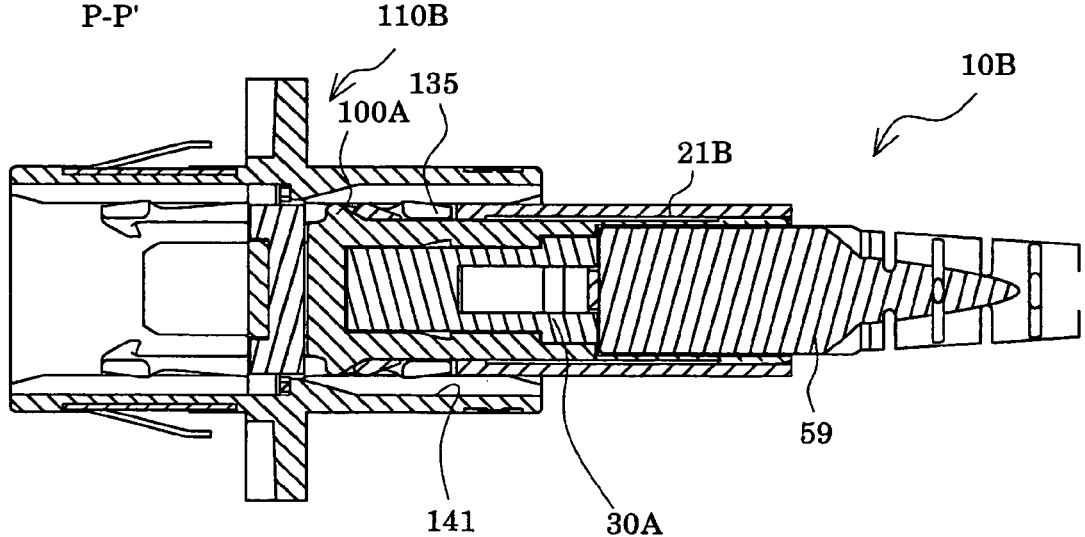

Next, when the outer barrel 21B is again pushed into the optical connector adapter 110, the pressing portion 38 of the plug frame 30A is moved to the optical connector adapter 110 while pushing the engagement click 135. At this time, since the engagement click 135 is pressed by the pressing portion 38, and accordingly, the contact of the engagement click 135 with the contact portion 100a is released, the end face 30a of the plug frame 30A contacts with the post portion 164 of the inner barrel 22E (reduction state) and the inner barrel 22E is moved to the optical connector adapter 110 along with the plug frame 30A. As a result, the engagement click 135 passes over the inner barrel engagement portion 100A of the inner barrel 22E, and the engagement click 135 is engaged with the engagement portion 35A of the plug frame 30A, as shown in FIG. 28B. That is, the optical connector plug 10B can be coupled to the optical connector adapter 110.

Figure 29A:
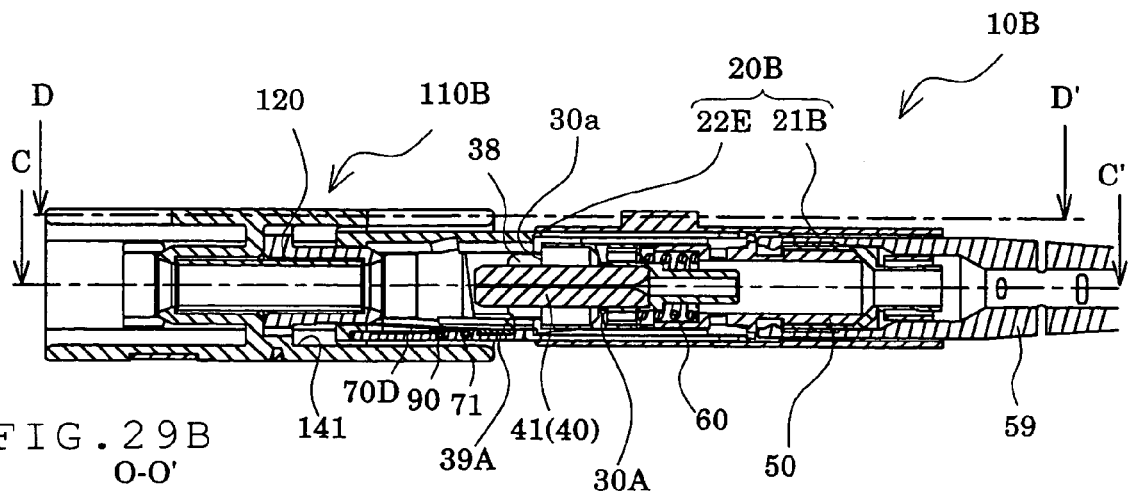
FIG. 29 is a cross-sectional view illustrating a decoupling operation between an optical connector plug and an optical connector adapter according to a sixth embodiment of the invention.
Figure 29B:
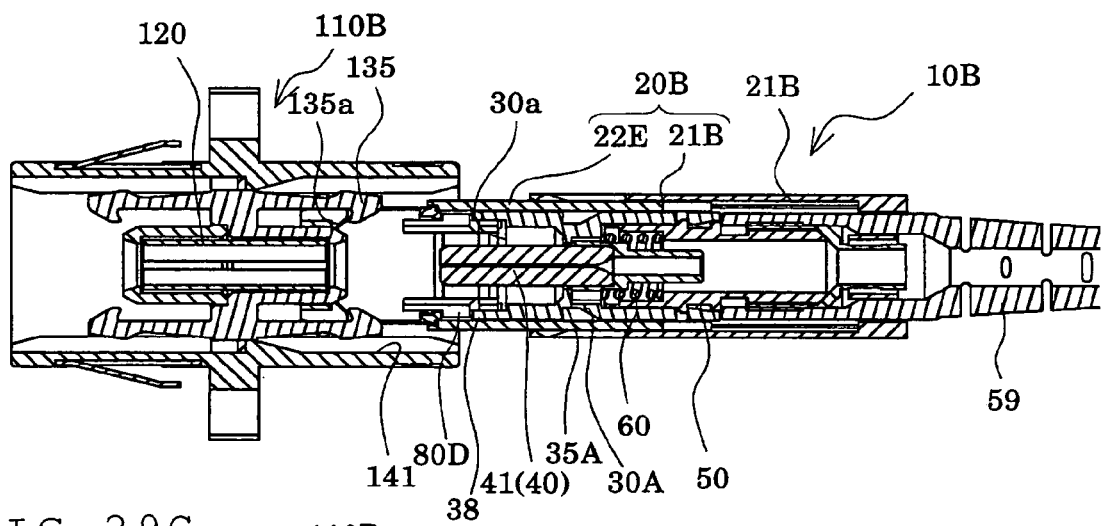
Figure 29C:
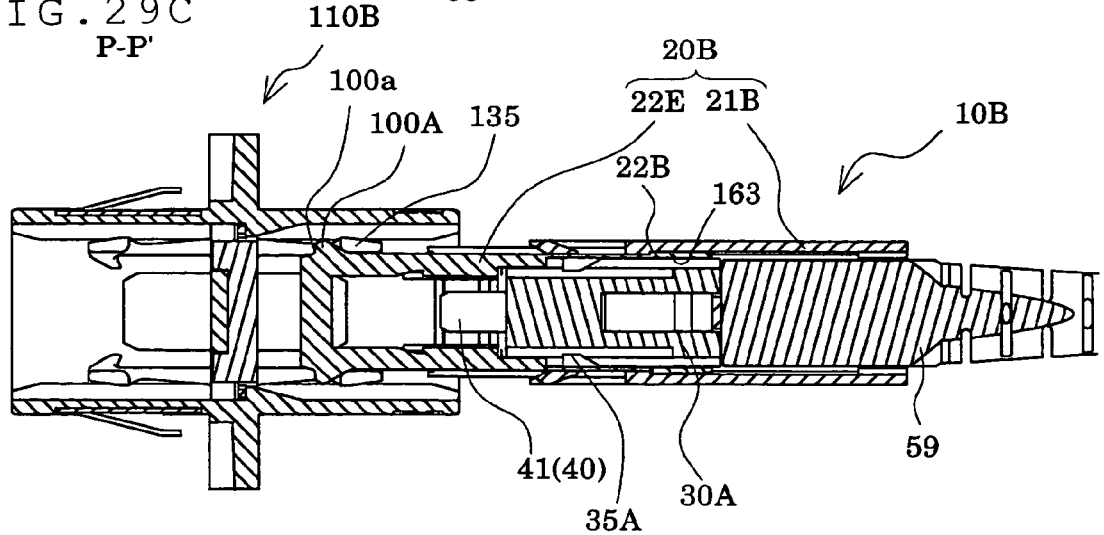

In addition, when the optical connector plug 10B is drawn out of the optical connector adapter 110 in the coupling state, by grasping and drawing out the outer barrel 22A in the same way as in the first embodiment, as shown in FIG. 29, under a state where the grip member 20B is extended, the leading end of the ferrule 40 is shielded by the shield plate 70D and the optical connector plug 10B can be decoupled from the optical connector adapter 110 in the shield state. At this time, in this embodiment, as shown in FIG. 29C, when the grip member 20B goes into the extension state by drawing out the outer barrel 22B, the stepped portion for disengagement prevention 163 of the outer barrel 22B contacts with the disengagement prevention projection 22b of the inner barrel 22E. Accordingly, only by drawing out the outer barrel 21B, the inner barrel 22E can be also drawn out of the optical connector adapter 110.

In this way, with the optical connector plug 10B according to this embodiment, only by grasping the outer barrel 21B and coupling it to the optical connector adapter 110, since the optical connector plug 10B can be coupled to the optical connector adapter 110 under a state where the shield plate 70D is moved from the shield position to the non-shield position, there is no coupling between the optical connector plug 10B and the optical connector adapter 110 under a state where the shield plate 70D is in the shield position. In other words, when the optical connector plug 10B is coupled to the optical connector adapter 110, if the engagement click 135 of the optical connector adapter 110 passes over the inner barrel engagement portion 100A before the shield plate 70D is moved to the non-shield position, the first supporting portion 132 of the sleeve holder 130 projects into the grip member 20B, and accordingly, the shield plate 70D contacts with the first supporting portion 132, which results in deformation or breakage of the shield plate 70D. However, according to this embodiment, under a state where the shield plate 70D is first moved to from the shield position to the non-shield position, since the engagement click 135 of the optical connector plug 10 passes over the inner barrel engagement portion 100A later and the optical connector plug 10B is coupled to the optical connector adapter 110, the shield plate 70D can be reliably prevented from being deformed or broken.

In addition, the configuration of the optical connector plug 10B according to this embodiment where the contact portion 100a is provided in the inner barrel engagement portion 100A of the inner barrel 22E and the pressing portion 38 is provided in the plug frame 30A can be applied to the above-mentioned first to fifth embodiments.

Other Embodiments

Although various embodiments according to the invention have been described so far, the optical connector plug and the optical connector of the invention are not limited to the above-mentioned embodiments.

For example, although the SC-type optical connector plugs 10, 10A, and 10B engaged with the SC-type optical connector adapter have been exemplified in the above-mentioned first to sixth embodiments, the invention is not particularly limited to these embodiments. For example, the invention can be applied to the MU-type optical connector plug and optical connector, obtaining the same effects. In addition, the invention can be applied to an inclined PC connector where a leading end of a ferrule has a convex shape inclined with respect to a plane perpendicular to an optical fiber axis. In the inclined PC connector, although a range of the light emitted from the leading end of the ferrule becomes widened because the leading end of the ferrule is inclined, any shield plates 70 to 70D in the above first to sixth embodiments can shield the leading end of the ferrule of the inclined PC connector. Particularly, the shield plates 70 and 70C in the above-mentioned first, fourth and fifth embodiments can more reliably shield the emitted light because a region where the emitted light is shielded is substantially widely formed.

In addition, although the shield plates 70 to 70D and the action plates 80 to 80D are provided at a side opposite to a face in which the keys 26 of the grip members 20 to 20B are provided in the above-mentioned first to sixth embodiments, the position at which the shield plates and the action plates are provided is not particularly limited if only it is within the insertion hole 22a.

In addition, although the shield plates 70 to 70D and the action plates 80 to 80D are rotatably supported to the inner barrels 22 to 22D or the shield plate frame 201 by the shield plate shaft 71 and the operation plate shafts 81 and 81A in the above-mentioned first to sixth embodiments, the invention is not particularly limited to these embodiments. For example, by employing the shield plates and the action plates as a leaf spring and fixing a base end of the leaf spring to the inner barrel 22 and the shield plate frame 201, the shield plates and the action plates may be freely inclined in the insertion hole 22a. In this case, since the shield plates and the action plates themselves serve as the biasing supporting means, there is no need of a separate biasing supporting means.

In addition, although the inner barrel engagement portion 100 engaged with the engagement click 135 of the optical connector adapter 110 is provided on the circumference of the leading ends of the inner barrels 22 to 22E, and the optical connector plugs 10 to 10B go into the extension state by grasping the outer barrels 21 to 21B and drawing them out of the optical connector adapter 110, in the above-mentioned first to sixth embodiments, the invention is not particularly limited to these embodiments. For example, when the inner barrels 22 to 22E are provided at the rear portion of the supporting hole 23 of the outer barrels 21 to 21B, the inner barrel biasing means such as an biasing coil spring is provided at the leading end of the supporting hole 23, and the optical connector plugs 10 to 10B are decoupled from the optical connector adapter 110 by the inner barrel biasing means, the grip members 20 to 20B can go into the extension state. In this way, by providing the inner barrel biasing means, the optical connector plugs 10 to 10B can be prevented from going into the reduction state by mistake even when the optical connector plugs 10 to 10B are alone without coupling to the optical connector adapter 110, raising safety more. Of course, by providing the inner barrel biasing means along with the inner barrel engagement portion, the grip members 20 to 20B can more reliably go into the extension state, raising safety.

According to the invention, by making the grip member into the extension state, the shield plate is moved to the shield position at which the leading end of the ferrule is shielded and the leading end of the ferrule is shielded. Accordingly, light can be easily and reliably prevented from being emitted from the leading end of the optical connector plug, raising the safety of the optical connector plug. In addition, by making the grip member into the reduction state the shield plate is moved to the non-shield position to expose the leading end of the ferrule for performing optical coupling to the optical connector adapter. In addition, since the grip member can go into the extension state and the reduction state only by grasping the outer barrel of the grip member and coupling/decoupling it to/from the optical connector adapter, light can be reliably prevented from being emitted from the leading end of the ferrule when the optical connector plug is coupled to or decoupled from the optical connector adapter. Furthermore, since conventional ferrules, plug frames, stop rings, etc. supported in the optical connector plug can be used in the invention and the optical connector plug of the invention can be coupled to the conventional optical connector adapters, product costs and equipment exchange costs can be reduced.

What is claimed is:

1. An optical connector plug engagable in a push-pull manner, comprising at least a plug frame which supports a ferrule for supporting an optical fiber and a grip member for supporting the plug frame therein, wherein the grip member includes an inner barrel and an outer barrel, which are freely slid with respect to each other, the grip member having a reduction state where the inner barrel is accommodated in the outer barrel and an extension state where the inner barrel projects forwardly, and the plug frame being engaged and supported such that the plug frame is movable by a predetermined amount with respect to the outer barrel, at a leading end inside the inner barrel are provided a shield plate supported at a free slant with respect to the inner barrel via a base end of the shield plate, disposed at a shield position at which a leading end of the ferrule is shielded in the extension state, and disposed at a non-shield position at which accommodation of the plug frame in the inner barrel is allowed, an action plate supported at a free slant inside the shield plate via a base end of the action plate and inclined along with the shield plate with a leading end of the action plate contacting or engaged with the shield plate, and a biasing supporting means for biasing the shield plate to position the shield plate such that the shield plate is disposed at the shield position in the extension position state, the shield plate is moved from the shield position to the non-shield position by the relative movement between the inner barrel and the plug frame from the extension state to the reduction state, the grip member has a shape engaged with an optical connector adapter in the reduction state and an engagement portion provided on the circumference of a leading end of the plug frame is engaged with an engagement click of the optical connector adapter to be in an optical coupling state, and on the circumference of the outer barrel is provided an engagement release portion for pressing the engagement click to disengage the engagement click from the engagement portion by retreating only the outer barrel by a predetermined amount from the optical coupling state.

2. The optical connector plug according to claim 1, wherein, on the circumference of the leading end of the inner barrel is provided an inner barrel engagement portion engaged with the engagement click for relatively moving the outer barrel with respect to the inner barrel by retreating the outer barrel from the optical coupling state.

3. The optical connector plug according to claim 1, wherein, an inner barrel biasing means for biasing the inner barrel in a direction in which the inner barrel projects with respect to the outer barrel is provided inside the grip member.

4. The optical connector plug according to claim 1, wherein the shield plate and the action plate are positioned at the shield position as a leading end of the shield plate contacts with a face opposite to one side at which the base end inside the inner barrel is supported.

5. The optical connector plug according to claim 4, wherein a concave portion is provided at the leading end of the action plate, and, when the action plate is inclined to the ferrule in the extension state of the grip member, the concave portion is disposed at a position at which the concave portion contacts with a side of the ferrule.

6. The optical connector plug according to claim 1, wherein the shield plate and the action plate are positioned and supported at the shield position by engaging the shield plate with the action plate at the shield position.

7. The optical connector plug according to claim 1, wherein the biasing supporting means includes an action plate biasing means for biasing the action plate from the shield position to the non-shield position and a shield plate biasing means for biasing the shield plate from the non-shield position to the shield position with a biasing force stronger than that of the action plate biasing means.

8. The optical connector plug according to claim 1, wherein the biasing supporting means biases the shield plate or the action plate from the non-shield position to the shield position.

9. The optical connector plug according to claim 1, wherein the shield plate and the action plate are supported in the inner barrel.

10. The optical connector plug according to claim 1, wherein the shield plate and the action plate are supported to a shield plate frame to form a shield plate assembly, and the shield plate assembly is fixed to the inner barrel.

11. The optical connector plug according to claim 1, wherein the shield plate is rotatably supported to the inner barrel via a shield plate shaft provided at the base end of the shield plate, and the action plate is rotatably supported to the inner barrel via an action plate shaft provided at the base end of the action plate.

12. The optical connector plug according to claim 1, wherein the shield plate and the action plate are formed of a leaf spring, and the shield plate and the action plate serve as the biasing supporting means.

13. The optical connector plug according to claim 1, wherein the shield plate and the action plate are provided such that the shield plate and the action plate do not contact with the leading end of the ferrule when the shield plate and the action plate are moved from the non-shield position to the shield position.

14. The optical connector plug according to claim 1, wherein the outer barrel has two members separated in a direction intersecting with a movement direction of the inner barrel.

15. The optical connector plug according to claim 1, wherein the grip member has a shape engaged with a SC-type or MU-type optical connector adapter.

16. The optical connector plug according to claim 1, wherein a contact portion contacting with the engagement click is provided at the leading end of the inner barrel, the engagement click contacts with the contact portion in the extension state, a pressing portion provided at the leading end of the plug frame presses the engagement click to release the contact of the engagement click with the contact portion in the reduction state and engage the engagement click with the engagement portion.

17. An optical connector having the optical connector plug according to claim 1.

* * * * *